United States Patent
Park et al.

(10) Patent No.: US 10,671,257 B2
(45) Date of Patent: Jun. 2, 2020

(54) DISPLAY APPARATUS FOR DISPLAYING AN IMAGE CORRESPONDING TO A SPECIFIC REGION

(71) Applicant: LG ELECTRONICS INC., Seoul (KR)

(72) Inventors: Mihyun Park, Seoul (KR); Hongjo Shim, Seoul (KR); Youngho Sohn, Seoul (KR); Jisoo Park, Seoul (KR); Mansoo Sin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 290 days.

(21) Appl. No.: 15/724,444

(22) Filed: Oct. 4, 2017

(65) Prior Publication Data

US 2018/0095650 A1  Apr. 5, 2018

(30) Foreign Application Priority Data

Oct. 5, 2016 (KR) .......................... 10-2016-0128252

(51) Int. Cl.
| | |
|---|---|
| *G06F 3/048* | (2013.01) |
| *G06F 3/0484* | (2013.01) |
| *G06F 3/0488* | (2013.01) |
| *G06F 3/0482* | (2013.01) |
| *G06F 3/0481* | (2013.01) |
| *G06F 3/041* | (2006.01) |
| *G06F 3/044* | (2006.01) |

(52) U.S. Cl.
CPC ........ *G06F 3/04845* (2013.01); *G06F 3/0412* (2013.01); *G06F 3/0482* (2013.01); *G06F 3/04817* (2013.01); *G06F 3/04842* (2013.01); *G06F 3/04847* (2013.01); *G06F 3/04883* (2013.01); *G06F 3/044* (2013.01)

(58) Field of Classification Search
CPC ............. G06F 3/04842; G06F 3/04845; G06F 3/0412; G06F 3/04847; G06F 3/04817; G06F 3/017; G06F 3/0481
See application file for complete search history.

(56) References Cited

U.S. PATENT DOCUMENTS

| | | | |
|---|---|---|---|
| 9,244,940 B1 * | 1/2016 | Donsbach | ............... G06T 11/20 |
| 9,740,384 B2 * | 8/2017 | Zou | ...................... G06F 3/04847 |
| 2014/0176542 A1 * | 6/2014 | Shohara | ................ G06T 15/205 |
| | | | 345/420 |
| 2014/0194164 A1 | 7/2014 | Lee et al. | |

(Continued)

FOREIGN PATENT DOCUMENTS

EP    3276476 A1    1/2018

*Primary Examiner* — Haoshian Shih
(74) *Attorney, Agent, or Firm* — Birch, Stewart, Kolasch & Birch, LLP

(57) ABSTRACT

A display apparatus includes: a display unit configured to display an image on a screen; an input unit configured to receive an input from a user; and a control unit configured to control the display unit to display a thumbnail image corresponding to a partial region of a preview image of an omnidirectionally captured image. The control unit is further configured to control the display unit to display an image corresponding to a specific region of the preview image if the input is received. At least one of the specific region and an enlargement ratio of the image corresponding to the specific region is determined based on the input.

19 Claims, 82 Drawing Sheets

(56) References Cited

U.S. PATENT DOCUMENTS

| | | | |
|---|---|---|---|
| 2015/0301695 A1* | 10/2015 | Leong | G06F 3/04817 |
| | | | 715/838 |
| 2016/0004428 A1 | 1/2016 | Bernstein et al. | |
| 2016/0132991 A1 | 5/2016 | Fukushi | |
| 2016/0196042 A1* | 7/2016 | Laute | G06F 3/017 |
| | | | 715/845 |
| 2018/0032830 A1 | 2/2018 | Kim et al. | |

* cited by examiner

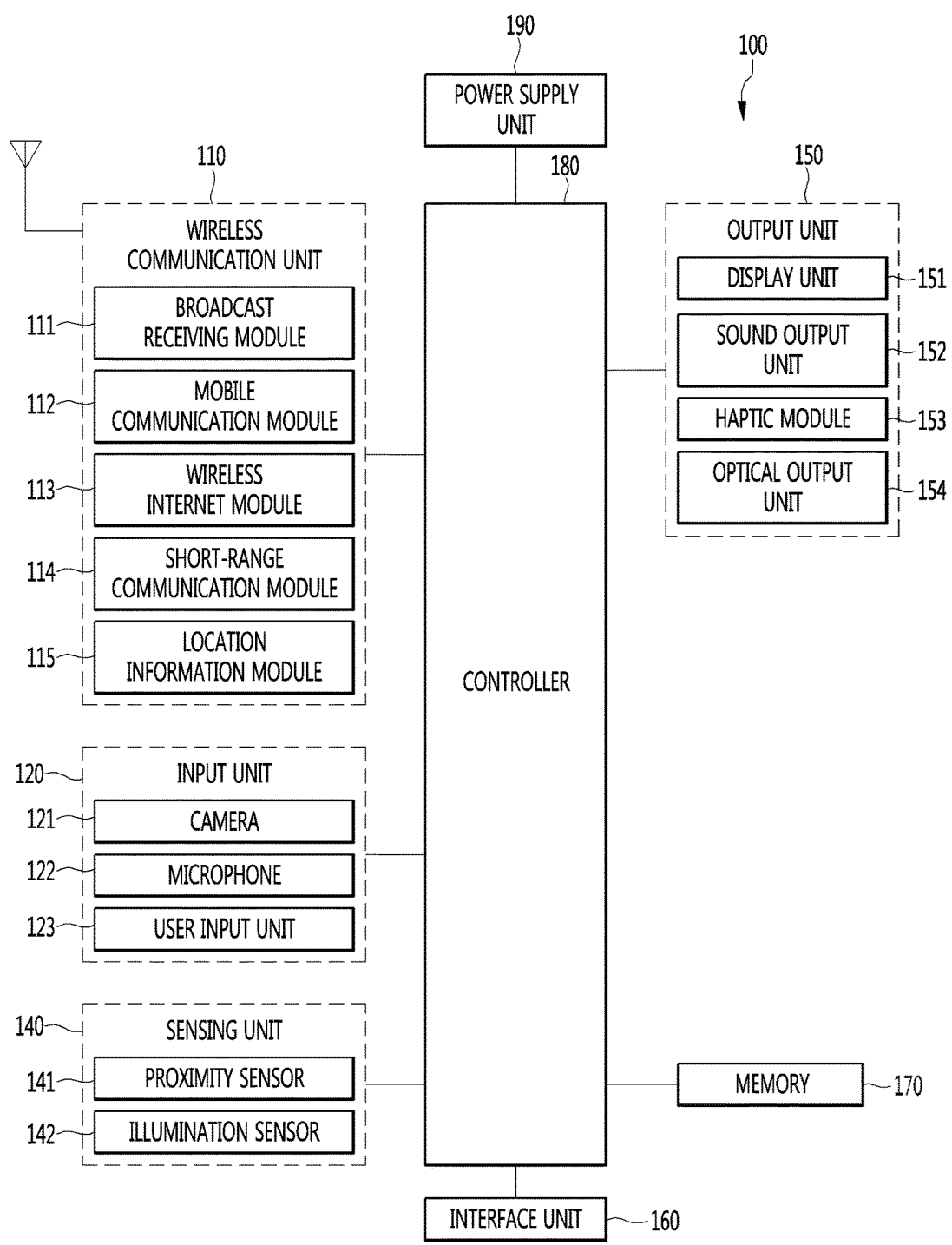

DISPLAY APPARATUS FOR DISPLAYING AN IMAGE CORRESPONDING TO A SPECIFIC REGION

CROSS-REFERENCE TO RELATED APPLICATIONS

This application claims priority to Korean Patent Application No. 10-2016-0128252 filed on Oct. 5, 2016 in Korea, the entire contents of which is hereby incorporated by reference in its entirety.

BACKGROUND

The present disclosure relates to a display apparatus capable of performing a preview by changing a region or an enlargement ratio of an omnidirectionally captured image by using a thumbnail image.

Terminals may be generally classified as mobile/portable terminals or stationary terminals according to their mobility. Mobile terminals may also be classified as handheld terminals or vehicle mounted terminals according to whether or not a user can directly carry the terminal.

On the other hand, technologies capable of omnidirectionally capturing an image by using an omnidirectional camera and providing the omnidirectionally captured image to a user have been recently introduced. A representative example is a capturing device called a 360-degree camera, a mobile terminal that displays an image captured by the 360-degree camera, or the like.

In order to quickly view a photo or a video in a terminal at a glance, the photo or the video in the terminal may be displayed as a thumbnail image.

Meanwhile, when an omnidirectionally captured image is displayed as a thumbnail image, a partial region of the omnidirectionally captured image is generally displayed as the thumbnail image.

In this case, since a whole region of the thumbnail image is not displayed, it is difficult for a user to grasp whether the thumbnail image is an image for which the user searches.

SUMMARY

Embodiments provide a display apparatus capable of performing a preview by changing a region or an enlargement ratio of an omnidirectionally captured image by using a thumbnail image.

In one embodiment, a display apparatus includes: a display unit configured to display an image on a screen; an input unit configured to receive an input from a user; and a control unit configured to control the display unit to display a thumbnail image corresponding to a partial region of a preview image of an omnidirectionally captured image, wherein the control unit is further configured to control the display unit to display an image corresponding to a specific region of the preview image if the input is received, wherein at least one of the specific region and an enlargement ratio of the image corresponding to the specific region is changed based on the input. In other words, at least one of the specific region and the enlargement ratio is determined based on the input, and is then displayed accordingly.

Further scope of applicability of the present disclosure will become apparent from the detailed description given hereinafter. However, it should be understood that the detailed description and specific examples, while indicating preferred embodiments of the invention, are given by illustration only, since various changes and modifications within the scope of the invention will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIGS. 9 and 10 are diagrams illustrating a first image of a first region displayed according to an input in a first direction, according to an embodiment of the present disclosure;

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
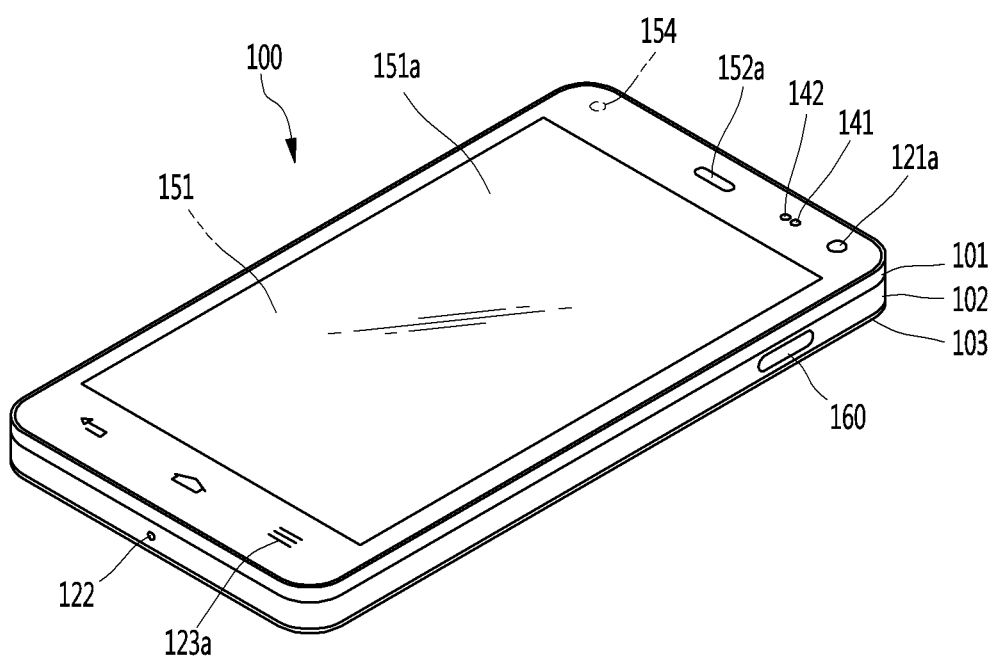
FIGS. 1B and 10 are conceptual views of one example of the mobile terminal, viewed from different directions.
Figure 8:
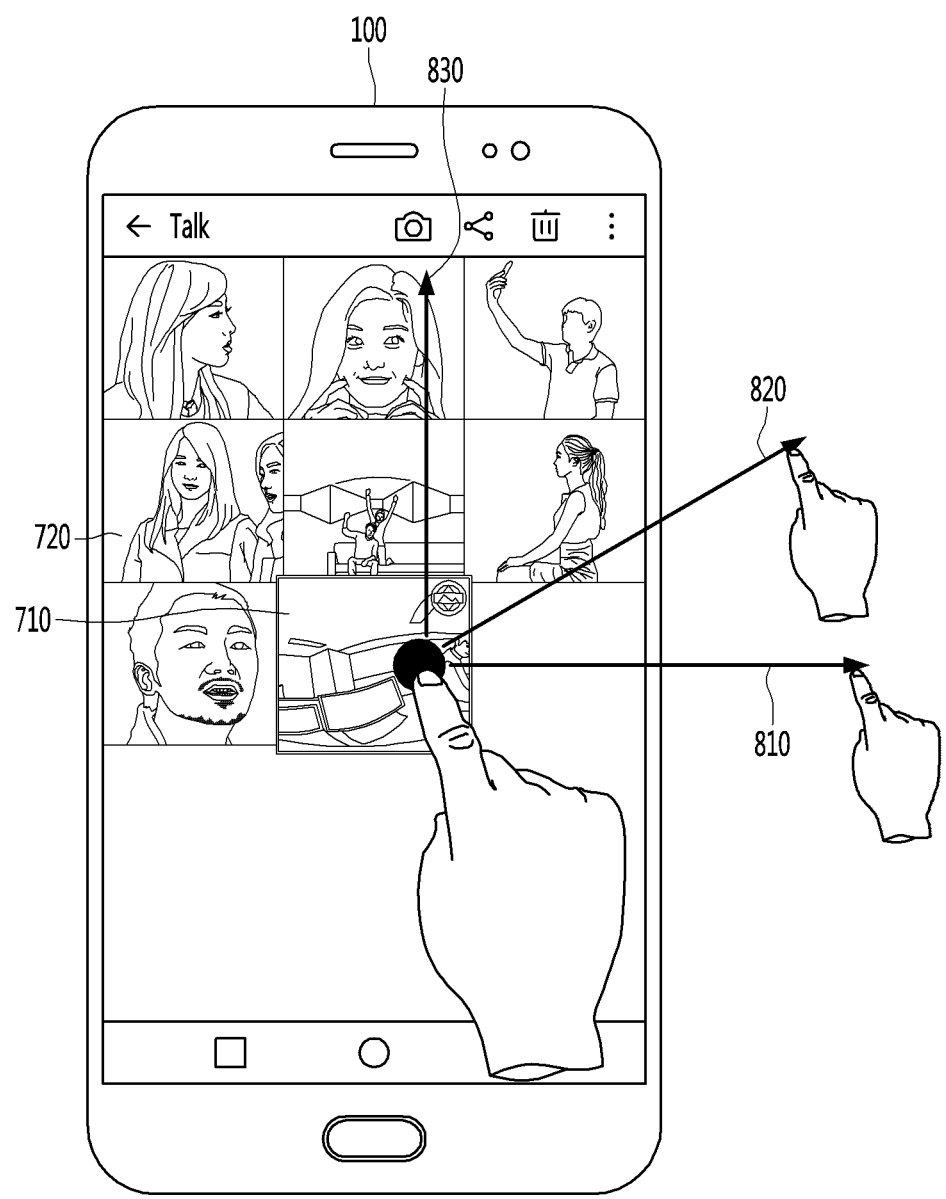
FIG. 8 is a diagram illustrating various inputs capable of setting a specific region or an enlargement ratio of an image corresponding to the specific region, according to an embodiment of the present disclosure.
Figure 9:
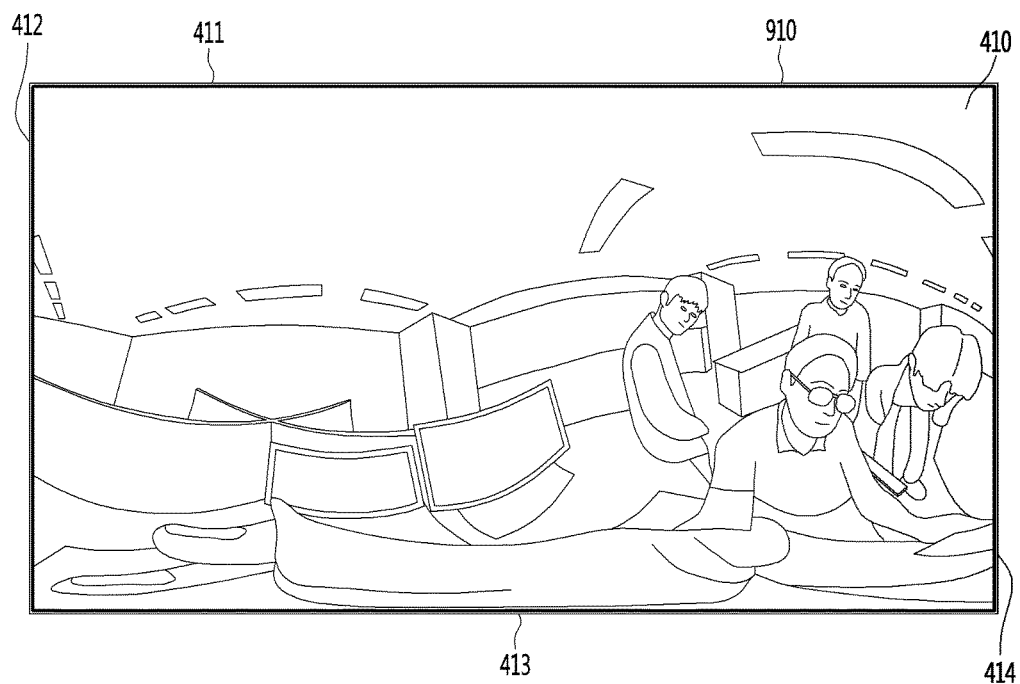
Figure 10:
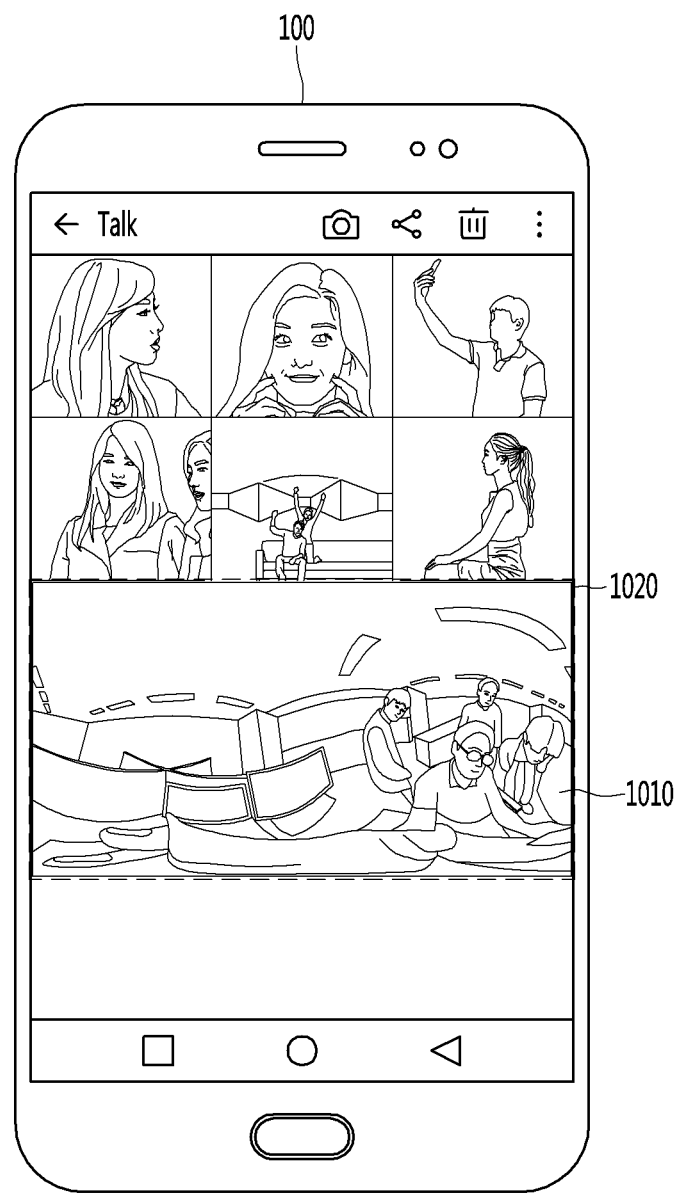

Reference is now made to FIGS. 1A to 10, where FIG. 1A is a block diagram of a mobile terminal in accordance with the present disclosure, and FIGS. 1B and 10 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sensing a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A to 10 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display apparatus. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid statedisk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, first and second audio output modules 151a/151b, a proximity sensor 141, an illumination sensor 142, an optical output module 154, first and second cameras 121a/121b, first and second manipulation units 123a/123b, a microphone 122, interface unit 160 and the like.

Figure 1C:
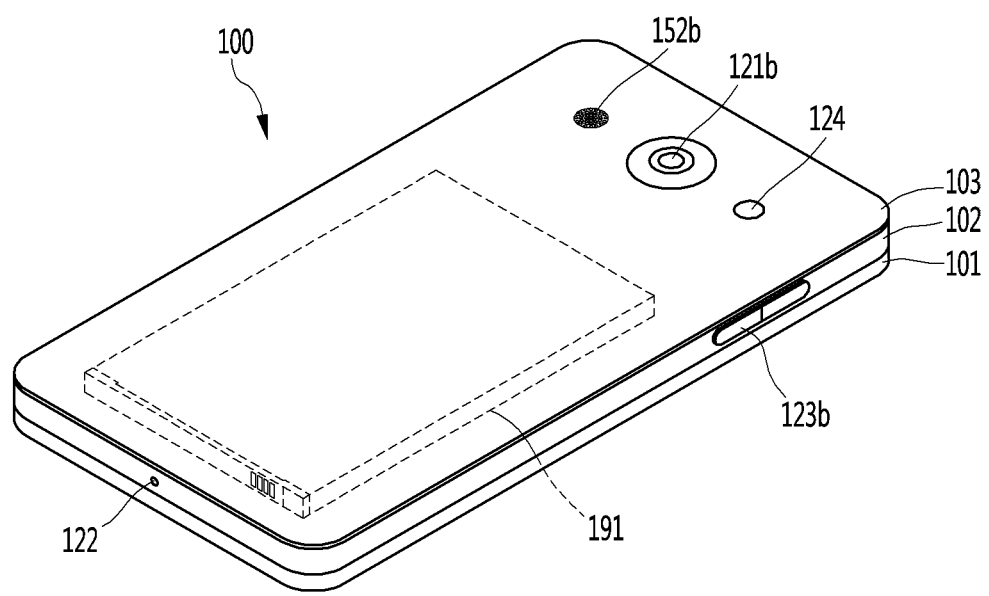
FIG. 1A is a block diagram of a mobile terminal in accordance with the present disclosure.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the control unit can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the present disclosure, the term "memory 170" may also be referred as the "storage unit 170".

The input unit 120 of the mobile terminal 100 may include the sensing unit 140 and perform all functions performed by the sensing unit 140. For example, the input unit 120 may sense a user touch input.

Hereinafter, descriptions will be provided by exemplifying the mobile terminal 100, but the present disclosure is not limited thereto. The present disclosure may be applied to any apparatuses that can display an image.

Figure 2:
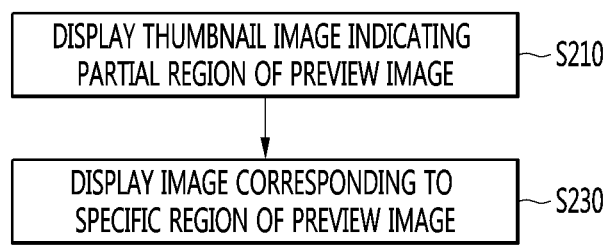
FIG. 2 is a flowchart illustrating a displaying method of a display apparatus, according to an embodiment of the present disclosure.

FIG. 2 is a flowchart illustrating a displaying method of a display apparatus, according to an embodiment of the present disclosure.

The displaying method of the display apparatus according to the embodiment of the present disclosure may include an operation (S210) of displaying a thumbnail image corresponding to a partial region of a preview image in an omnidirectionally captured image and an operation (S230) of displaying an image corresponding to a specific region of the specific region in the omnidirectionally captured image when an input is received from a user.

Figure 3:
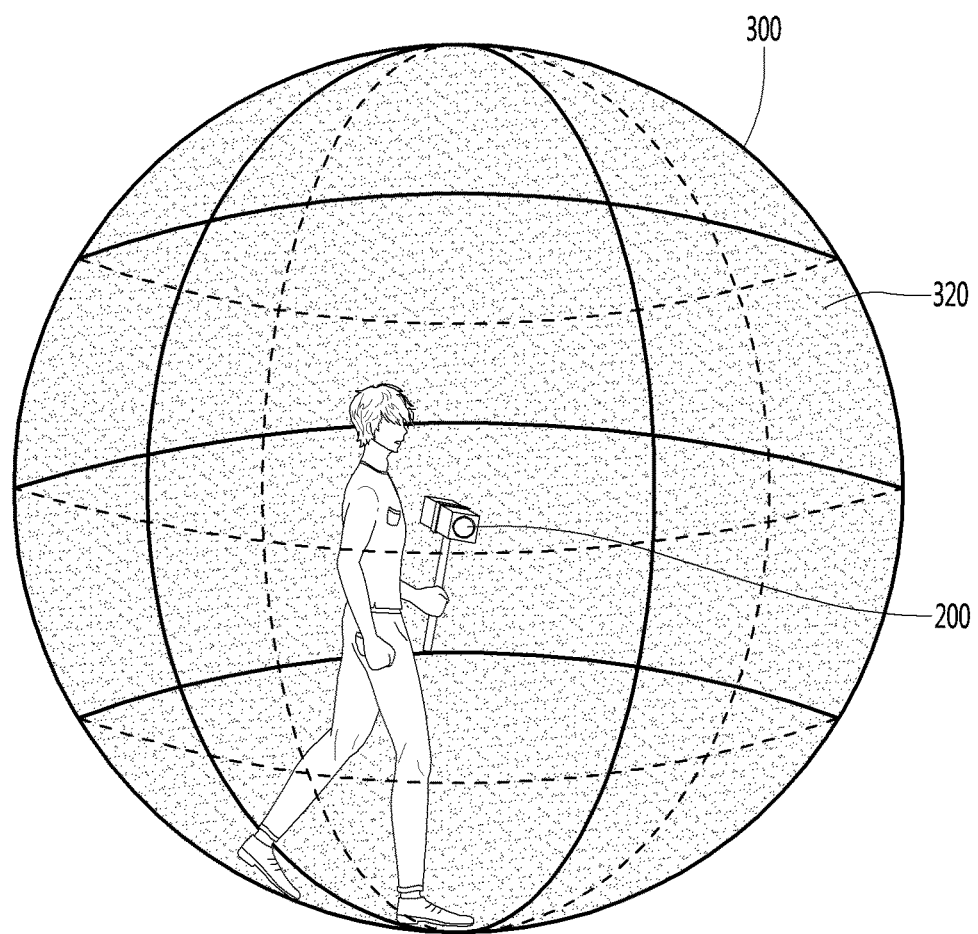
FIG. 3 is a diagram illustrating an omnidirectional capturing camera (device) and an omnidirectionally captured image according to an embodiment of the present disclosure.

FIG. 3 is a diagram illustrating an omnidirectional capturing camera (device) 200 and an omnidirectionally captured image 300 according to an embodiment of the present disclosure.

The omnidirectionally captured image 300 may be an image captured in all directions with respect to a specific point.

For example, when a virtual sphere is present and the specific point is a center of the virtual sphere, the all directions may be all directions from the center of the virtual sphere to a surface of the virtual sphere.

That is, when an image is captured by using the omnidirectional capturing device 200 such as a 360-degree camera, the omnidirectionally captured image 300 may be an image captured in all directions with respect to the omnidirectional capturing device 200. For example, the omnidirectionally captured image 300 may be an image captured by using a camera including two fisheye lenses having a view angle of 180°, which are disposed opposite to each other.

Meanwhile, the omnidirectionally captured image 300 has been described above by exemplifying the virtual sphere, but is not limited thereto.

Specifically, when an image within a specific view angle is captured by using the omnidirectional capturing device 200, the omnidirectionally captured image 300 may be an image captured in all directions within the specific view angle.

For example, when capturing is performed by setting an omnidirectional capturing camera to have a view angle of 180°, the omnidirectionally captured image 300 may be an image captured in all directions from a center of a virtual hemisphere to a surface of the virtual hemisphere.

In addition, the omnidirectionally captured image 300 may be an image captured at a specific view angle or more.

For example, the omnidirectionally captured image 300 may be an image captured at a view angle of 90° or more.

Furthermore, the case where the image is captured by using the omnidirectional capturing device 200 has been described above, but the present disclosure is not limited thereto. For example, the present disclosure may also be applied in a case where a plurality of images are captured by using a general capturing device rather than the omnidirectional capturing device 200 and the omnidirectionally captured image 300 is generated by mixing the plurality of captured images.

Meanwhile, the omnidirectionally captured image 300 may be distinguished from a normal image. The normal image may not be the omnidirectionally captured image 300, but may be an image captured through a general capturing method. For example, the normal image may be an image captured by a telephoto lens, a normal lens, or a wide angle lens.

In addition, the normal image may be an image captured at a specific view angle or less. For example, the normal image may be an image captured at a view angle of 90° or less.

Furthermore, the normal image may be a portion of the omnidirectionally captured image 300. Specifically, the normal image may be an image within a specific angle range of the omnidirectionally captured image 300. For example, when an image having a view angle of 45° is acquired by dividing the omnidirectionally captured image 300 (which has a view angle of) 360°, the normal image may be an image within an angle range of 45° acquired from an image captured at a view angle of 360°.

In addition, the normal image may be an image displayed in a normal mode. The normal mode may be a mode in which a whole region of a captured image is displayed.

On the contrary, the omnidirectionally captured image 300 may be an image displayed in an omnidirectional display mode. The omnidirectional display mode may be a mode in which an image of a partial region in the omnidirectionally captured image 300 is displayed, and then, images of other regions in the omnidirectionally captured image 300 are displayed according to an operation of a user.

Meanwhile, a whole region 320 of the omnidirectionally captured image 300 is illustrated in FIG. 3. When a virtual sphere is present and the omnidirectional capturing device 200 is placed in a center of the virtual sphere, the omnidirectionally captured image 300 may be an image captured in all directions with respect to the omnidirectional capturing device 200. In addition, the whole region 320 of the omnidirectionally captured image 300 may mean a region of a whole surface in the virtual sphere.

While the whole region 320 of the omnidirectionally captured image 300 has been described by exemplifying the virtual sphere with respect to the omnidirectional capturing device 200 for convenience of description, this just indicates that images in all directions are captured by the omnidirectional capturing device 200. However, it should not be understood that the images in all directions are at an equal distance from the omnidirectional capturing device 200. Imagining the celestial sphere displaying a lot of constellations located at different distances from the earth, this is easy to understand.

Figure 4:
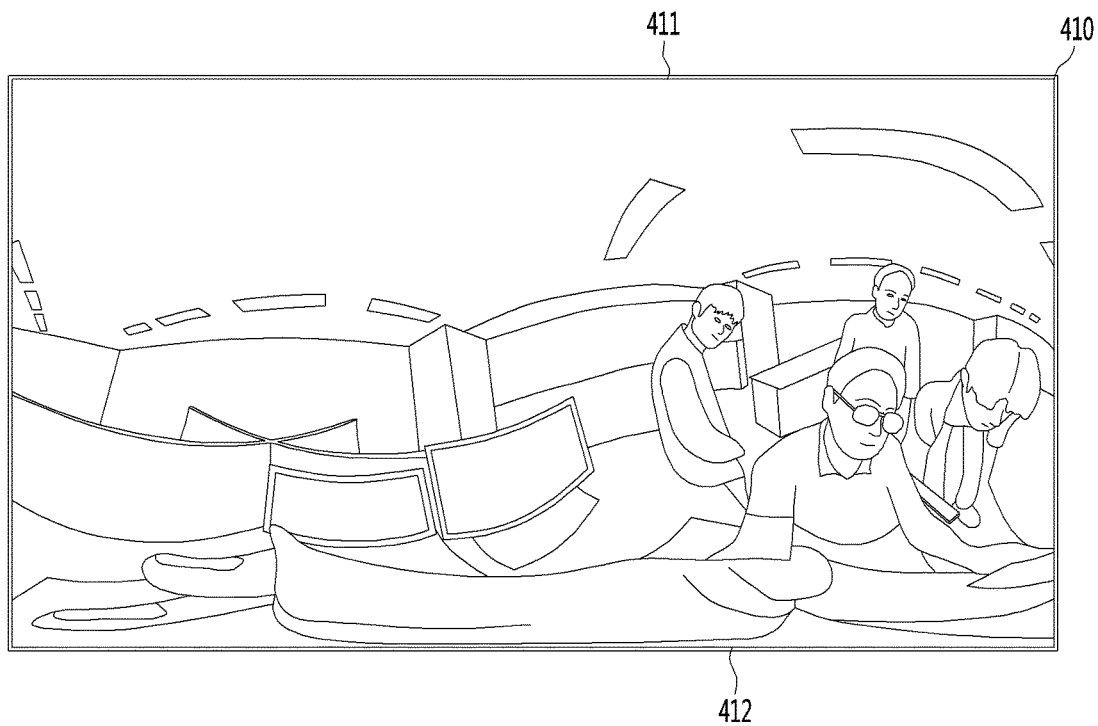
FIG. 4 is a diagram illustrating a preview image of an omnidirectionally captured image according to an embodiment of the present disclosure.

FIG. 4 is a diagram illustrating a preview image 410 of an omnidirectionally captured image 300 according to an embodiment of the present disclosure.

The preview image 410 of the omnidirectionally captured image 300 may be a plane image displayed by planarizing the omnidirectionally captured image 300.

Specifically, as described above, the omnidirectionally captured image 300 is an image captured in all directions with respect to the omnidirectional capturing device 200, and the whole region 320 of the omnidirectionally captured image 300 means a region of a whole surface in the virtual sphere. Meanwhile, the plane image, i.e., the preview image 410 of the omnidirectionally captured image 300 may be one plane image displayed by spreading the virtual sphere into planes, and then, connecting the planes to one another. Since the virtual sphere is spread into the planes, a distortion may be generated in the plane image, i.e., the preview image 410 of the omnidirectionally captured image 300.

On the other hand, a control unit 180 may display an image corresponding to a partial region of the preview image 410. Specifically, the control unit 180 may display a thumbnail image corresponding to the partial region of the preview image 410 of the omnidirectionally captured image 300.

In addition, the control unit 180 may display an image corresponding to the partial region or a whole region of the preview image 410. Specifically, the control unit 180 may display an image corresponding to a specific region of the preview image 410 in the omnidirectionally captured image 300.

The phrase "the image corresponding to the whole region of the preview image 410 is displayed" may mean that the whole region of the preview image 410 in FIG. 4 is displayed as it is.

In addition, the phrase "the image corresponding to the partial region of the preview image 410 is displayed" may mean that the partial region of the preview image 410 in FIG. 4 is displayed as it is.

The present disclosure is not limited thereto, and the phrase "the image corresponding to the partial region of the preview image 410 is displayed" may not mean that the partial region of the preview image 410 in FIG. 4 is displayed as it is. Specifically, the preview image 410 of the FIG. 4 is illustrated for displaying a whole region of the omnidirectionally captured image 300 into one image. Respective regions of the preview image 410 may have different distortions. Therefore, the phrase "the image corresponding to the partial region of the preview image 410 is displayed" may not mean that the partial region of the preview image 410 in FIG. 4 is displayed as it is, but may mean that a partial region of the omnidirectionally captured image 300 corresponding to the partial region of the preview image 410 is displayed by setting and planarizing the partial region of the omnidirectionally captured image 300 and correcting a distortion thereof.

On the other hand, the preview image 410 may include an upper side 411 thereof and a lower side 412 thereof. In addition, a region contacting the upper side 411 and the lower side 412 of the preview image 410 may mean a region formed from the upper side 411 of the preview image 410 to the lower side 412 thereof.

The preview image 410 of the omnidirectionally captured image 300 has been described as being an image displayed by converting the whole region 320 of the omnidirectionally captured image 300 into the one plane image, but is not limited thereto.

Specifically, the preview image 410 of the omnidirectionally captured image 300 may be an image displayed by converting a partial region of the omnidirectionally captured image 300 into one plane image, but is not limited thereto.

This will be described in detail with reference to FIG. 5.

Figure 5:
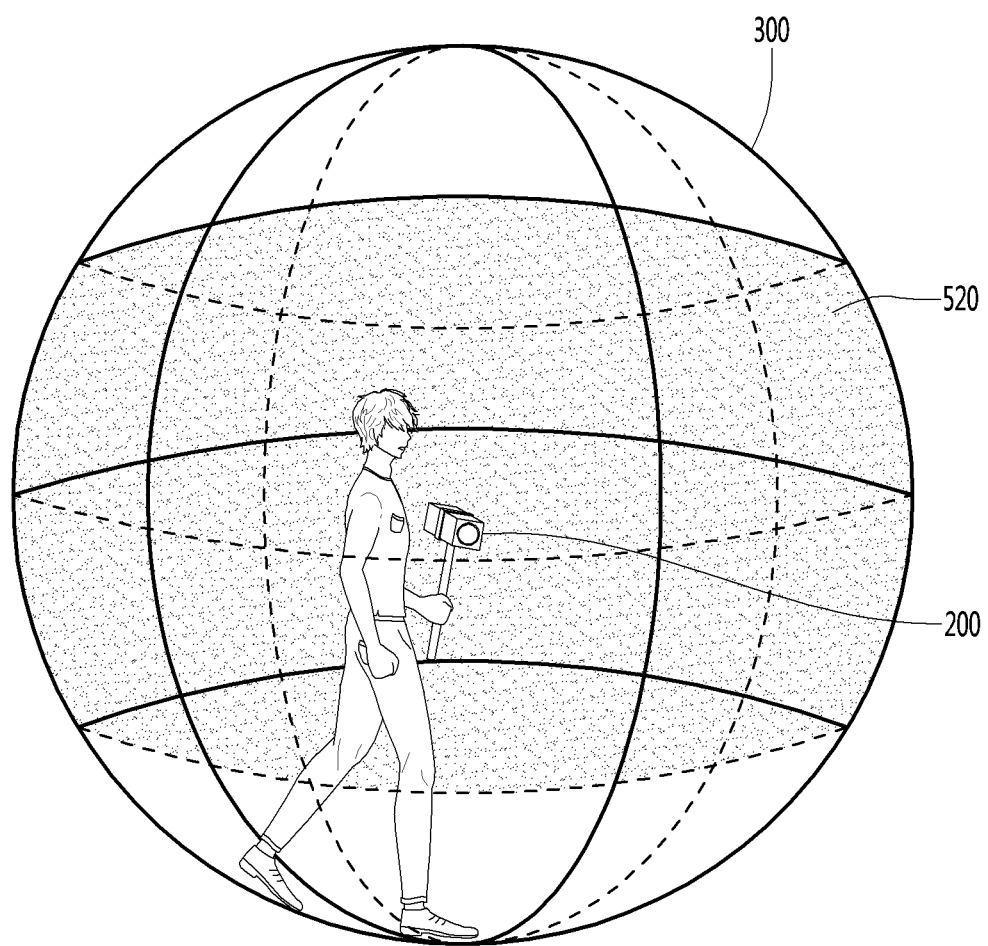
FIG. 5 is a diagram illustrating a panorama image according to an embodiment of the present disclosure.

FIG. 5 is a diagram illustrating a panorama image according to an embodiment of the present disclosure.

A preview image of an omnidirectionally captured image 300 may be a panorama image.

Specifically, the preview image of the omnidirectionally captured image 300 may be an image displayed by converting a region 520 within a specific vertical angle range in a whole region of the omnidirectionally captured image 300 into a plane image.

For example, when a latitude of an equator in a virtual sphere is κ°, a latitude of a north pole thereof is 90°, and a latitude of a south pole thereof is −90°, the preview image of the omnidirectionally captured image 300 may be an image displayed by planarizing a region within a range of −80° to 80° in the whole region of the omnidirectionally captured image 300 into one plane image.

Figure 6:
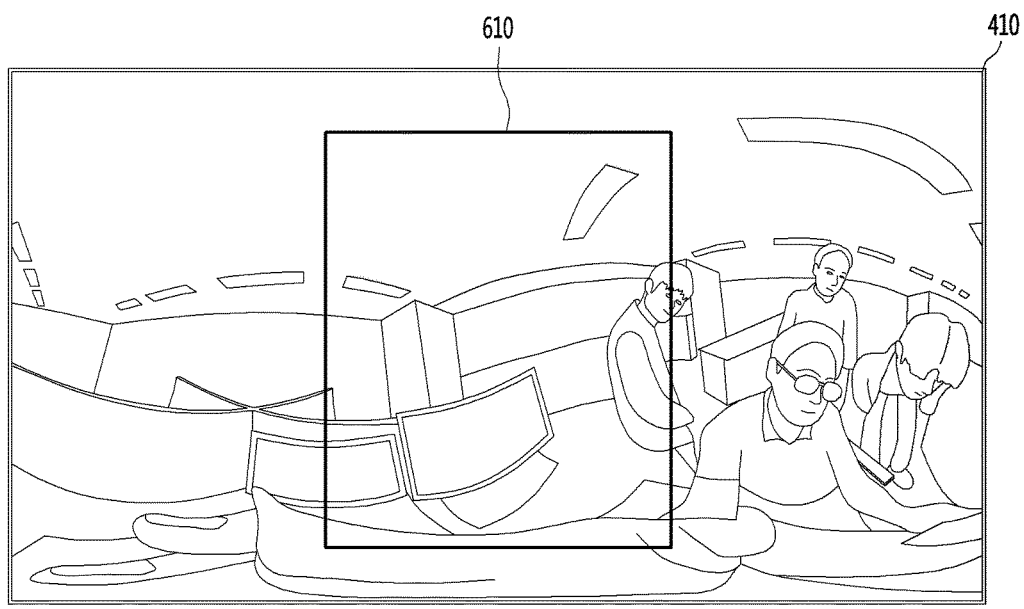
FIGS. 6 and 7A are diagrams illustrating a method of displaying a thumbnail image, according to an embodiment of the present disclosure.
Figure 7A:
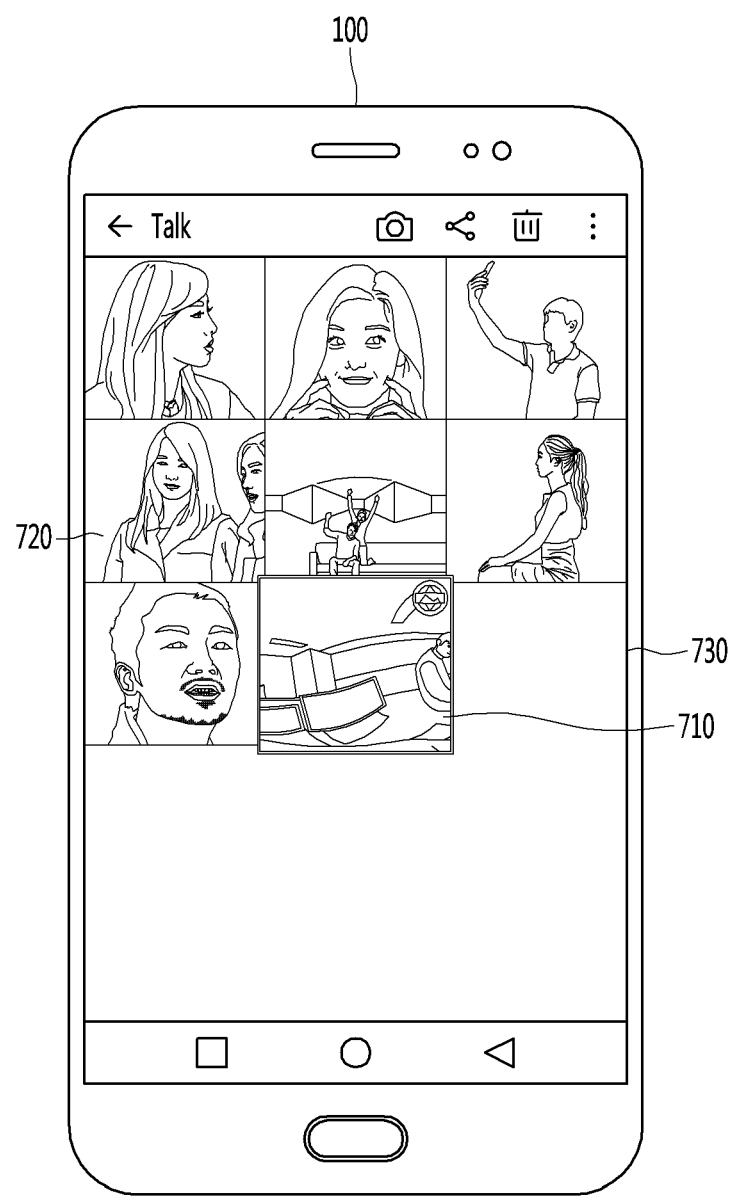

FIGS. 6 and 7A are diagrams illustrating a method of displaying a thumbnail image, according to an embodiment of the present disclosure.

Figure 7B:
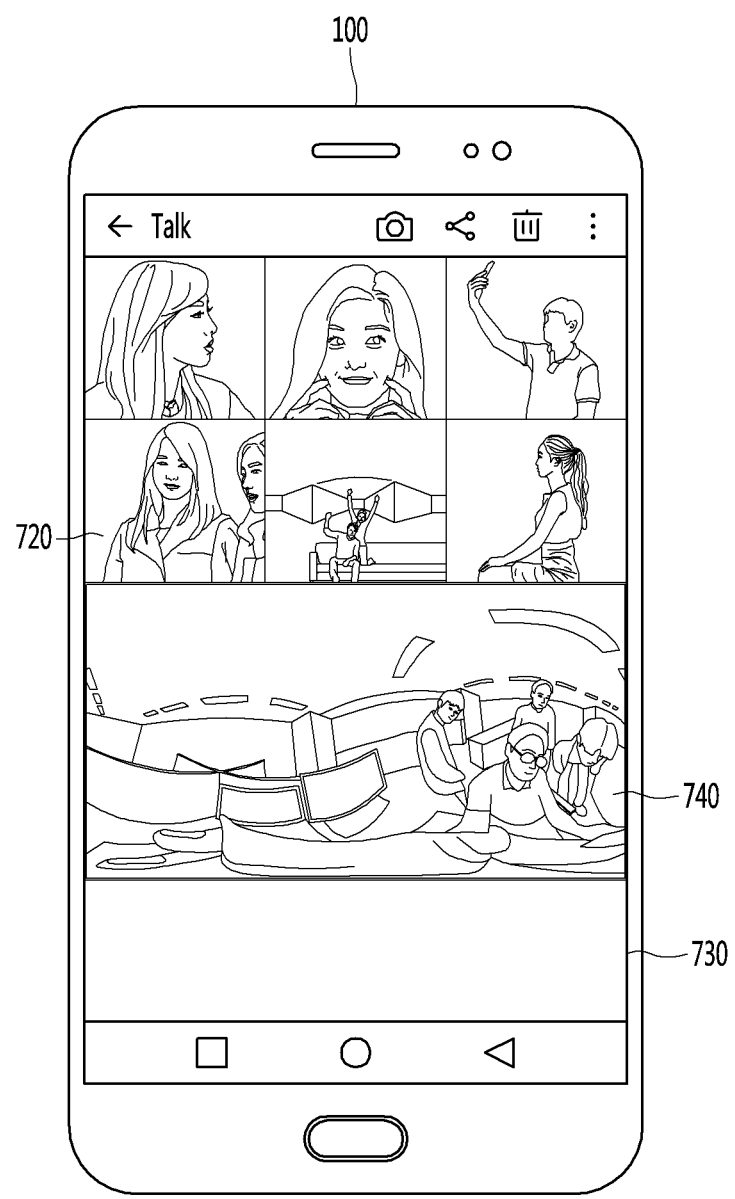
FIG. 7B is a diagram illustrating a method of displaying an image corresponding to a specific region of a preview image, according to an embodiment of the present disclosure.

As shown in FIGS. 6 and 7B, the control unit 180 may display a thumbnail image 710 corresponding to a partial region 610 of a preview image 410 in an omnidirectionally captured image.

Meanwhile, the partial region 610 of the preview image 410 may be placed at a center of the preview image 410. That is, the preview image 410 may be a preview image which includes the partial region 610 displayed as the thumbnail image 710 at the center thereof.

In addition, the control unit 180 may display a gallery 730 including one or more thumbnail images.

The gallery 730 may include the thumbnail image 710 corresponding to the partial region 610 of the preview image 410 in the omnidirectionally captured image as well as a thumbnail image 720 of a normal image.

FIG. 7B is a diagram illustrating a method of displaying an image corresponding to a specific region of a preview image, according to an embodiment of the present disclosure.

When an input is received from a user, the control unit 180 may display an image 740 corresponding to a specific region of the preview image 410 in the omnidirectionally captured image.

In addition, the control unit 180 may display the image 740 corresponding to the specific region together with the gallery 730 including the thumbnail image 710 corresponding to the partial region 610 of the preview image 410 and the thumbnail image 720 of the normal image.

As described above, the present invention may provide an environment that allows other regions of the omnidirectionally captured image to be confirmed only through a simple operation in the gallery 730 without confirming an original image through a user's selection of a thumbnail image.

FIG. 8 is a diagram illustrating various inputs capable of setting a specific region or an enlargement ratio of an image corresponding to the specific region, according to an embodiment of the present disclosure.

The control unit 180 may receive an input from a user.

The input may include at least one of an input in a first direction 810, an input in a second direction 820, and an input in a third direction 830.

The input in the first direction 810 may be an input of selecting a thumbnail image 710, and then, dragging the thumbnail image 710 in the first direction 810. In addition, the input in the second direction 820 may be an input of selecting the thumbnail image 710, and then, dragging the thumbnail image 710 in the second direction 820. Furthermore, the input in the third direction 830 may be an input of selecting the thumbnail image 710, and then, dragging the thumbnail image 710 in the third direction 830.

The first direction 810 may be a horizontal direction. Only a right horizontal direction is illustrated in FIG. 8, but the present disclosure is not limited thereto. The first direction 810 may be a left horizontal direction.

In addition, the third direction 830 may be a vertical direction. Only an upper vertical direction is illustrated in FIG. 8, but the present disclosure is not limited thereto. The third direction 830 may be a lower vertical direction.

Furthermore, the second direction 820 may be a diagonal direction. Only a right upper diagonal direction is illustrated in FIG. 8, but the present disclosure is not limited thereto. The second direction 820 may be any one of a right lower diagonal direction, a left upper diagonal direction, and a left lower diagonal direction.

On the other hand, when the image corresponding to the specific region of a preview image is displayed, at least one of the specific region and the enlargement ratio of the image corresponding to the specific region may be changed based on the input received from the user. That is, at least one of a region to be displayed and an enlargement degree of the image may be changed according to which one of the input in the first direction 810, the input in the second direction 820, and the input in the third direction 830 is received.

FIGS. 9 and 10 are diagrams illustrating a first image 1010 of a first region 910 displayed according to an input in a first direction 810, according to an embodiment of the present disclosure.

Referring to FIGS. 9 and 10, when the first input in the first direction 810 is received, the control unit 180 may display the first image 1010 corresponding to the first region 910 of a preview image 410. That is, a specific region may be the first region 910 and an image corresponding to the specific region may be the first image 1010 corresponding to the first region 910.

The first region 910 may be a whole region of the preview image 410. Specifically, the first region 910 may be a region contacting an upper side 411, a left side, 412, a lower side 413, and a right side 414 of the preview image 410.

Meanwhile, a position of the specific region in the preview image 410 may be changed according to an input received from a user. That is, the position of the specific region is determined based on the input, and is then displayed accordingly. For example, when an input in a third direction 830 is received, a third region may be placed at a center of the preview image 410. However, when an input in a second direction 820 is received, a second region may be placed in a left region or a right region of the preview image 410.

Meanwhile, an aspect and a size of the specific region of the preview image 410 may be changed according to an input received from a user. That is, the aspect and the size of the specific region are determined based on the input, and are then displayed accordingly.

Specifically, when the first input in the first direction 810 is received, an aspect ratio of the first region 910 may be set to a specific ratio and a size of the first region 910 may be set to a specific size.

For example, when the input in the first direction 810 is received, the aspect ratio of the first region 910 may be 5:2 and the size of the first region 910 may be 10.

In another example, when the second input in the second direction 820 is received, an aspect ratio of the second region may be 4:3 and a size of the second region may be 8. In addition, when the input in the third direction 830 is received, an aspect ratio of the third region in the preview image 410 may be 9:16 and a size of the third region may be 4.

On the other hand, the control unit 180 may display an image having a specific enlargement ratio and corresponding to the specific region of the preview image 410.

When an image corresponding to the preview image 410 is displayed on a screen, an enlargement ratio may mean a ratio in which the preview image 410 is enlarged and displayed as the image corresponding to the preview image 410.

For example, when the size of the first region 910 in the preview image 410 is 10, the first image 1010 having a first enlargement ratio and corresponding to the first region 910 of the preview image 410 is displayed, and a size of the first image 1010 is also 10, the first enlargement ratio may be 1.

Meanwhile, the enlargement ratio may be changed based on an input received from the user. That is, the enlargement ratio is determined based on the input, and is then displayed accordingly.

Specifically, when the first input in the first direction 810 is received, the control unit 180 may display the first image 1010 in which the first region 910 is enlarged at the first enlargement ratio.

For example, when the first input in the first direction 810 is received, the control unit 180 may display the first image 1010 in which the first region 910 is enlarged at an enlargement ratio of 1.

In another example, when the second input in the second direction 820 is received, the control unit 180 may display the second image in which the first region 910 is enlarged at an enlargement ratio of 2.

On the other hand, the enlargement ratio may be a ratio in which the specific region of the preview image 410 is enlarged while an aspect ratio thereof is maintained, and is displayed on the screen as an image corresponding to the specific region.

For example, when the aspect ratio of the first region 910 in the preview image 410 is 5:2 and the first image 1010 having the first enlargement ratio and corresponding to the first region 910 of the preview image 410 is displayed, the aspect ratio of the first image 1010 may also be 5:2.

On the other hand, the enlargement ratio may be a ratio in which the specific region is enlarged while the aspect ratio thereof is maintained such that a width of an image corresponding to the specific region of the preview image 410 corresponds to a width of the screen. That is, the aspect ratio of the specific ratio in the preview image 410 may be the same as the aspect ratio of the image corresponding to the specific region.

For example, when the aspect ratio of the first region 910 in the preview image 410 is 5:2 and the first image 1010 having the first enlargement ratio and corresponding to the first region 910 of the preview image 410 is displayed, the aspect ratio of the first image 1010 may also be 5:2 and a width of the first image 1010 may be the same as the width of the screen. In this case, the first image 1010 includes a whole of the preview image 410 without excluding a left side and a right side thereof and the left side of the preview image 410 is displayed so as to contact a left side of the screen and the right side of the preview image 410 is displayed so as to contact a right side of the screen.

Meanwhile, the phrase "the width of the image corresponding to the specific region corresponds to the width of the screen" may mean that the width of the image corresponding to the specific region is the same as the width of the screen, but the present disclosure is not limited thereto. Specifically, the width of the image corresponding to the specific region may be less than the width of the screen by a preset length. For example, when the width of the screen is 8 cm, the width of the first image 1010 may be 7 cm. The first image 1010 may be displayed from a point spaced 0.5 cm apart from the left side of the screen to a point spaced 0.5 cm apart from the right side of the screen.

The aspect ratio, the size, and the enlargement ratio of the specific region have been described above as being determined according to the inputs received from the user. For example, when the input in the first direction 810 is received, the first image 1010 having the first enlargement ratio and corresponding to the first region 910 of the preview image 410 is displayed.

In this case, since the aspect ratio of the first region 910 has been determined, the first region 910 is enlarged while the aspect ratio thereof is maintained, and the width of the first image 1010 corresponds to the width of the screen, the first image 1010 may be displayed in a fixed region 1020 on the screen.

Figure 11:
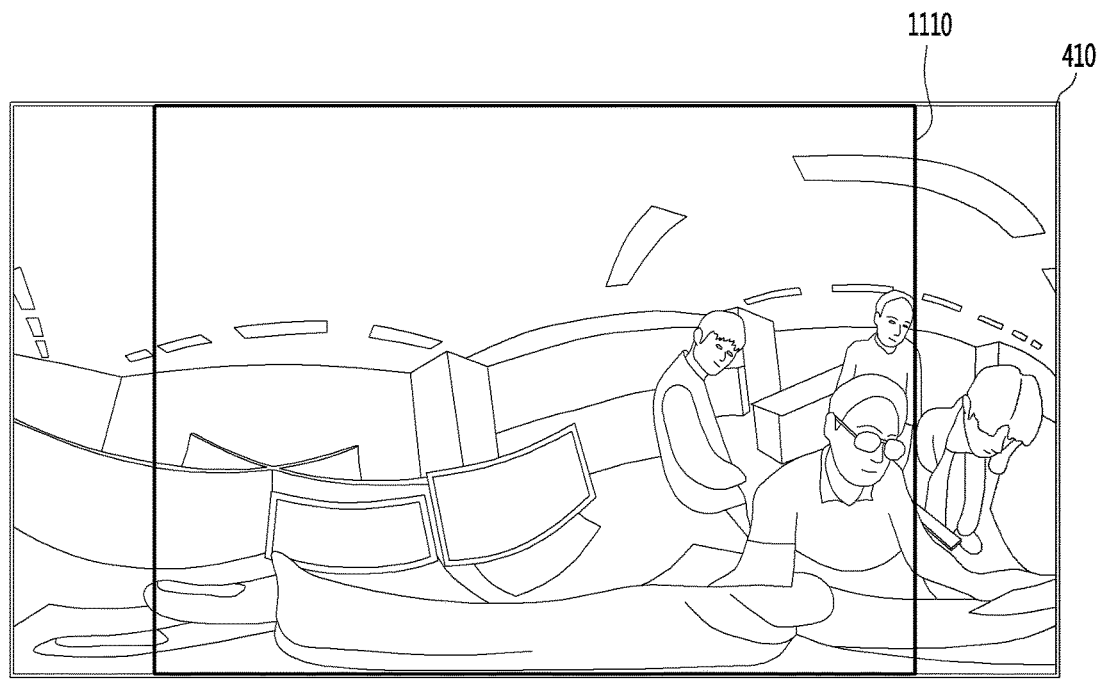
FIGS. 11 and 12 are diagrams illustrating a second image of a second region displayed according to an input in a second direction, according to an embodiment of the present disclosure.
Figure 12:
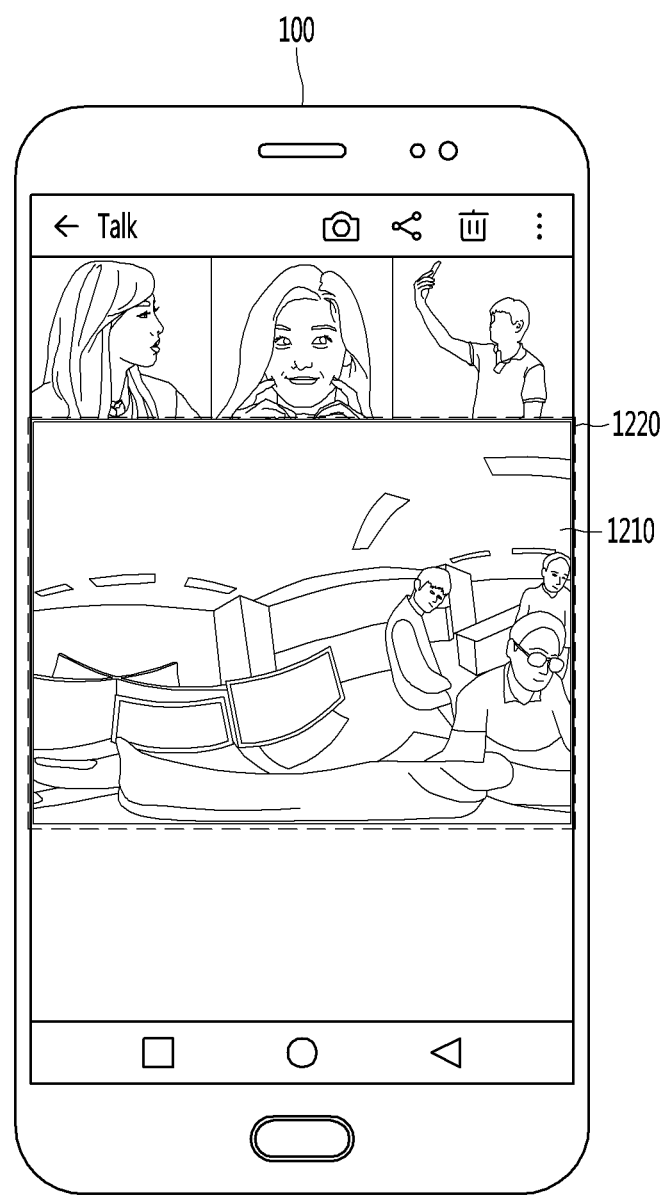

FIGS. 11 and 12 are diagrams illustrating a second image 1210 of a second region 1110 displayed according to an input in a second direction, according to an embodiment of the present disclosure.

Referring to FIGS. 11 and 12, when a second input in the second direction is received, the control unit 180 may display the second image 1210 corresponding to the second region 1110 of a preview image 410. That is, a specific region may be the second region 1110 and an image corresponding to the specific region may be the second image 1210 corresponding to the second region 1110.

The second region 1110 may be a region contacting an upper side and a lower side of the preview image 410.

Meanwhile, a position of the second region 1110 in the preview image 410 may be placed at a center of the preview image 410, but is not limited thereto.

On the other hand, when the second input in the second direction is received, an aspect ratio of the second region 1110 may be set to a specific ratio and a size of the second region 1110 may be set to a specific size.

For example, when the second input in the second direction is received, the aspect ratio of the second region 1110 in the preview image 410 may be 4:3 and the size of the second region 1110 may be 8.

Meanwhile, when the second input in the second direction is received, the control unit 180 may display the second image 1210 having a second enlargement ratio and corresponding to the second region 1110 of the review image 410.

Specifically, when the second input in the second direction is received, the control unit 180 may display the second image 1210 in which the second region 1110 is enlarged at the second enlargement ratio.

For example, when the second input in the second direction is received, the control unit 180 may display the second image 1210 in which the second region 1110 is enlarged at an enlargement ratio of 1.5. That is, the size of the second region 1110 may be 8 and a size of the second image 1210 having the second enlargement ratio and corresponding to the second region 1110 may be 12.

On the other hand, the second enlargement ratio may be a ratio in which the second region 1110 of the preview image 410 is enlarged while the aspect ratio thereof is maintained, and is displayed on a screen as the second image 1210 corresponding to the second region 1110.

For example, when the aspect ratio of the second region 1110 in the preview image 410 is 4:3 and the second image 1210 having the second enlargement ratio and corresponding to the second region 1110 of the preview image 410 is displayed, the aspect ratio of the second image 1210 may also be 4:3.

On the other hand, the second enlargement ratio may be a ratio in which the second region 1110 is enlarged while the aspect ratio thereof is maintained such that a width of the second image 1210 corresponding to the second region 1110 of the preview image 410 corresponds to a width of the screen.

For example, when the aspect ratio of the second region 1110 in the preview image 410 is 4:3 and the second image 1210 having the second enlargement ratio and corresponding to the second region 1110 of the preview image 410 is displayed, the aspect ratio of the second image 1210 may also be 4:3 and the width of the second image 1210 may be the same as the width of the screen. In this case, a left side of the second image 1210 is displayed so as to contact a left side of the screen and a right side of the second image 1210 is displayed so as to contact a right side of the screen.

Meanwhile, when the second input in the second direction is received, the second image 1210 having the second enlargement ratio and corresponding to the second region 1110 of the preview image 410 is displayed.

In this case, since the aspect ratio of the second region 1110 has been determined, the second region 1110 is enlarged while the aspect ratio thereof is maintained, and the width of the second image 1210 corresponds to the width of the screen, the second image 1210 may be displayed in a fixed region 1220 on the screen.

Figure 13:
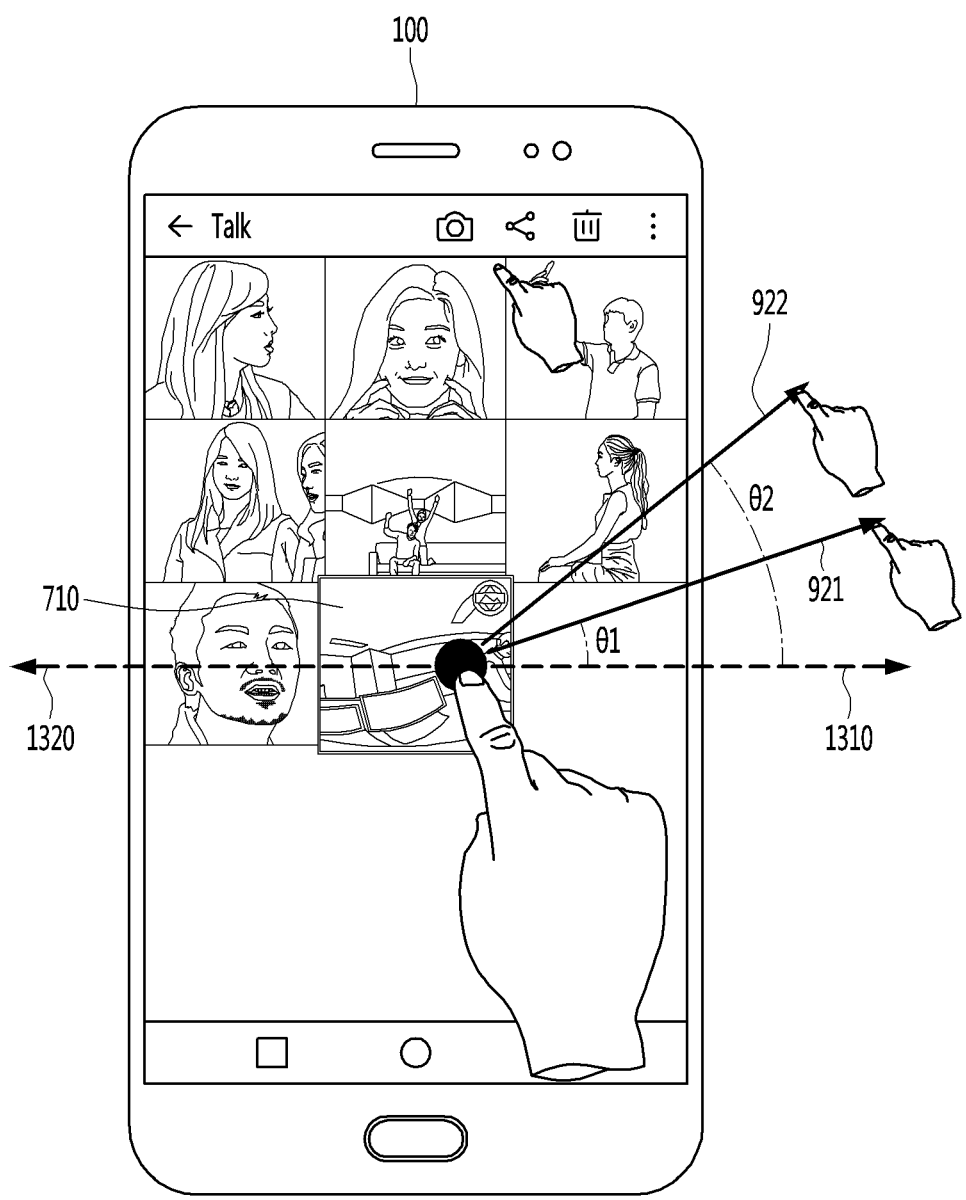
FIG. 13 is a diagram illustrating a horizontal angle and a horizontal direction of an input in a second direction according to an embodiment of the present disclosure.

FIG. 13 is a diagram illustrating a horizontal angle and a horizontal direction of an input in a second direction according to an embodiment of the present disclosure.

The control unit 180 may acquire information on the horizontal direction of the second direction.

Specifically, the horizontal direction of the second direction may include a first direction 1310 and a second direction 1320. When the input in the second direction is received, the control unit 180 may acquire the information on the horizontal direction of the second direction.

For example, the control unit 180 may acquire information on that a horizontal direction of each of an input 921 in a $(2\text{-}1)^{th}$ direction and an input 922 in a $(2\text{-}2)^{th}$ direction is the first direction 1310.

Meanwhile, the control unit 180 may acquire information on the horizontal angle of the second direction.

Specifically, when the input in the second direction is received, the control unit 180 may acquire information on the horizontal angle of the input in the second direction.

For example, the control unit 180 may acquire information on that a horizontal angle of the input 921 in the $(2\text{-}1)^{th}$ direction is θ1. In another example, the control unit 180 may acquire information on that a horizontal angle of the input 922 in the $(2\text{-}2)^{th}$ direction is θ2.

A second region and a second enlargement ratio may be changed based on the horizontal angle of the input in the second direction. That is, the second region and the second enlargement ratio are determined based on the horizontal angle of the input in the second direction, and are then displayed accordingly.

This will be described in detail with reference to FIGS. 14 and 15.

Figure 14:
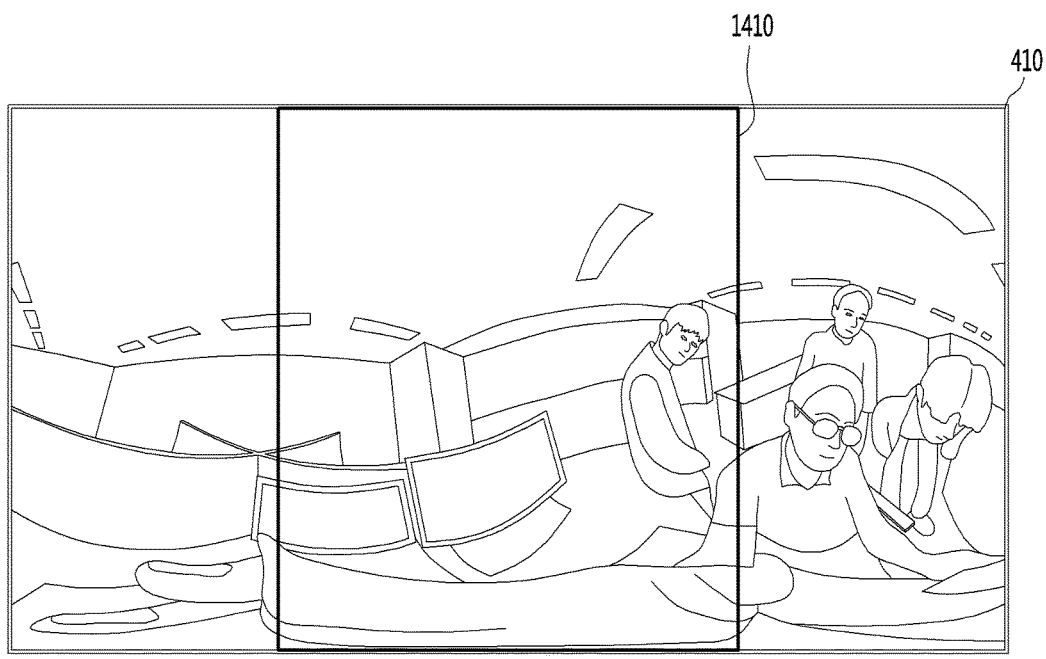
FIGS. 14 and 15 are diagrams illustrating a second region and a second enlargement ratio changed according to a horizontal angle of an input in a second direction, according to an embodiment of the present disclosure.
Figure 15:
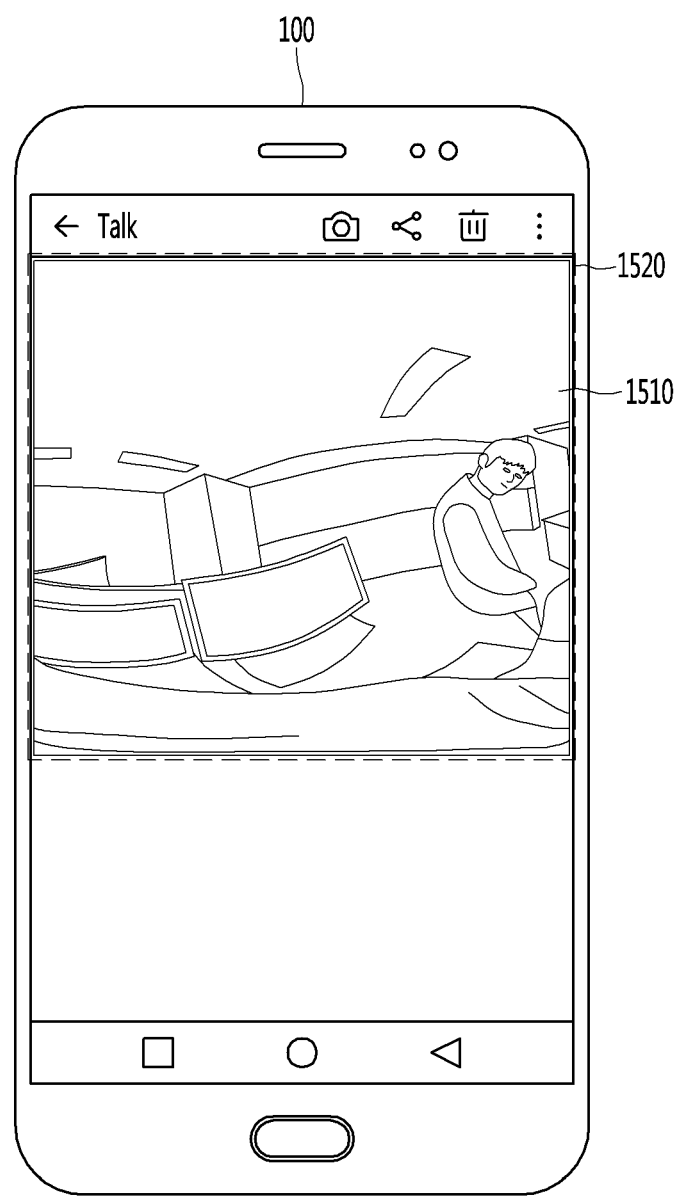

FIGS. 14 and 15 are diagrams illustrating a second region and a second enlargement ratio changed according to a horizontal angle of an input in a second direction, according to an embodiment of the present disclosure.

Here, descriptions will be provided with reference to FIGS. 11, 12, 14, and 15.

The embodiment illustrated in FIGS. 11 and 12 may be an embodiment applied when the input 921 in the $(2\text{-}1)^{th}$ direction is received, and the embodiment of FIGS. 14 and 15 may be an embodiment applied when the second input 922 in the $(2\text{-}2)^{th}$ direction is received.

Referring to FIGS. 11 and 12, when a second input 921 in the $(2\text{-}1)^{th}$ direction is received, the control unit 180 may display the second image 1210 corresponding to a $(2\text{-}1)^{th}$ region 1110 of a preview image 410. That is, a specific region may be the $(2\text{-}1)^{th}$ 1110 and an image corresponding to the specific region may be the second image 1210 corresponding to the $(2\text{-}1)^{th}$ region 1110.

Referring to FIGS. 14 and 15, when a second input 922 in the $(2\text{-}2)^{th}$ direction is received, the control unit 180 may display a second image 1510 corresponding to a $(2\text{-}2)^{th}$ region 1410 of the preview image 410. That is, a specific region may be the $(2\text{-}2)^{th}$ 1410 and an image corresponding to the specific region may be the second image 1510 corresponding to the $(2\text{-}2)^{th}$ region 1410.

The $(2\text{-}2)^{th}$ region 1410 may be a region contacting an upper side and a lower side of the preview image 410.

Meanwhile, a position of the $(2\text{-}2)^{th}$ region 1410 in the preview image 410 may be placed at a center of the preview image 410, but is not limited thereto.

On the other hand, when the second input in the second direction is received, the aspect ratio of the second region 1110 may be set to a specific ratio and a size of the second region 1110 may be set to a specific size.

In addition, the aspect ratio and the size of the second region may be set to a specific ratio and a specific size based on a horizontal angle of the second direction, respectively.

For example, referring to FIGS. 11 and 12, when the second input 921 in the $(2\text{-}1)^{th}$ direction is received, the aspect ratio of the $(2\text{-}1)^{th}$ region 1110 in the preview image 410 may be 4:3 and the size of the $(2\text{-}1)^{th}$ region 1110 may be 8.

In another example, referring to FIGS. 14 and 15, when the second input 922 in the $(2\text{-}2)^{th}$ direction is received, the aspect ratio of the $(2\text{-}2)^{th}$ region 1410 in the preview image 410 may be 1:1 and the size of the $(2\text{-}2)^{th}$ region 1410 may be 6.

Meanwhile, the control unit 180 may display the second image having a second enlargement ratio and corresponding to the second region of the review image 410 based on the horizontal angle of the second direction.

Specifically, when the second input 921 in the $(2\text{-}1)^{th}$ direction is received, the control unit 180 may display the second image 1210 in which the $(2\text{-}1)^{th}$ region 1110 is enlarged at a $(2\text{-}1)^{th}$ enlargement ratio.

For example, when the second input 921 in the $(2\text{-}1)^{th}$ direction is received, the control unit 180 may display the second image 1210 in which the $(2\text{-}1)^{th}$ region 1110 is enlarged at an enlargement ratio of 1.5. In this case, a size of the $(2\text{-}1)^{th}$ region 1110 may be 8 and a size of the second image 1210 having the $(2\text{-}1)^{th}$ enlargement ratio and corresponding to the $(2\text{-}1)^{th}$ region 1110 may be 12.

In addition, when the second input 922 in the $(2\text{-}2)^{th}$ direction is received, the control unit 180 may display the second image 1510 in which the $(2\text{-}2)^{th}$ region 1410 is enlarged at a $(2\text{-}2)^{th}$ enlargement ratio.

For example, when the second input 922 in the $(2\text{-}2)^{th}$ direction is received, the control unit 180 may display the second image 1510 in which the $(2\text{-}2)^{th}$ region 1410 is enlarged at an enlargement ratio of 3. In this case, a size of the $(2\text{-}2)^{th}$ region 1410 may be 6 and a size of the second image 1510 having the $(2\text{-}2)^{th}$ enlargement ratio and corresponding to the $(2\text{-}2)^{th}$ region 1410 may be 18.

On the other hand, the $(2\text{-}2)^{th}$ enlargement ratio may be a ratio in which the $(2\text{-}2)^{th}$ region 1410 of the preview image 410 is enlarged while the aspect ratio thereof is maintained, and is displayed on the screen as the second image 1510 corresponding to the (2-2)$^{th}$ region 1410.

For example, when the aspect ratio of the (2-2)$^{th}$ region 1410 in the preview image 410 is 1:1 and the second image 1510 having the (2-2)$^{th}$ enlargement ratio and corresponding to the (2-2)$^{th}$ region 1410 of the preview image 410 is displayed, the aspect ratio of the second image 1510 may also be 1:1.

On the other hand, the (2-2)$^{th}$ enlargement ratio may be a ratio in which the (2-2)$^{th}$ region 1410 is enlarged while the aspect ratio thereof is maintained such that a width of the second image 1510 corresponding to the (2-2)$^{th}$ region of the preview image 410 corresponds to a width of the screen.

For example, when the aspect ratio of the (2-2)$^{th}$ region 1410 in the preview image 410 is 1:1 and the second image 1510 having the (2-2)$^{th}$ enlargement ratio and corresponding to the (2-2)$^{th}$ region 1410 of the preview image 410 is displayed, the aspect ratio of the second image 1510 may also be 1:1 and the width of the second image 1510 may be the same as the width of the screen.

Meanwhile, when the second input 922 in the (2-2)$^{th}$ direction is received, the second image 1510 having the (2-2)$^{th}$ enlargement ratio and corresponding to the (2-2)$^{th}$ region 1410 of the preview image 410 is displayed.

In this case, since the aspect ratio of the (2-2)$^{th}$ region 1410 has been determined, the (2-2)$^{th}$ region 1410 is enlarged while the aspect ratio thereof is maintained, and the width of the second image 1510 corresponds to the width of the screen, the second image 1510 may be displayed in a fixed region 1520 on the screen.

Meanwhile, in the aforementioned embodiments, when the image corresponding to the specific region of the preview image 410 is displayed, the specific region of the preview image 410 has been described as being placed at the center of the preview image 410.

However, the present disclosure is not limited thereto, and a position of the specific region of the preview image 410 may be changed based on the horizontal direction of the second direction.

This will be described in detail with reference to FIGS. 16 to 17.

Figure 16:
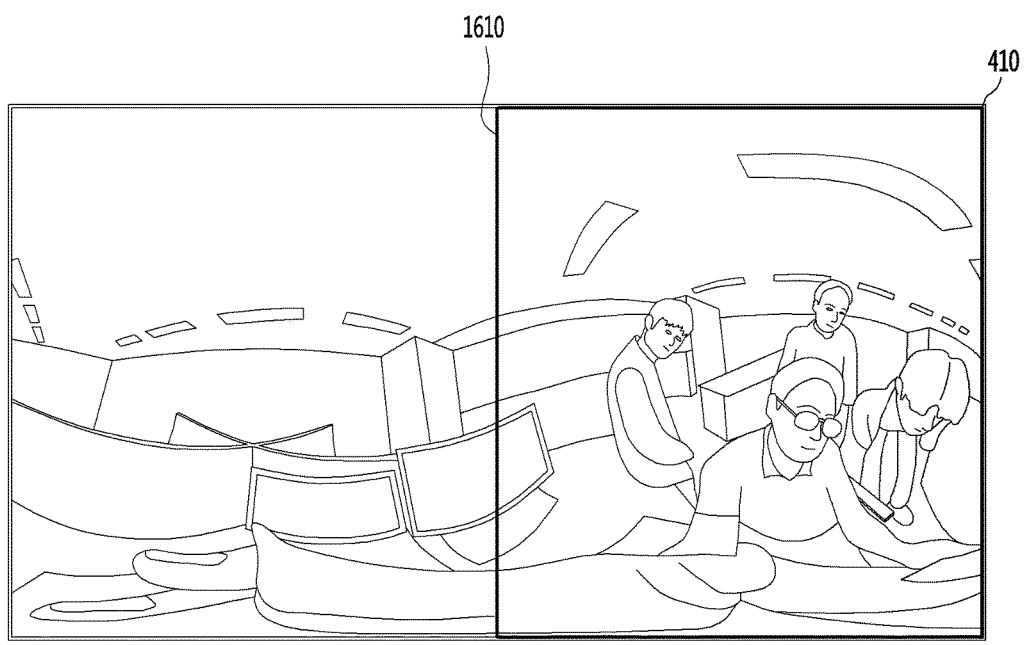
FIGS. 16 and 17 are diagrams illustrating a method of changing a specific region of a preview image based on a second direction, according to an embodiment of the present disclosure.
Figure 17:
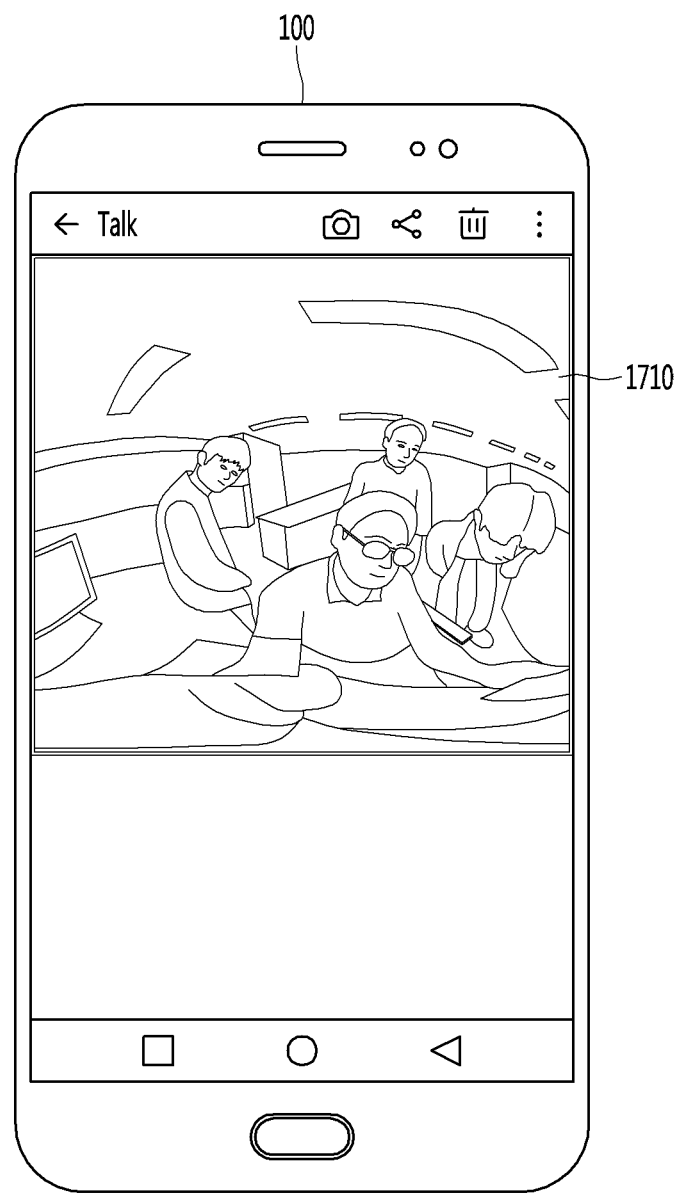

FIGS. 16 and 17 are diagrams illustrating a method of changing a specific region of a preview image 410 based on a second direction, according to an embodiment of the present disclosure.

In a state in which a thumbnail image corresponding to a partial region 610 of the preview image 410 in an omnidirectionally captured image is displayed, when a second input in the second direction is received, the control unit 180 may display a second image 1710 corresponding to a second region 1610 of the preview image 410.

The second region 1610 may be a region which is moved from the partial region 610 in a direction corresponding to a horizontal direction of the second direction.

For example, as shown in FIG. 6, when the partial region 610 of the preview image 410 is placed at the center of the preview image 410 and the horizontal direction of the second direction is a right direction, the second region 1610 may be a region which is moved from the partial region 610 in the horizontal direction of the second direction, i.e., the right direction.

In this case, the second region 1610 may be moved from the partial region 610 in a direction corresponding to the horizontal direction of the second direction by a length of an input in the second direction. In another example, the second region 1610 may be moved from the partial region 610 in the direction corresponding to the horizontal direction of the second direction by a length of the horizontal direction in the input in the second direction.

Figure 18:
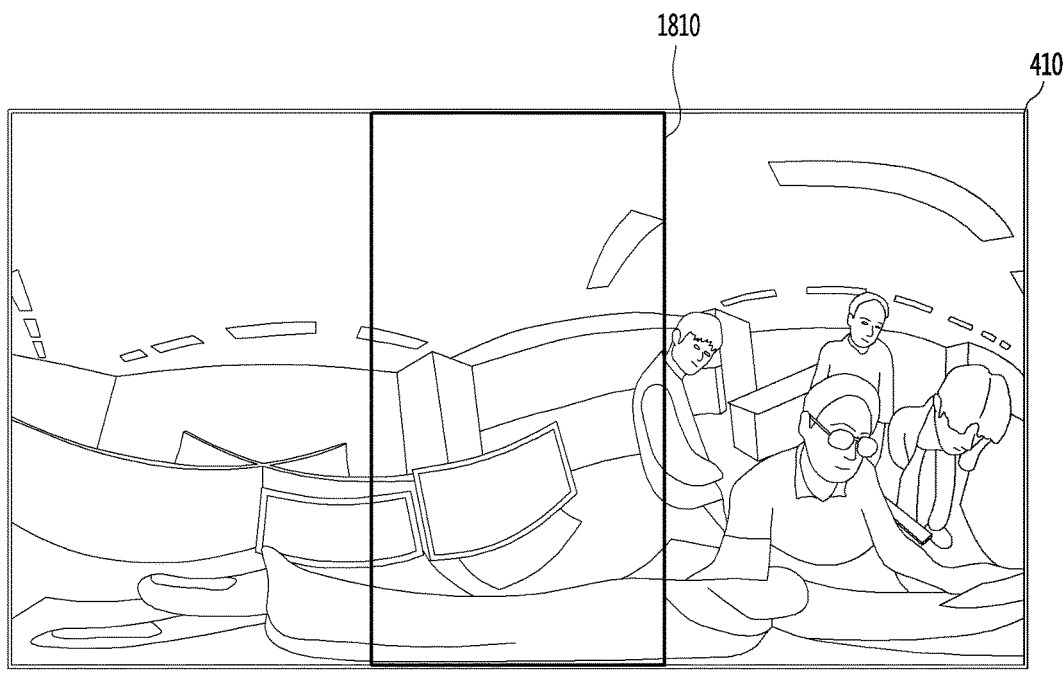
FIGS. 18 and 19 are diagrams illustrating a third image of a third region displayed according to an input in a third direction, according to an embodiment of the present disclosure.
Figure 19:
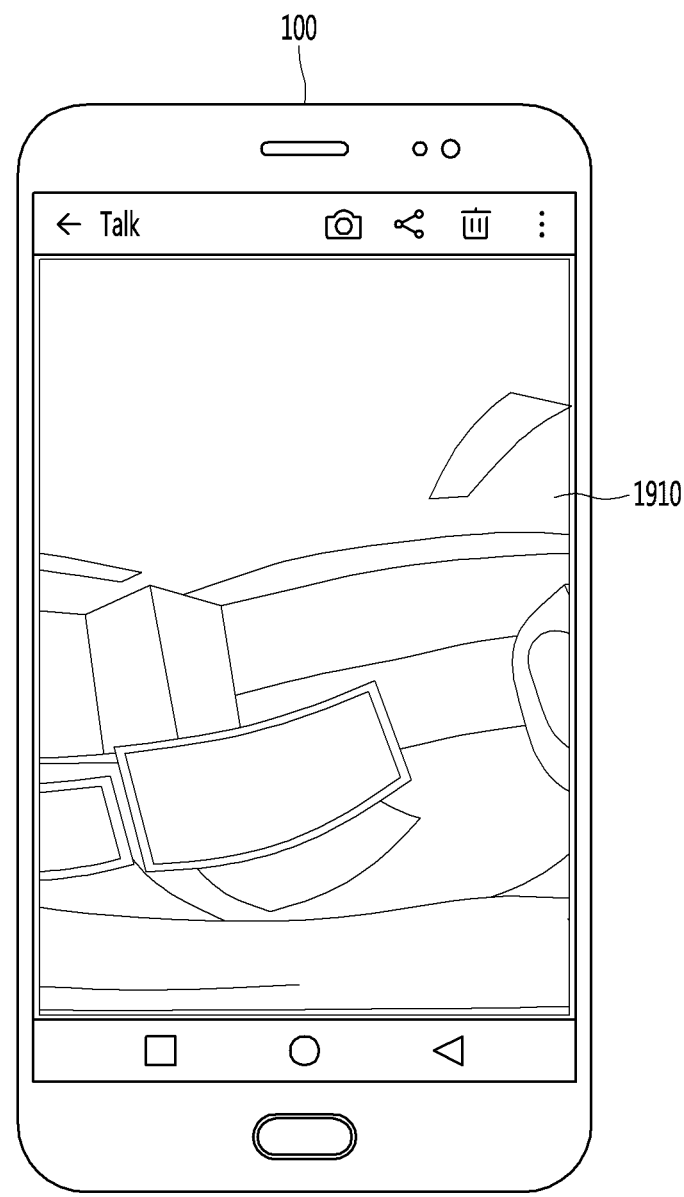

FIGS. 18 and 19 are diagrams illustrating a third image 1910 of a third region 1810 displayed according to an input in a third direction, according to an embodiment of the present disclosure.

Referring to FIGS. 18 and 19, when a third input in the third direction is received, the control unit 180 may display the third image 1910 corresponding to the third region 1810 of a preview image 410. That is, a specific region may be the third region 1810 and an image corresponding to the specific region may be the third image 1910 corresponding to the third region 1810.

The third region 1810 may be a region contacting an upper side and a lower side of the preview image 410.

Meanwhile, a position of the third region 1810 in the preview image 410 may be placed at a center of the preview image 410, but is not limited thereto.

On the other hand, when the third input in the third direction is received, an aspect ratio of the third region 1810 may be set to a specific ratio and a size of the third region 1810 may be set to a specific size.

For example, when the third input in the third direction is received, the aspect ratio of the third region 1810 in the preview image 410 may be 9:16 and the size of the third region 1810 may be 4.

On the other hand, when the third input in the third direction is received, the control unit 180 may display the third image 1910 having a third enlargement ratio and corresponding to the third region 1810 of a preview image 410.

Specifically, when the third input in the third direction is received, the control unit 180 may display the third image 1910 in which the third region 1810 is enlarged at the third enlargement ratio.

For example, when the third input in the third direction is received, the control unit 180 may display the third image 1910 in which the third region 1810 is enlarged at an enlargement ratio of 6. In this case, the size of the third region 1810 may be 4 and a size of the third image 1910 having the third enlargement ratio and corresponding to the third region 1810 may be 24.

On the other hand, the third enlargement ratio may be a ratio in which the third region 1810 of the preview image 410 is enlarged while the aspect ratio thereof is maintained, and is displayed on a screen as the third image 1910 corresponding to the third region 1810.

For example, when the aspect ratio of the third region 1810 in the preview image 410 is 9:16 and the third image 1910 having the third enlargement ratio and corresponding to the third region 1810 of the preview image 410 is displayed, the aspect ratio of the third image 1910 may also be 9:16.

That is, an aspect ratio of the specific region in the preview image 410 may be the same as an aspect ratio of the image corresponding to the specific range of the preview image 410.

On the other hand, the third enlargement ratio may be a ratio in which the third region 1810 is enlarged while the aspect ratio thereof is maintained such that a width of the third image 1910 corresponding to the third region 1810 of the preview image 410 corresponds to a width of the screen.

For example, when the aspect ratio of the third region 1810 in the preview image 410 is 9:16 and the third image 1910 having the third enlargement ratio and corresponding to the third region 1810 of the preview image 410 is displayed, the aspect ratio of the third image 1910 may also be 16:9 and the width of the third image 1910 may be the same as the width of the screen.

On the other hand, the third enlargement ratio may be a ratio in which the third region 1810 is enlarged while the aspect ratio thereof is maintained such that a height of the third image 1910 corresponding to the third region 1810 of the preview image 410 corresponds to a height of the screen.

For example, when the aspect ratio of the third region 1810 in the preview image 410 is 9:16 and the third image 1910 having the third enlargement ratio and corresponding to the third region 1810 of the preview image 410 is displayed, the aspect ratio of the third image 1910 may also be 16:9 and the height of the third region 1810 may be the same as the height of the screen.

Meanwhile, the phrase "a height of the image corresponding to the specific region corresponds to the width of the screen" may mean that the height of the image corresponding to the specific region is the same as the height of the screen, but the present disclosure is not limited thereto. Specifically, the height of the image corresponding to the specific region may be less than the height of the screen by a preset length. For example, when the height of the screen is 15 cm, the height of the third image 1910 may be 14 cm. The third image 1910 may be displayed from a point spaced 0.5 cm apart from an upper side of the screen to a point spaced 0.5 cm apart from a lower side of the screen.

Meanwhile, when the third input in the third direction is received, the third image 1910 having the third enlargement ratio and corresponding to the third region 1810 of the preview image 410 is displayed.

In this case, since the aspect ratio of the third region 1810 has been determined, the third region 1810 is enlarged while the aspect ratio thereof maintained, and the width of the third image 1910 corresponds to the width of the screen, the third image 1910 may be displayed in a fixed region on the screen.

Meanwhile, the image corresponding to the specific region may be changed based on a dragging input. For example, when an image corresponding to a first region is displayed and the dragging input is received, the control unit 180 may display an image corresponding to a second region placed in a direction of the dragging input from the first region.

According to the present disclosure as described above, a user may confirm other regions except for a region which is currently displayed as a thumbnail.

In addition, according to the present disclosure, the user may display a preview image of an omnidirectionally captured image at various enlargement ratios.

Furthermore, according to the present disclosure, in spite of various inputs of the user, since a left side and a right side of the preview image are displayed so as to contact a left side and a right side of a screen, it is possible to implement the preview image unified and displayed to a maximum size.

Figure 20:
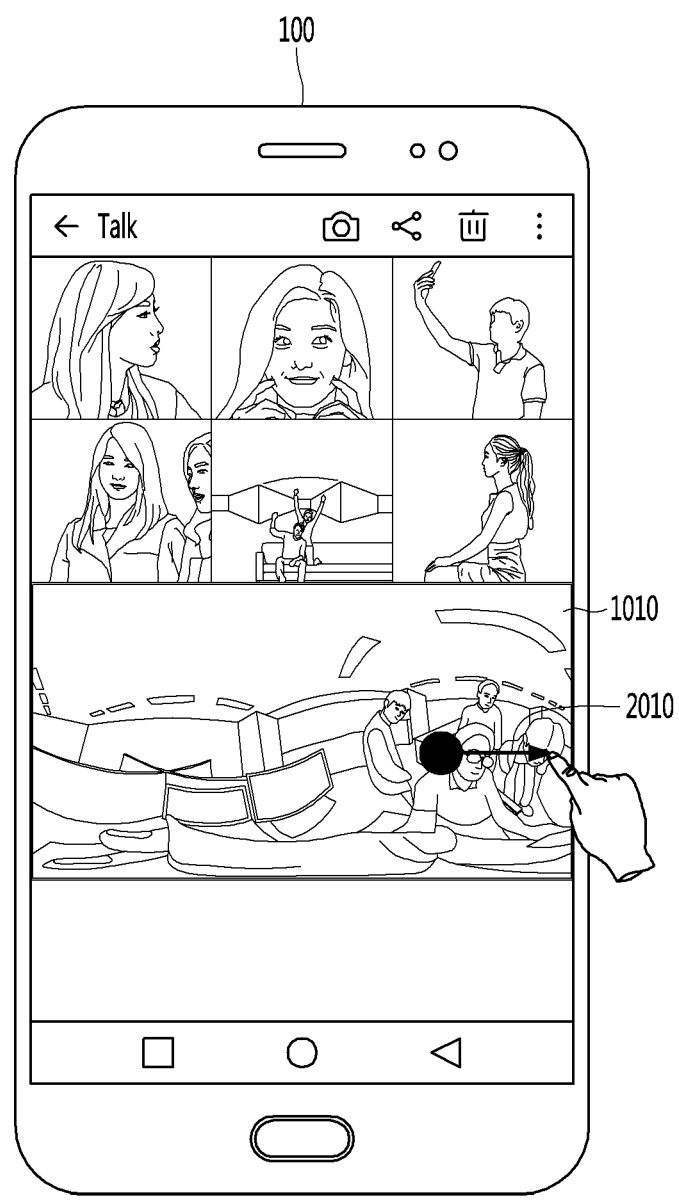
FIGS. 20 to 22 are diagrams illustrating a method of enlarging and displaying a left side or a right side of a preview image in a state in which a first image is displayed, according to an embodiment of the present disclosure.
Figure 21:
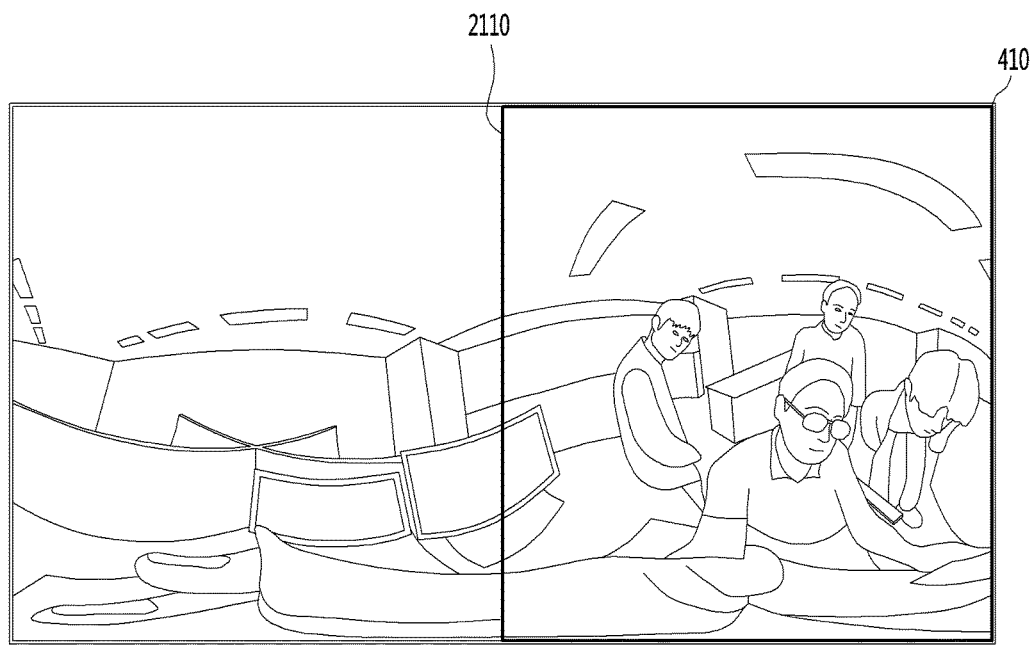
Figure 22:
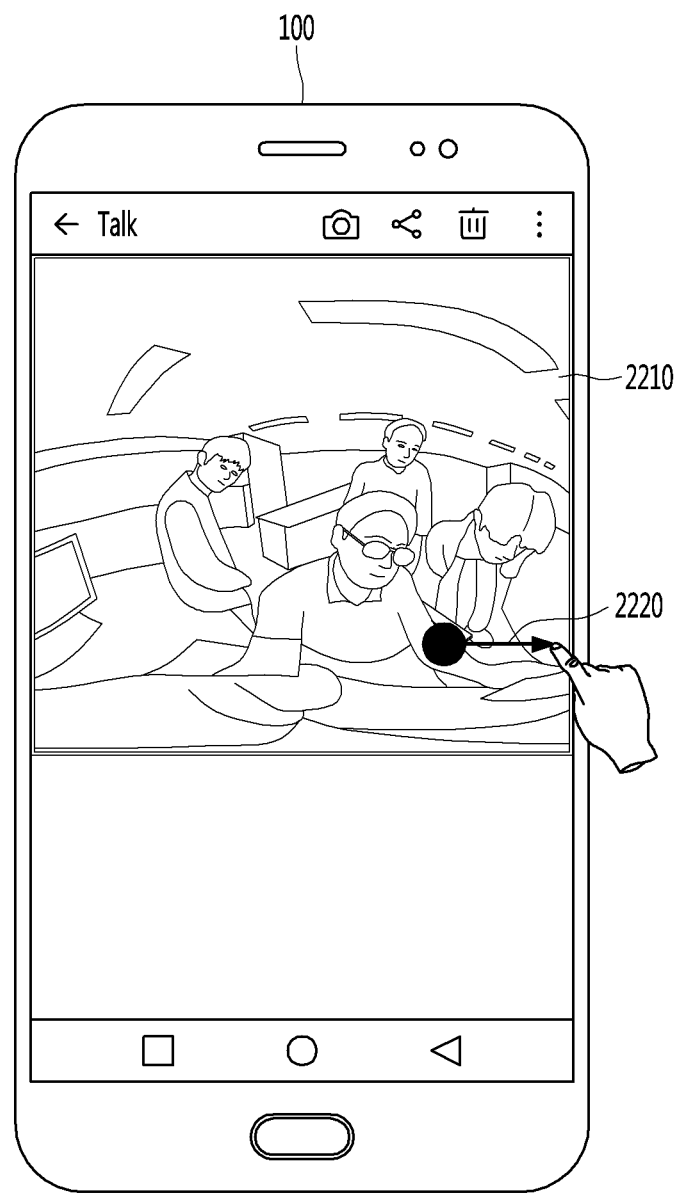

FIGS. 20 to 22 are diagrams illustrating a method of enlarging and displaying a left side or a right side of a preview image 410 in a state in which a first image 1010 is displayed, according to an embodiment of the present disclosure.

As shown in FIG. 20, the control unit 180 may receive a fourth input 2010 in the state in which the first image 1010 is displayed at a first enlargement ratio.

On the other hand, when the fourth input 2010 is received, the control unit 180 may display a fourth image 2210 having a second enlargement ratio higher than the first enlargement ratio and corresponding to the fourth region 2110 of the preview image 410.

The contents of the second region 1110 described with reference to FIGS. 11 and 12 may be applied to the fourth region 2110.

In addition, the fourth region 2110 may be a region which contacts an upper side and a lower side of the preview image 410 and is placed on a rightmost side or a leftmost side of the preview image 410.

For example, when a direction of the fourth input 2010 is a right direction, the fourth region 2110 may be a region placed on the rightmost side of the preview image 410. In another example, when a direction of the fourth input 2010 is a left direction, the fourth region 2110 may be a region placed on the leftmost side of the preview image 410.

On the other hand, the second enlargement ratio may be a ratio in which the fourth region 2110 is enlarged while an aspect ratio thereof is maintained such that a width of the fourth image 2210 corresponds to a width of a screen. The contents of the second enlargement ratio described with reference to FIGS. 11 and 12 may be applied to the second enlargement ratio of the present embodiment.

Meanwhile, the control unit 180 may receive a fifth input 2220 in the state in which the fourth image 2210 is displayed at the second enlargement ratio.

Figure 23:
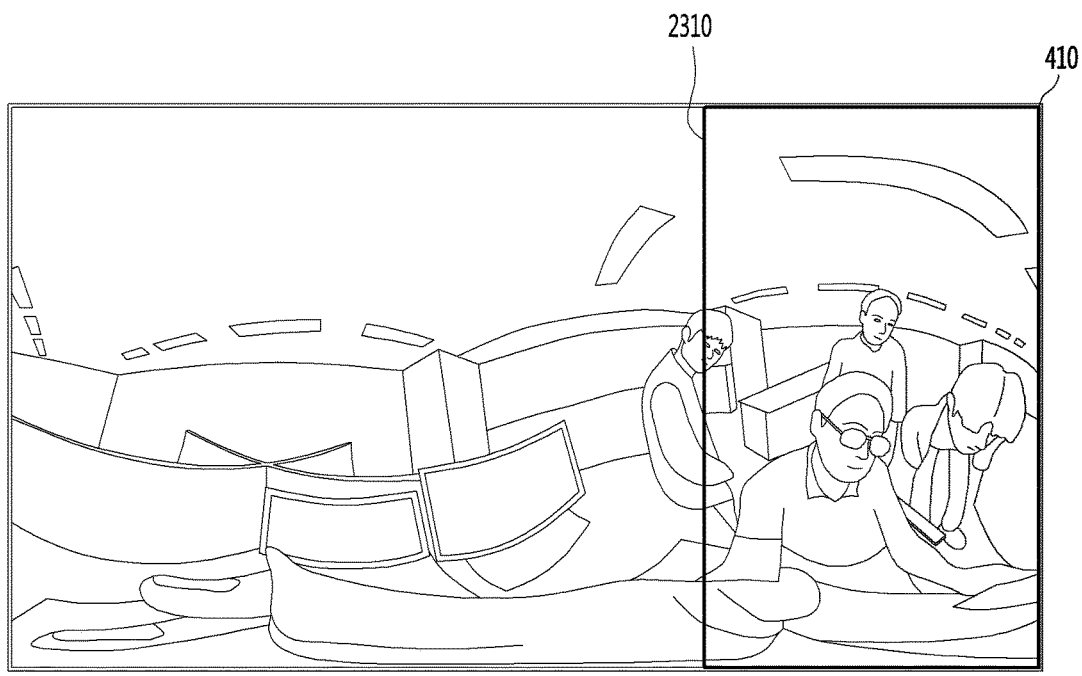
FIGS. 23 and 24 are diagrams illustrating a method of enlarging and displaying a fourth image in a state in which the fourth image is displayed, according to an embodiment of the present disclosure.
Figure 24:
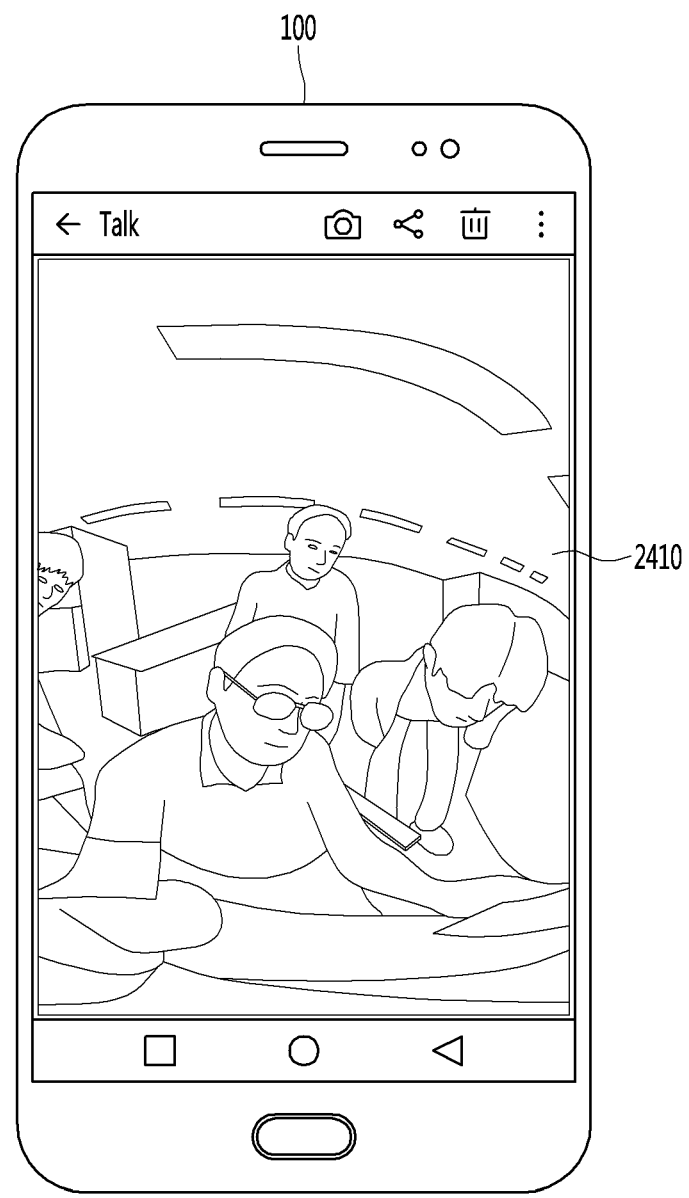

FIGS. 23 and 24 are diagrams illustrating a method of enlarging and displaying a fourth image in a state in which the fourth image is displayed, according to an embodiment of the present disclosure.

Meanwhile, when the fifth input 2220 is received, as shown in FIGS. 23 and 24, the control unit 180 may display a fifth image 2410 having a third enlargement ratio higher than the second enlargement ratio and corresponding to a fifth region 2310 of a preview image 410.

The contents of the third region 1810 described with reference with FIGS. 18 and 19 may be applied to the fifth region 2310.

In addition, the fifth region 2310 may be a region which contacts an upper side and a lower side of the preview image 410 and is placed on a rightmost side or a leftmost side of the preview image 410.

For example, when the fourth region corresponding to the fourth image is a region placed on the rightmost side of the preview image 410, the fifth region 2310 may be a region placed on the rightmost side of the preview image 410. In another example, when the fourth region corresponding to the fourth image is a region placed on the leftmost side of the preview image 410, the fifth region 2310 may be a region placed on the leftmost side of the preview image 410.

On the other hand, the third enlargement ratio may be a ratio in which the fifth region 2310 is enlarged while an aspect ratio thereof is maintained such that a width and a height of the fifth image 2410 respectively correspond to a width and a height of a screen. The contents of the third enlargement ratio described with reference to reference with FIGS. 18 and 19 may be applied to the third enlargement ratio of the present embodiment.

According to the present disclosure as described above, a user may view a wide region of a preview image to a small size or enlarge and view a narrow region thereof through various inputs.

On the other hand, processes of FIGS. 20 to 24 may be omitted and the fifth image 2410 having the third enlargement ratio may be displayed.

This will be described with reference to FIG. 25.

Figure 25:
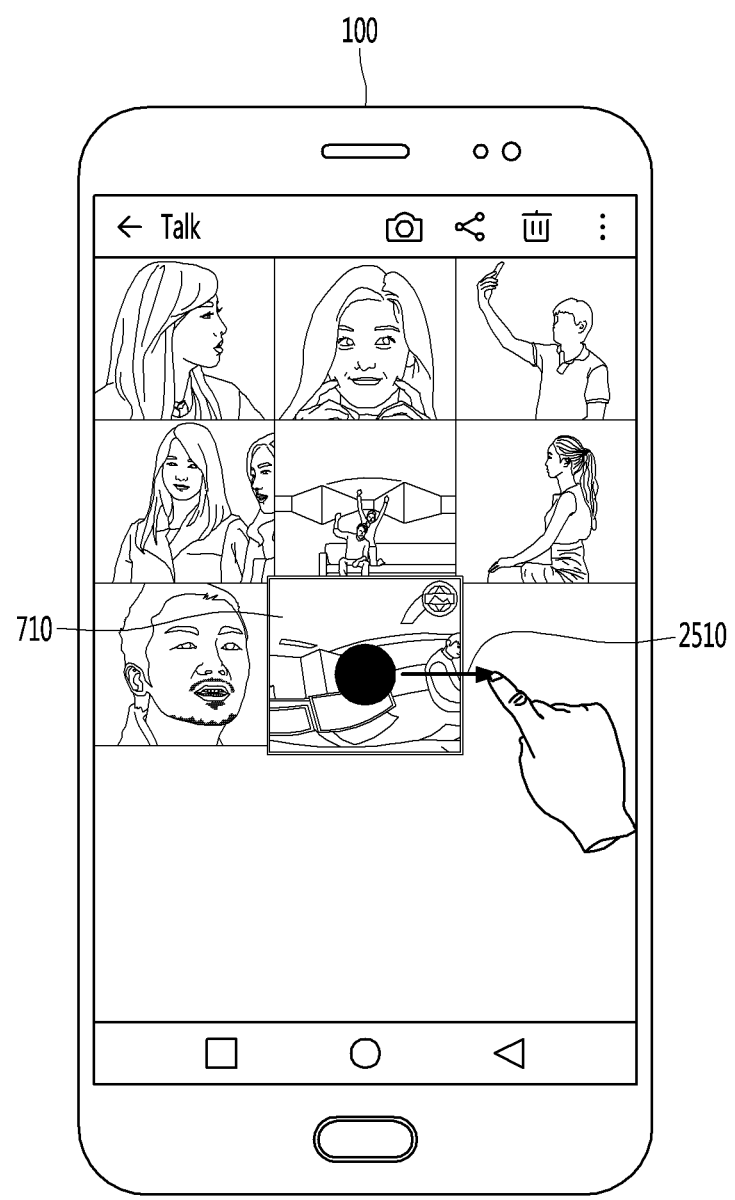
FIG. 25 is a diagram illustrating a method of displaying a fifth image in a state in which a thumbnail image is displayed, according to an embodiment of the present disclosure.

FIG. 25 is a diagram illustrating a method of displaying a fifth image in a state in which a thumbnail image 710 is displayed, according to an embodiment of the present disclosure.

As shown in FIG. 25, the control unit 180 may receive a sixth input 2510 in the state in which the thumbnail image 710 corresponding to a partial region of a preview image 410 is displayed. The sixth input 2510 may be an input of pressing and holding the thumbnail image 710 and dragging the thumbnail image 710 in a first direction.

Meanwhile, when the sixth input 2510 is received, as shown in FIGS. 23 and 24, the control unit 180 may display the fifth image 2410 having the third enlargement ratio higher than the second enlargement ratio and corresponding to the fifth region 2310 of the preview image 410.

Figure 26:
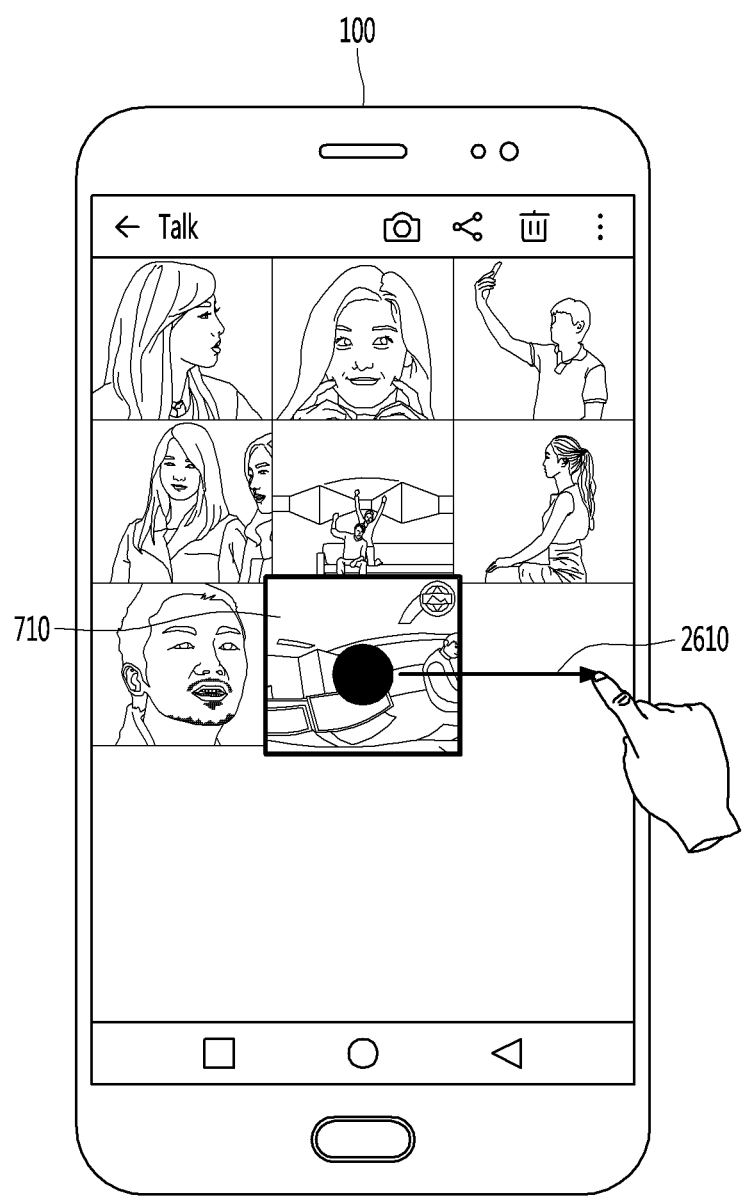
FIGS. 26 to 28 are diagrams illustrating a method of displaying an image corresponding to a specific region, according to an embodiment of the present disclosure.
Figure 27:
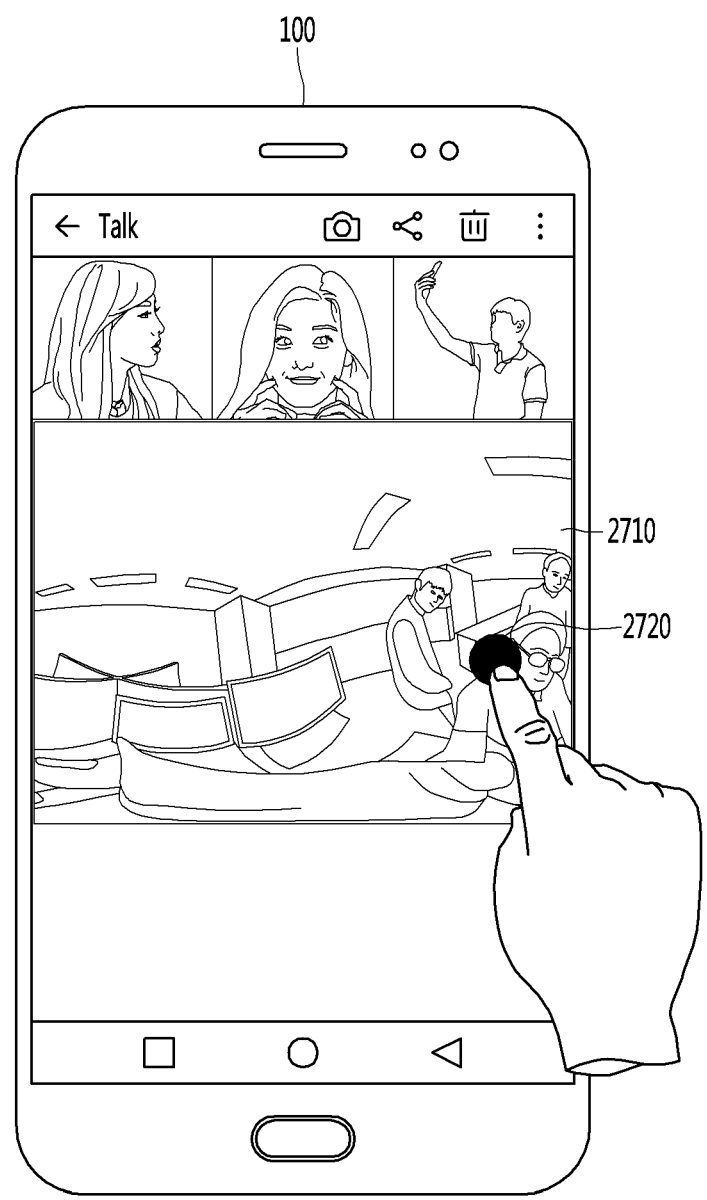
Figure 28:
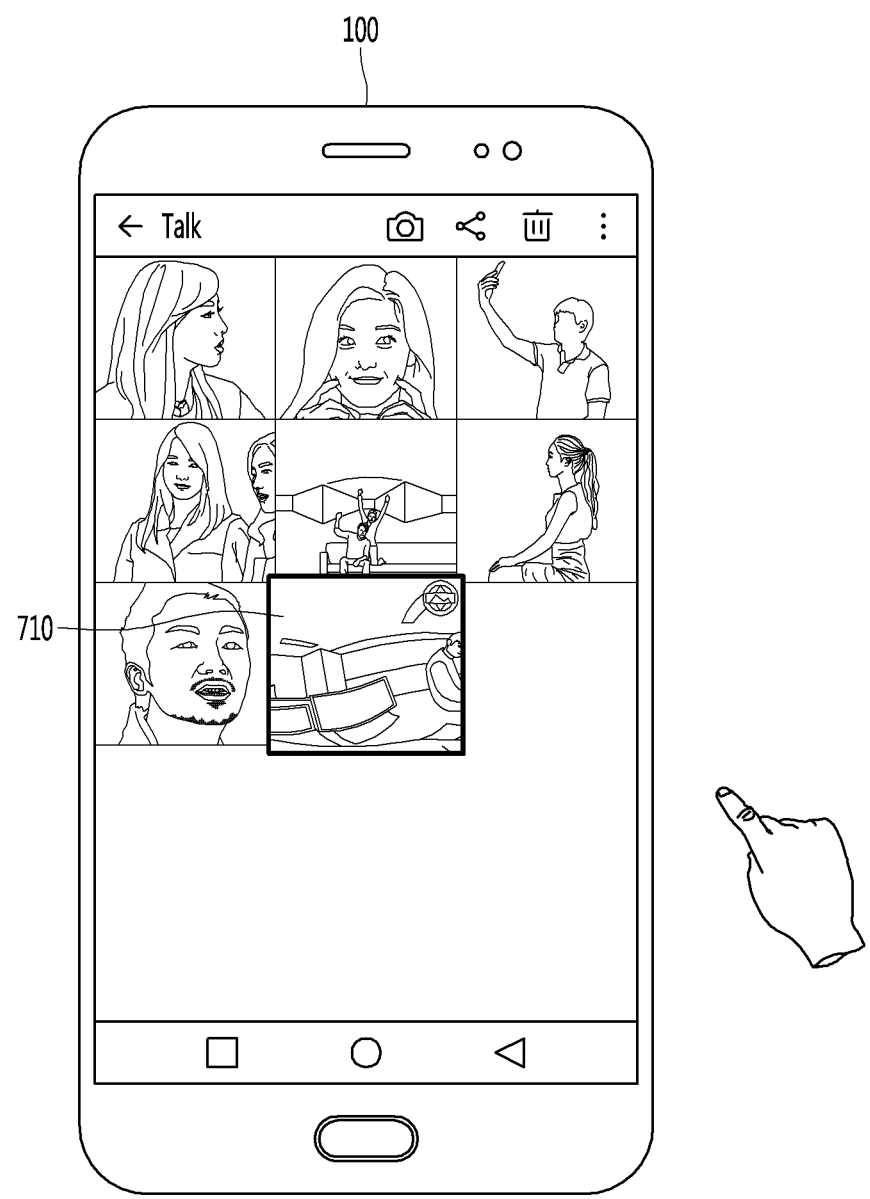

FIGS. 26 to 28 are diagrams illustrating a method of displaying an image corresponding to a specific region, according to an embodiment of the present disclosure.

The control unit 180 may display the image corresponding to the specific region of a preview image while an input is received from a user.

For example, as shown in FIG. 26, when a first input 2610 for selecting a thumbnail image 710 and dragging the thumbnail image 710 in a first direction is received, the control unit 180 may display a first image 2720 corresponding to a first region. In addition, while the first input 2610, that is, a touch is maintained, the control unit 180 may display the first image 2720 corresponding to the first region.

Meanwhile, when an input is released, the control unit 180 may end the display of the image corresponding to the specific region of the preview image. In addition, the control unit 180 may display a gallery.

For example, as shown in FIG. 28, when a touch is ended, the control unit 180 may ends a display of an image 2710 corresponding to the specific region.

According to the present disclosure as described above, a user viewing a gallery may simply check a preview image, and then, end the preview image without entering an omnidirectional display mode so as to view an original image.

Meanwhile, when the first input 2610 is released, the case where the display of the image 2710 is ended and the gallery is displayed again has been described with reference to FIGS. 26 to 28. However, the preset disclosure is not limited thereto, and when the first input 2610 is released, a method of displaying an omnidirectional captured image corresponding to a selected thumbnail in an omnidirectional display mode may be implemented.

This will be described with reference to FIG. 29.

Figure 29:
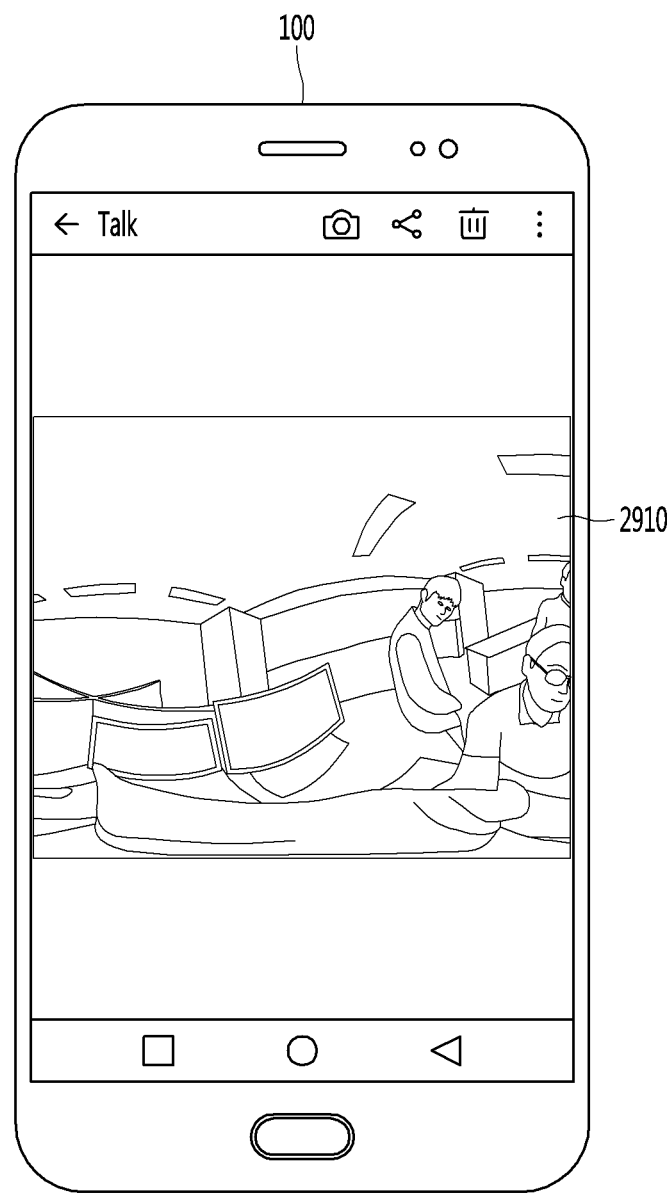
FIG. 29 is a diagram illustrating a method of displaying an omnidirectionally captured image corresponding to a thumbnail image in an omnidirectional display mode, according to an embodiment of the present disclosure.

FIG. 29 is a diagram illustrating a method of displaying an omnidirectionally captured image 2910 corresponding to a thumbnail image 710 in an omnidirectional display mode, according to an embodiment of the present disclosure.

The first input 2610 in FIGS. 26 to 28 may be an input maintained for a preset time. For example, the first input 2610 may be an input of maintaining a touch for the preset time.

Meanwhile, when the first input 2610 is received and maintained for a time less than the preset time, the control unit 180 may display the omnidirectionally captured image 2910 corresponding to the thumbnail image 710 in the omnidirectional display mode.

Figure 30:
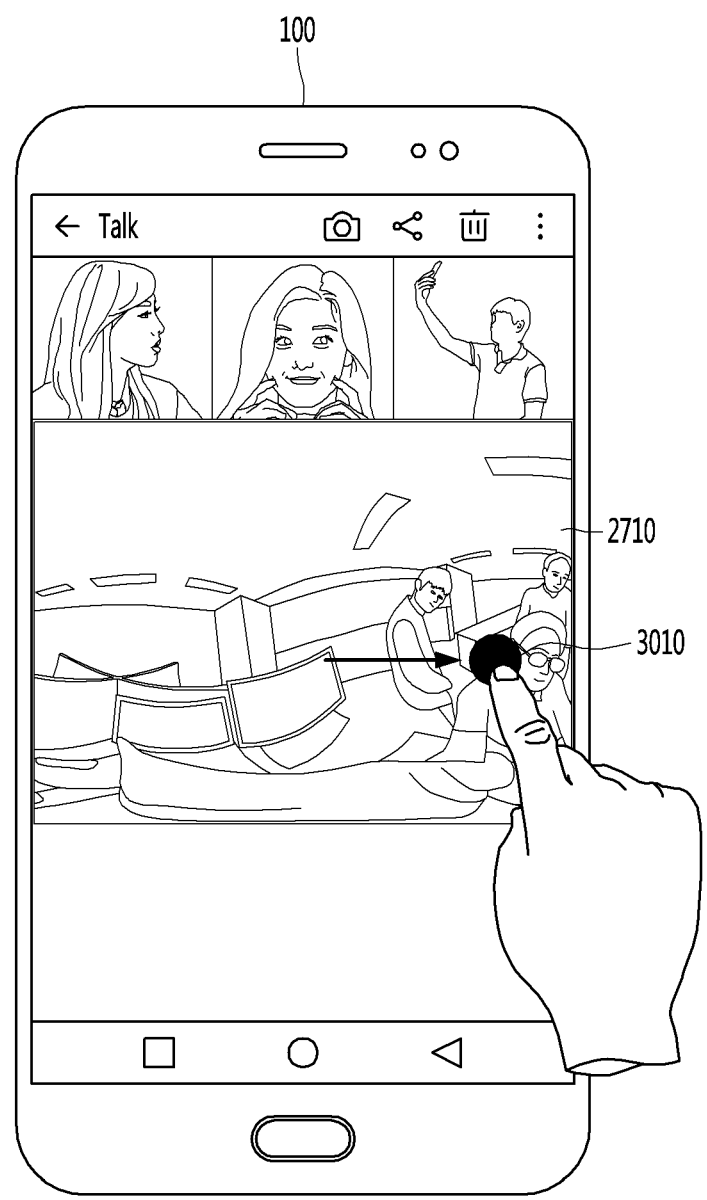
FIGS. 30 and 31 are diagrams illustrating a method of maintaining an image corresponding to a specific region, according to an embodiment of the present disclosure.
Figure 31:
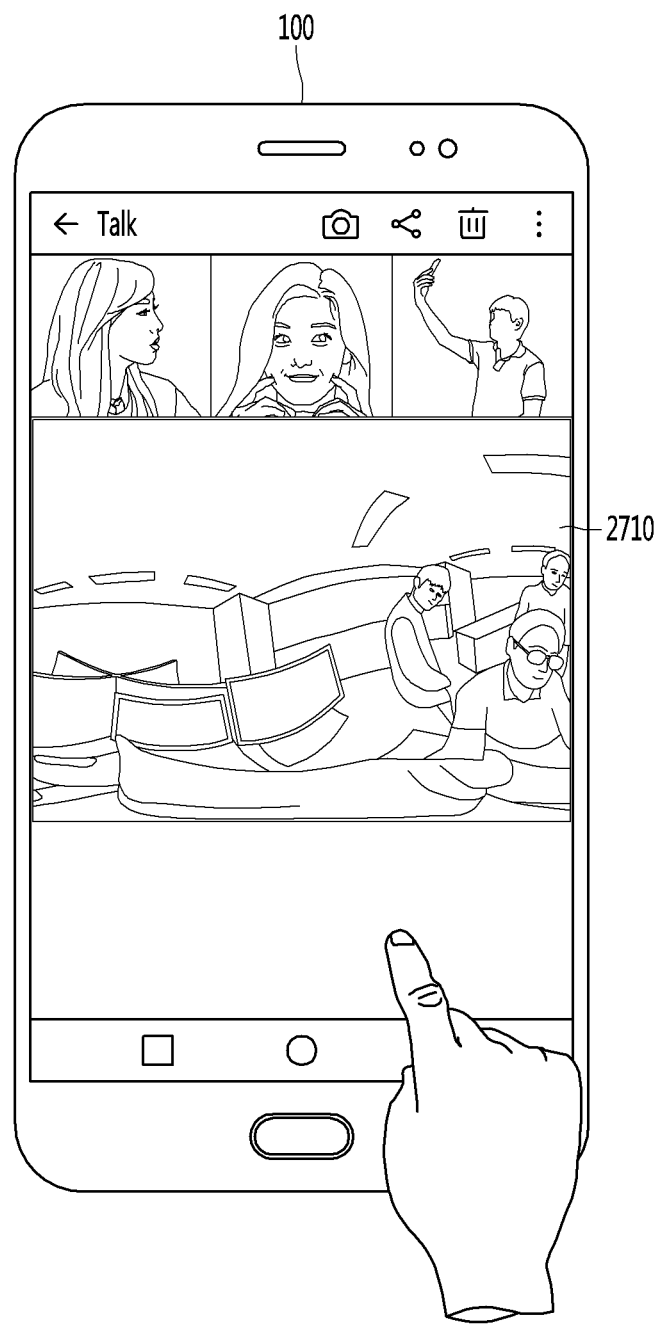

FIGS. 30 and 31 are diagrams illustrating a method of maintaining an image corresponding to a specific region, according to an embodiment of the present disclosure.

When an input of maintaining the image corresponding to the specific region is received in a state in which the image corresponding to the specific region is displayed, the control unit 180 may maintain the image corresponding to the specific region.

For example, when the first input 2610 is received as shown in FIG. 26, an input 3010 for a force touch is received in a state in which a touch is maintained as shown in FIG. 30, and then, the first input 2610 is released, as shown in FIG. 31, the control unit 180 continuously display a first image 2710 without ending the display of the first image 2710.

According to the present disclosure as described above, a user may remove or continuously display a preview image according to the user's own selection.

FIGS. 32 to 38 are diagrams illustrating a method of changing a display region and an enlargement ratio in a direction of a touch input while maintaining the touch input, according to an embodiment of the present disclosure.

Figure 32:
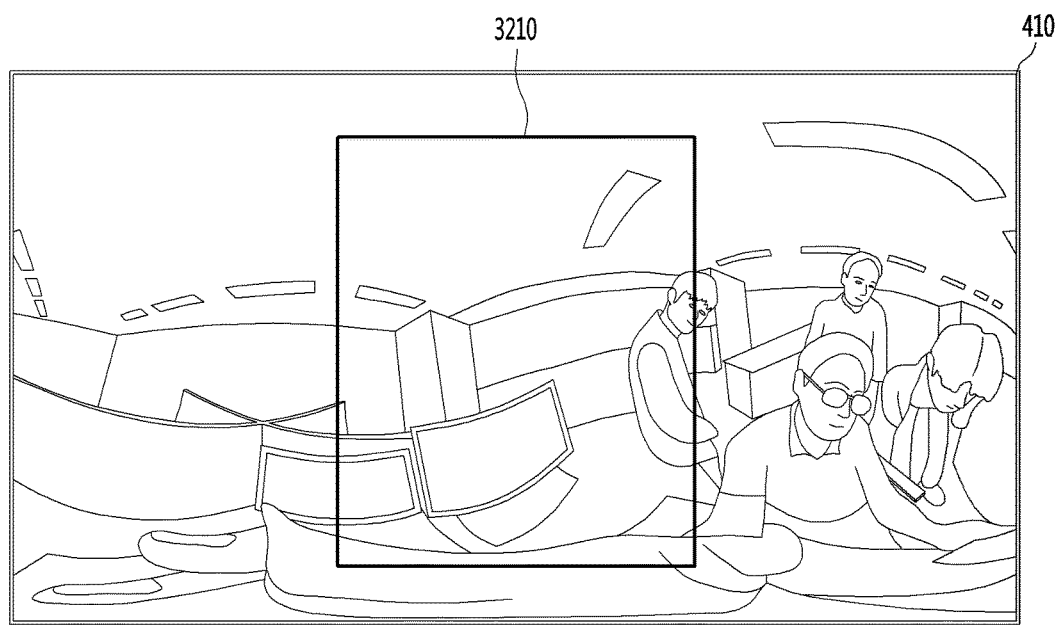
FIGS. 32 to 38 are diagrams illustrating a method of changing a display region and an enlargement ratio according in a direction of a touch input while maintaining the touch input, according to an embodiment of the present disclosure.
Figure 33:
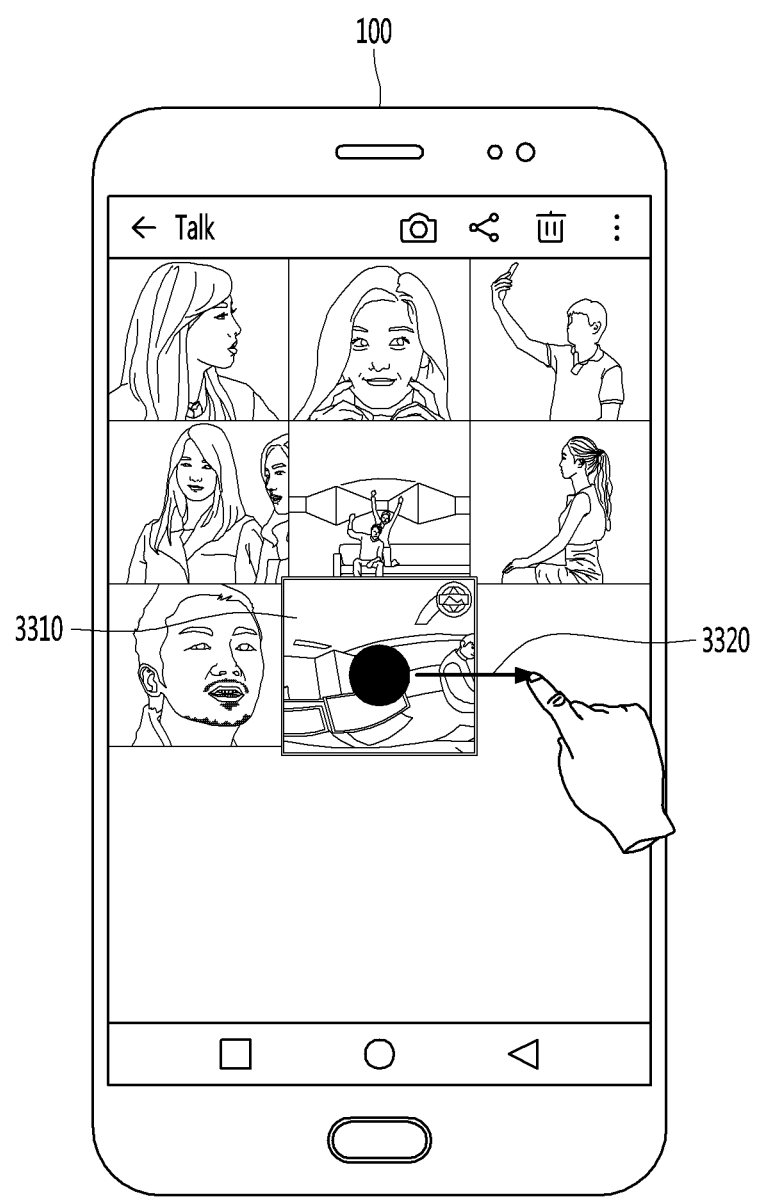

Referring to FIGS. 32 and 33, a thumbnail image 3310 corresponding to a partial region 3210 of a preview image 410 is displayed.

Meanwhile, the control unit 180 may receive a seventh input 3320 in a first direction. The seventh input 3320 in the first direction may be an input of selecting the thumbnail image 3310 and dragging the thumbnail image 3310 in the first direction.

Figure 34:
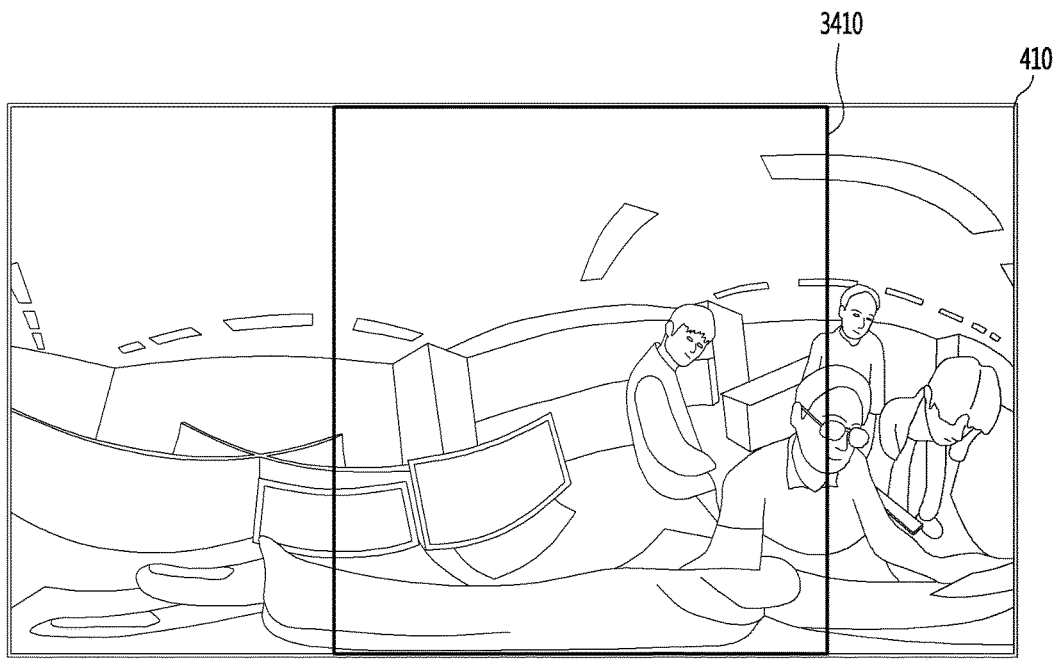
Figure 35:
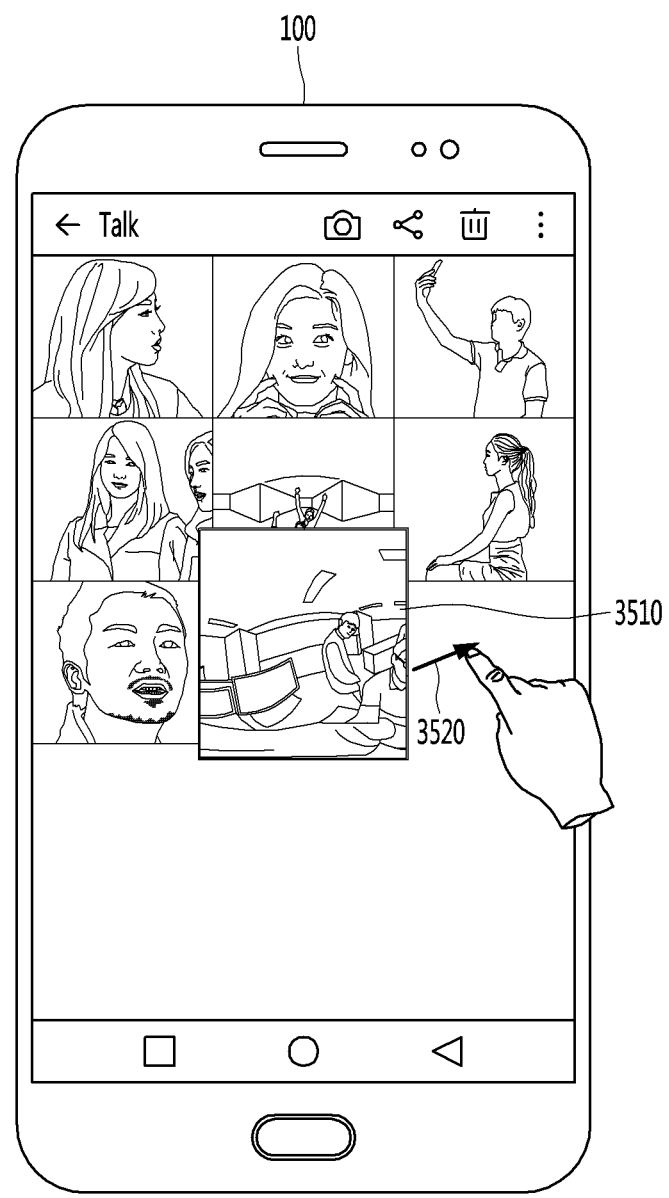

Referring to FIGS. 34 and 35, when the seventh input 3320 in the first direction is received, the control unit 180 may display a sixth image 3510 having a fourth enlargement ratio and corresponding to a sixth region 3410 of the preview image 410.

The sixth region 3410 may be a region contacting an upper side and a lower side of the preview image 410.

In addition, the sixth region 3410 may be a region further including a region which has a length corresponding to a length of the seventh input 3320 in the first direction from the partial region 3210. For example, when the seventh input 3320 in the first direction is moved in a right direction by 2, the sixth region 3410 may be further include a right region which has a length of 4 corresponding to 2 from the partial region 3210.

On the other hand, when the seventh input 3320 in the first direction is received, an aspect of the sixth region 3410 may be set to a specific ratio and a size of the sixth region 3410 may be set to a specific size. The aspect ratio and the size of the sixth region 3410 may be changed according to the length of the seventh input 3320. In other words, the aspect ratio and the size of the sixth region are determined based on the length of the seventh input, and are then displayed accordingly. For example, when the length of the seventh input 3320 in the first direction is a first length, the aspect ratio and the size of the sixth region 3410 may be 4:3 and 10, respectively. In another example, when the length of the seventh input 3320 in the first direction is a second length longer than the first length, the aspect ratio and the size of the sixth region 3410 may be 4:4 and 12, respectively.

Meanwhile, when the seventh input 3320 in the first direction is received, the control unit 180 may display the sixth image 3510 having the fourth enlargement ratio and corresponding to the sixth region 3410 of the preview image 410.

Specifically, when the seventh input 3320 in the first direction is received, the control unit 180 may display the sixth image 3510 in which the sixth region 3410 is enlarged at the fourth enlargement ratio.

On the other hand, the fourth enlargement ratio may be a ratio in which the sixth region 3410 of the preview image 410 is enlarged while the aspect ratio thereof is maintained, and is displayed on a screen as the sixth image 3510 corresponding to the sixth region 3410.

For example, when the aspect ratio of the sixth region 3410 in the preview image 410 is 5:4 and the sixth image 3510 having the fourth enlargement ratio and corresponding to the sixth region 3410 of the preview image 410 is displayed, the aspect ratio of the sixth image 3510 may also be 5:4.

On the other hand, the control unit 180 may receive an eighth input 3520 in a second direction in the state in which the sixth image 3510 is displayed. The eighth input 3520 in the second direction may be a consecutive input from the seventh input 3320 in the first direction. For example, the seventh input 3320 in the first direction may be an input of touching an image, and then, dragging the image in a right direction, and the eighth input 3520 in the second direction may be an input of dragging the image in a right upper end direction in a state in which a touch is maintained.

Figure 36:
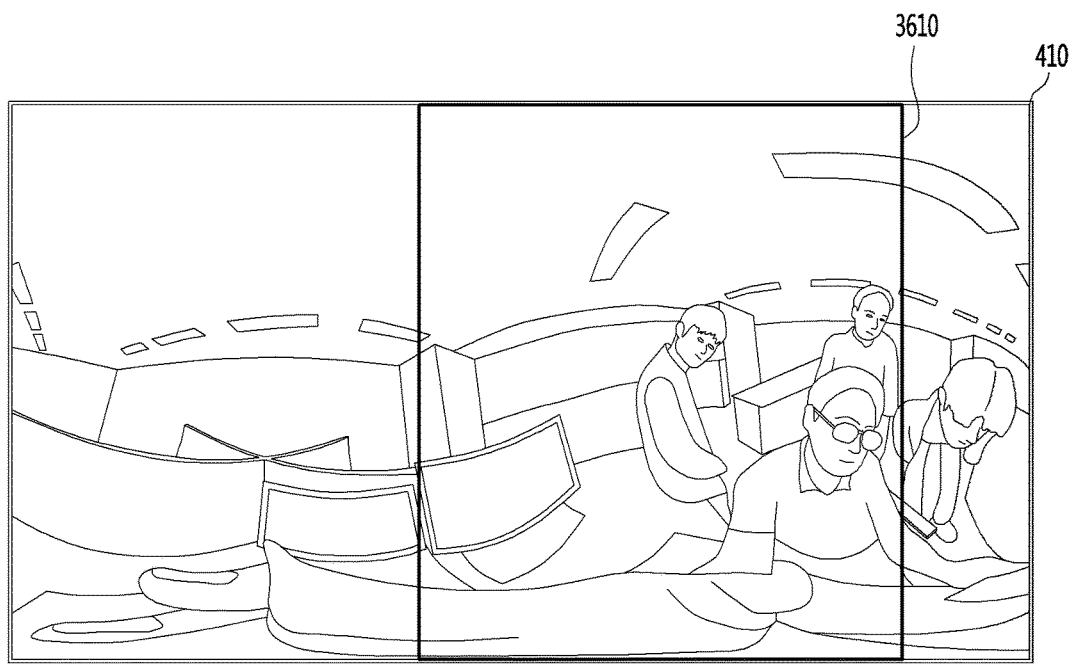
Figure 37:
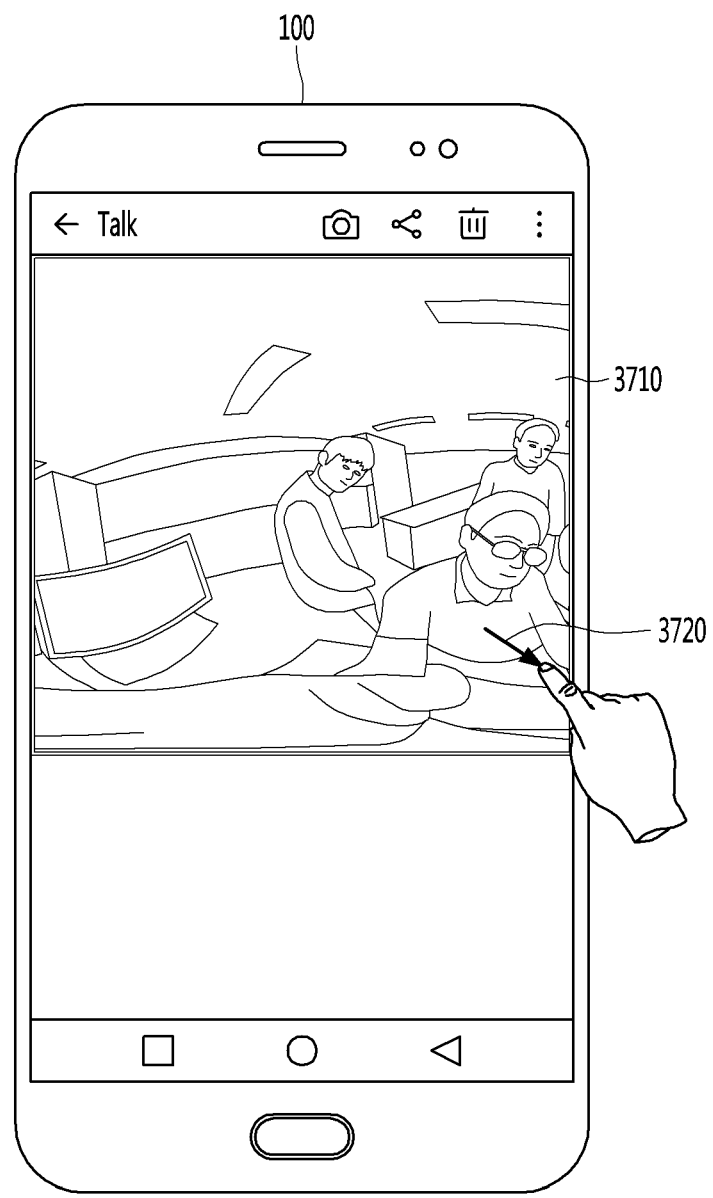

Referring to FIGS. 36 and 37, when the eighth input 3520 in the second direction is received, the control unit 180 may acquire information on a horizontal direction and a horizontal angle of the second direction and display a seventh image 3710 having a second enlargement ratio and corresponding to a seventh region 3610 of the preview image 410.

Since a method of acquiring the information on the horizontal direction and the horizontal angle of the second direction has been described above, detailed descriptions thereof will be omitted.

In addition, the contents of the second region described with reference to reference with FIGS. 11 and 12 may be applied to the seventh region 3610 described in the present embodiment.

On the other hand, the seventh region 3610 may be a region which contacts an upper side and a lower side of the preview image 410 and is moved in a direction corresponding to the horizontal direction of the second direction.

For example, when the horizontal direction of the second direction is a right direction, the seventh region 3610 may be placed in a region moved to a right side from the sixth region 3410. In addition, a distance, in which the seventh region 3610 is moved from the sixth region 3410, may correspond to a length of the eighth input 3520.

Furthermore, the contents of the second enlargement ratio described with reference to FIGS. 11 and 12 may be applied to the second enlargement ratio described in the present embodiment. For example, the second enlargement ratio described in the present embodiment may be a ratio in which the seventh region 3610 is enlarged while an aspect ratio thereof is maintained.

Meanwhile, the seventh region 3610 and the second enlargement ratio may be changed based on the horizontal angle of the second input. That is, the seventh region and the second enlargement ratio are determined based on the horizontal angle of the second input, and are then displayed accordingly. Descriptions of FIGS. 14 and 15 may equally apply to the present embodiment.

For example, when the eighth input 3520 is the input in the $(2-1)^{th}$ direction, the seventh image 3710 having the $(2-1)^{th}$ enlargement ratio and corresponding to a $(7-1)^{th}$ region. When the eighth input 3520 is the input in the $(2-2)^{th}$ direction, the seventh image 3710 having the $(2-2)^{th}$ enlargement ratio and corresponding to a $(7-2)^{th}$ region.

On the other hand, when the eighth input 3520 in the second direction is received, the control unit 180 may display the seventh image 3710 having the second enlargement ratio and corresponding to the seventh region 3610.

Meanwhile, the control unit 180 may receive an input 3720 in a specific direction in the state in which the seventh image 3710 is displayed. The input 3720 in the specific direction may be a consecutive input from the eighth input 3520 in the second direction. For example, the eighth input 3520 in the second direction may be an input of dragging an image in a right upper end direction, and the input 3720 in the specific direction may be an input of dragging the image in a right lower end direction in a state in which a touch is maintained.

Figure 38:
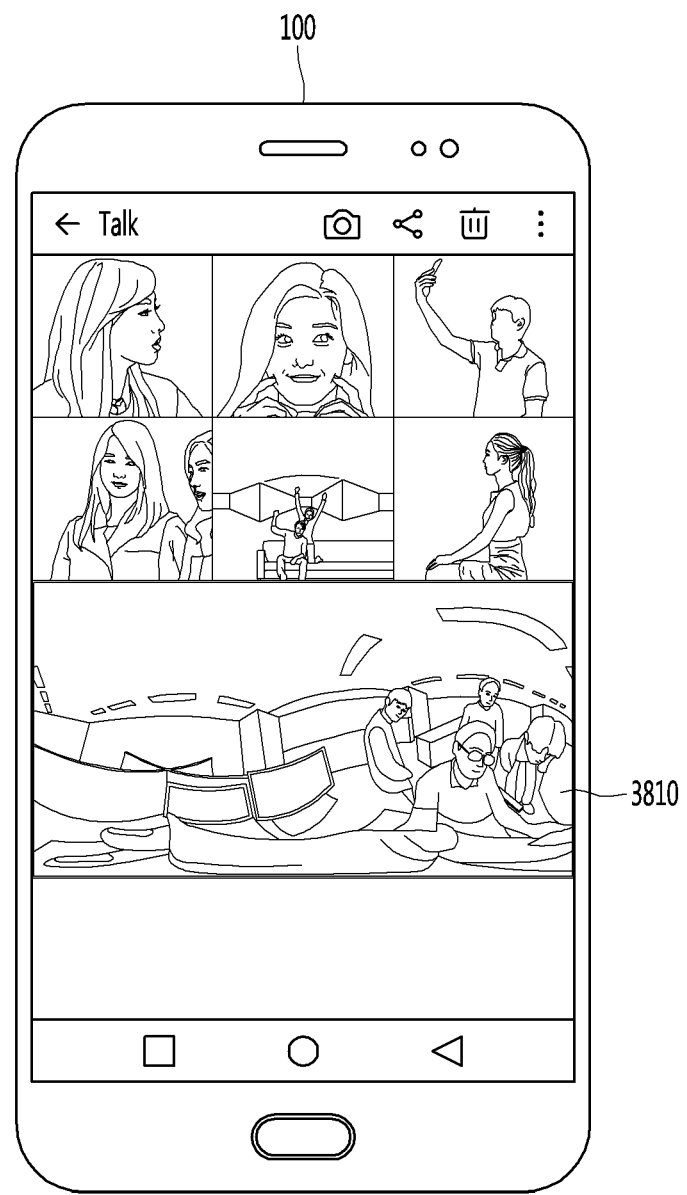

Referring to FIG. 38, when the input 3720 in the specific direction is received, the control unit 180 may display a specific image 3810 having a first enlargement ratio and corresponding to a specific region of the preview image 410. The specific region may be a entire region of the preview image 410.

According to the present disclosure as described above, a user may laterally move a display region when viewing a preview image and view the preview image by changing an enlargement ratio while moving the display region.

Figure 39:
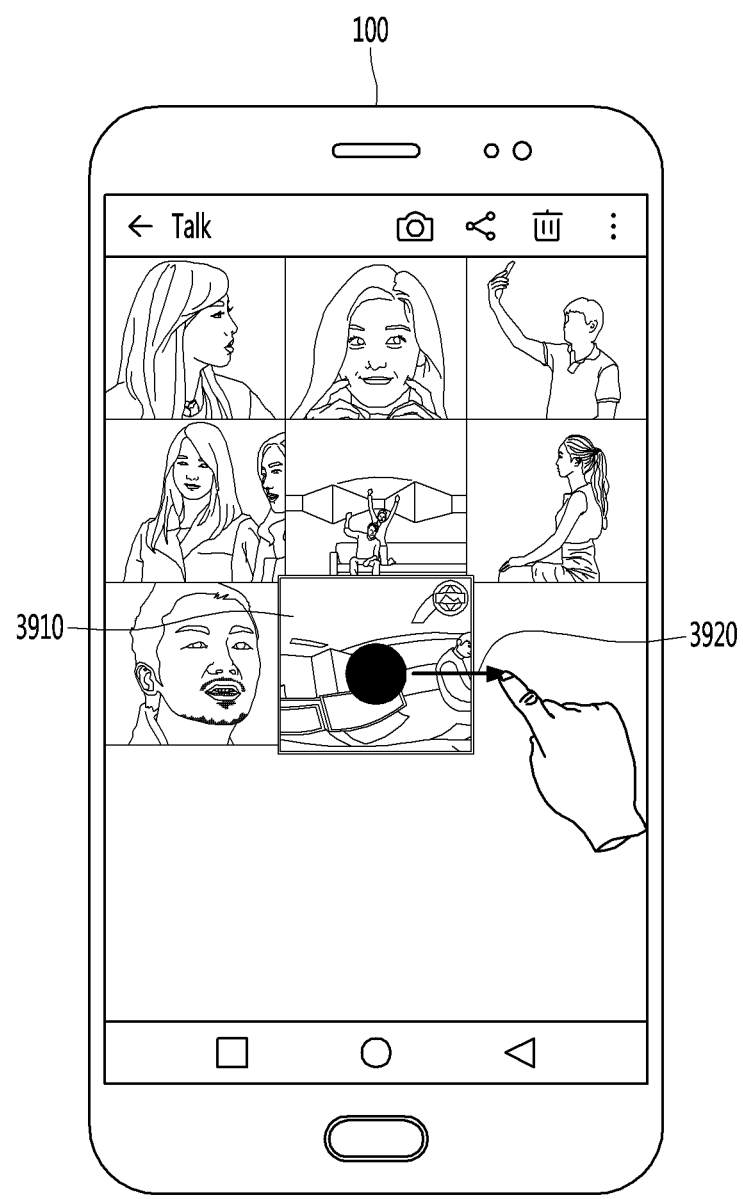
FIGS. 39 to 41 are diagrams illustrating a method of displaying one or more objects as a preview image, according to an embodiment of the present disclosure.
Figure 40:
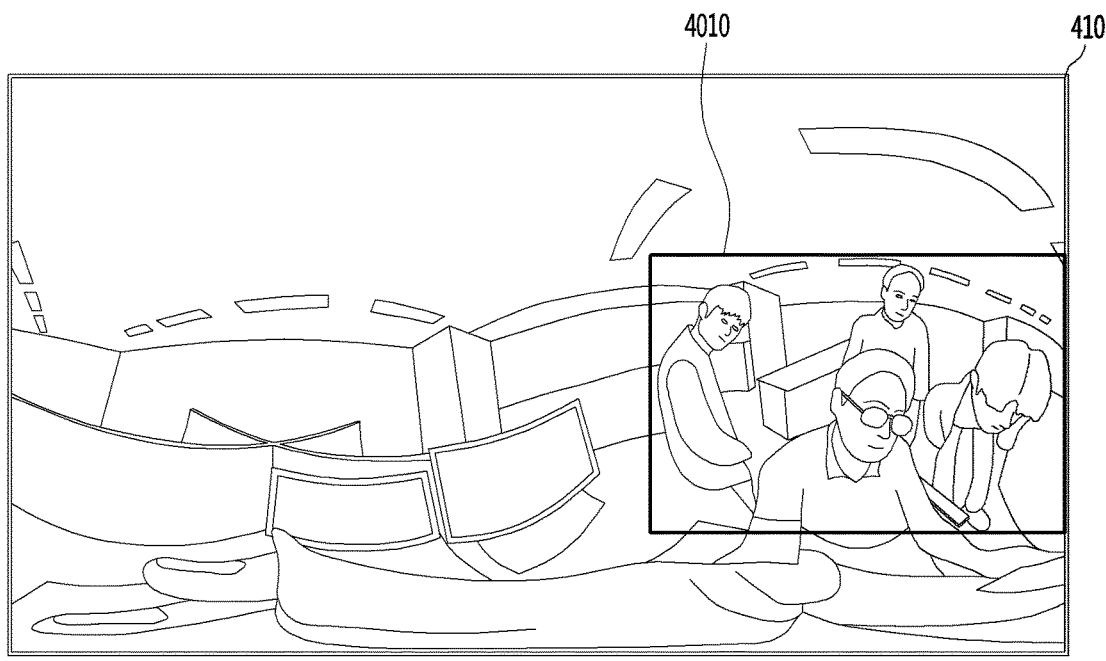
Figure 41:
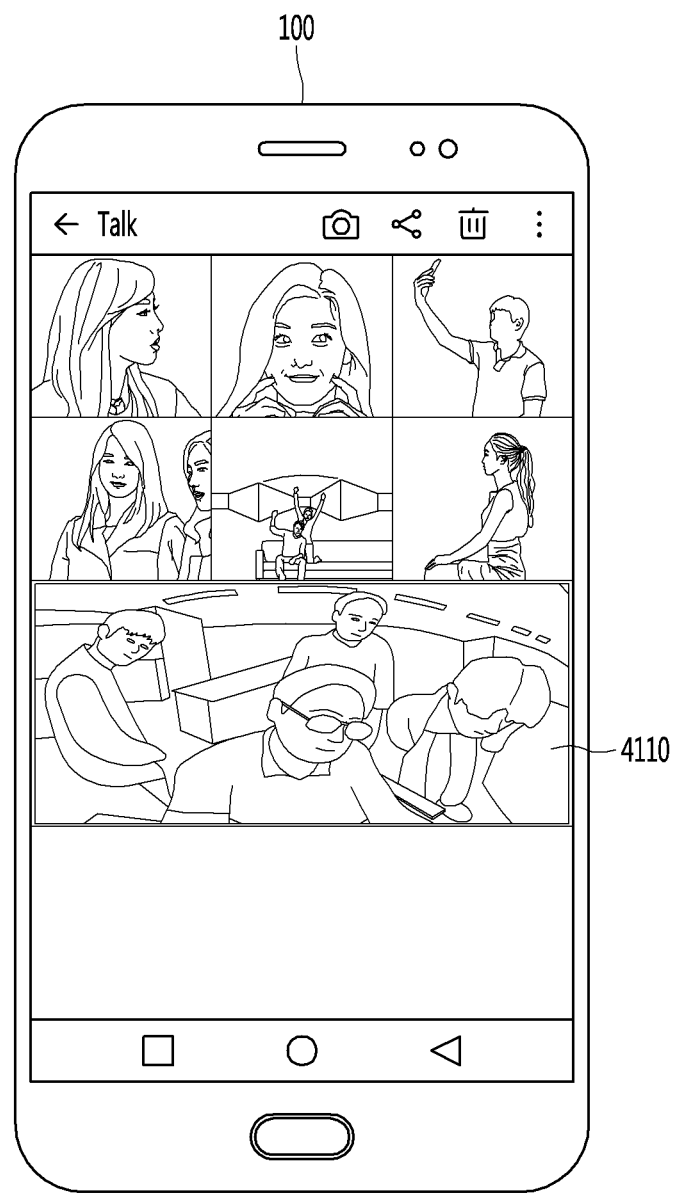

FIGS. 39 to 41 are diagrams illustrating a method of displaying one or more objects as a preview image 410, according to an embodiment of the present disclosure.

Referring to FIG. 40, an eighth region 4010 may be a region which includes one or more objects included in a preview image 410. The one or more objects may be a human.

On the other hand, when a ninth input is received, the control unit 180 may display an eighth image 4110 having a fifth enlargement ratio and corresponding to the eighth region 4010 of the preview image 410.

The fifth enlargement ratio may be a ratio in which the eighth region 4010 of the preview image 410 is enlarged while an aspect ratio thereof is maintained, and is displayed on a screen as the eighth image 4110 corresponding to the eighth region 4010.

For example, when the aspect ratio of the eighth region 4010 in the preview image 410 is 16:9 and the eighth image 4110 having the fifth enlargement ratio and corresponding to the eighth region 4010 of the preview image 410 is displayed, an aspect ratio of the eighth image 4110 may also be 16:9.

On the other hand, the fifth enlargement ratio may be a ratio in which the eighth region 4010 is enlarged while the aspect ratio thereof is maintained such that a width of the eighth image 4110 corresponding to the eighth region 4010 of the preview image 410 corresponds to a width of the screen.

In this case, a left side of the eighth image 4110 may be displayed so as to contact a left side of the screen and a right side of the eighth image 4110 may be displayed so as to contact a right side of the screen.

FIGS. 42 to 47 are diagrams illustrating a method of displaying a preview image 410 of a ninth region 4410 further including a region having a length corresponding to a length of an input, according to an embodiment of the present disclosure.

Figure 42:
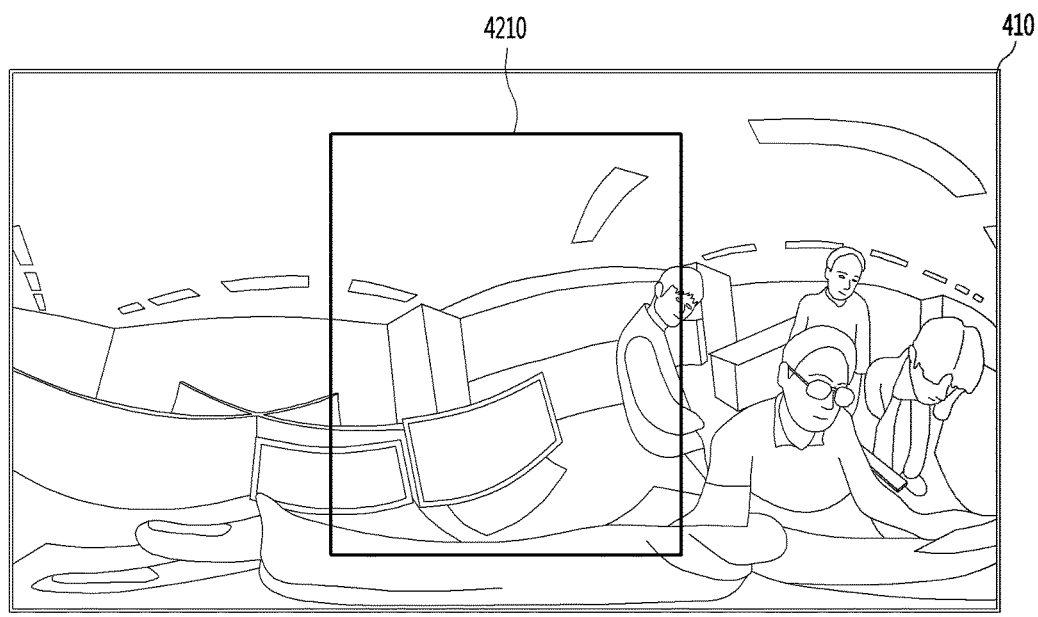
FIGS. 42 to 47 are diagrams illustrating a method of displaying a preview image of a ninth region further including a region having a length corresponding to a length of an input, according to an embodiment of the present disclosure.
Figure 43:
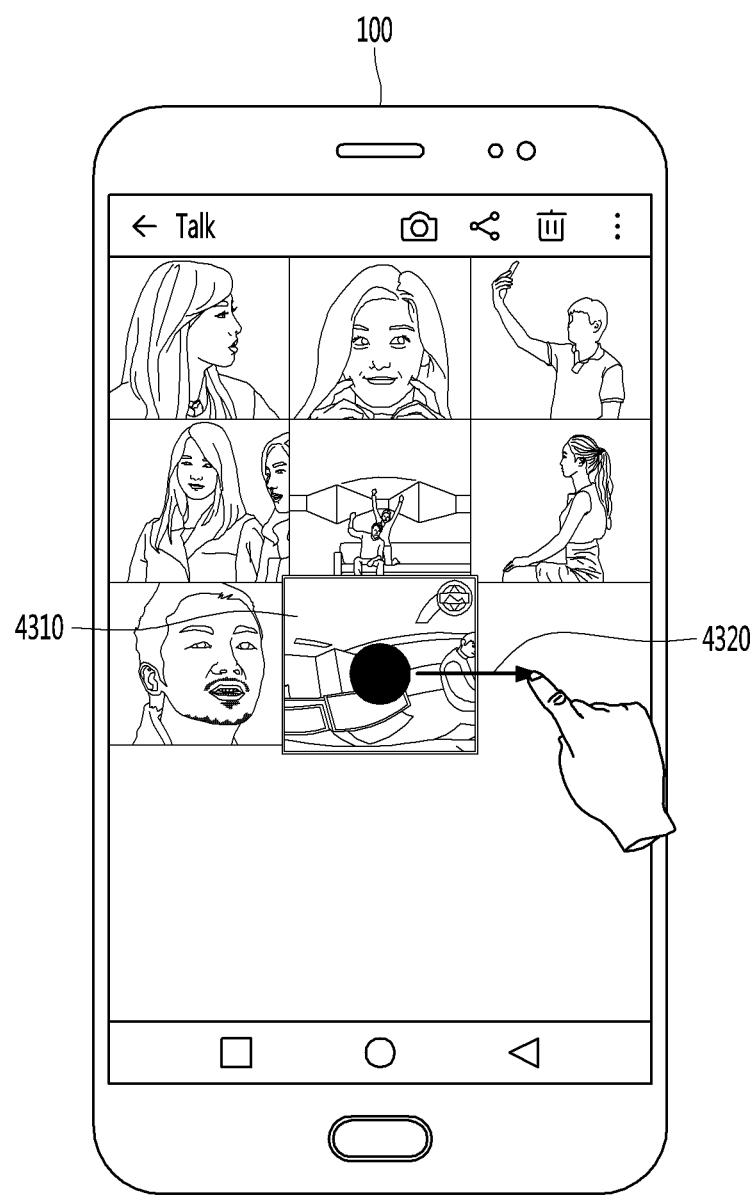

Referring to FIGS. 42 and 43, a thumbnail image 4310 corresponding to a partial region 4210 of the preview image 410 is displayed.

Meanwhile, the control unit 180 may receive a tenth input 4320.

Figure 44:
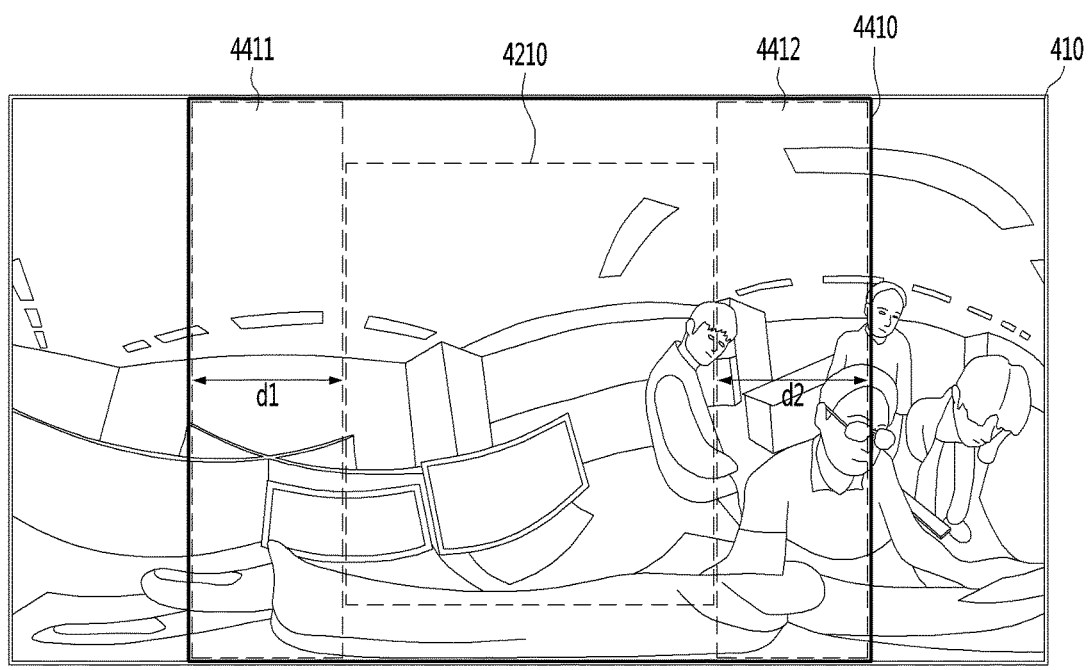
Figure 45:
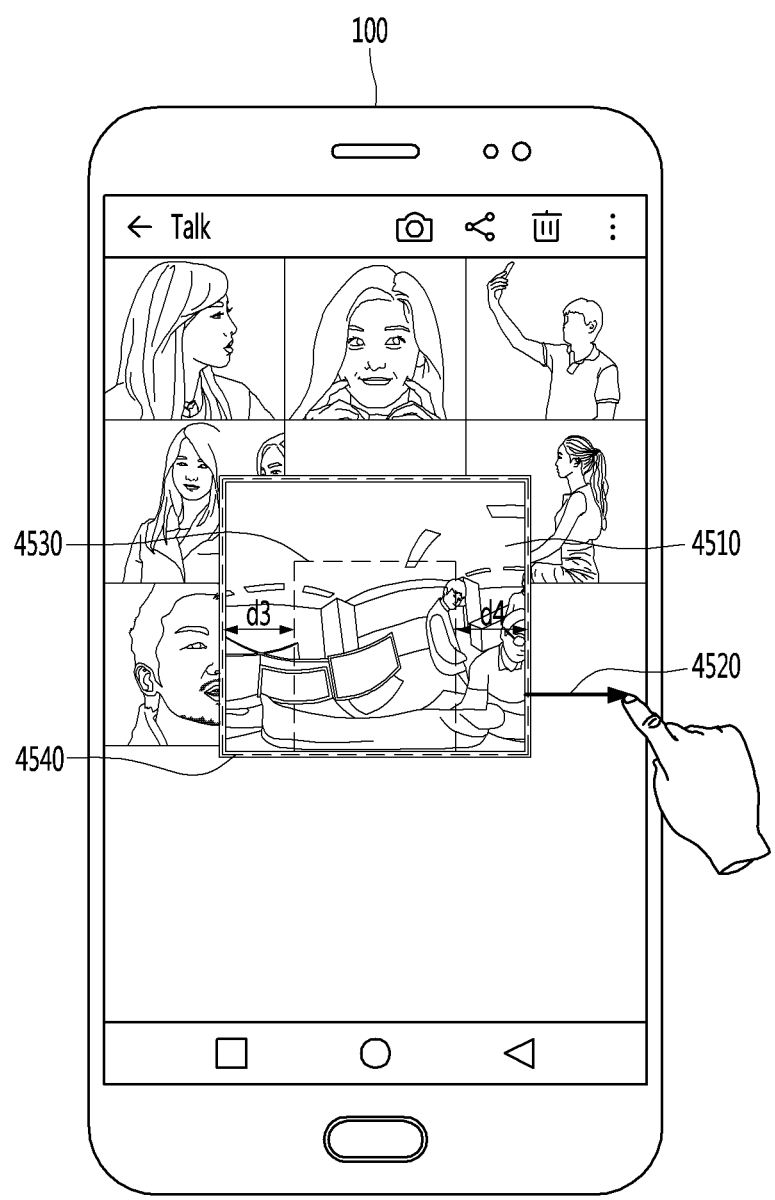

Referring to FIGS. 44 and 45, when the tenth input 4320 is received, the control unit 180 may display a ninth image 4510 corresponding to the ninth region 4410 of the preview image 410.

The ninth region 4410 may further include a region which has a length corresponding to a length of the tenth input 4320 from the partial region 4210. In addition, the ninth region 4410 may be a region contacting an upper side and a lower side of the preview image 410.

For example, when the length of the tenth input 4320 is d5 and the length corresponding to the length of the tenth input 4320 is d1+d2, the ninth region 4410 may be a region which contacts the upper side and the lower side and further includes regions 4411 and 4412 corresponding to the length of the tenth input 4320 from the partial region 4210.

Meanwhile, in FIG. 44, the ninth region 4410 has been described as extending in left and right directions from the partial region 4210, but is not limited thereto. The ninth region 4410 may be a region which extends in a direction corresponding to a direction of the tenth input 4320 from the partial region 4210.

On the other hand, the ninth image 4510 may be an image extending in left and right directions from a position of a thumbnail image.

Specifically, as shown in FIG. 45, the ninth image 4510 may be an image extending in left and right directions from a position 4530 of a thumbnail image 4310.

The ninth region 4410 may be a region extending in left and right directions from the position 4530 of the thumbnail image 4310 by the length corresponding to the length of the tenth input 4320.

For example, when the length of the tenth input 4320 is d5 and the length corresponding to the length of the tenth input 4320 is d3+d4, the ninth image 4510 may be an image which extends in the left and right directions from the position 4530 of the thumbnail image 4310 by the length (d3+d4) corresponding to the length of the tenth input 4320.

Meanwhile, the control unit 180 may continuously receive the tenth input 4320.

Figure 46:
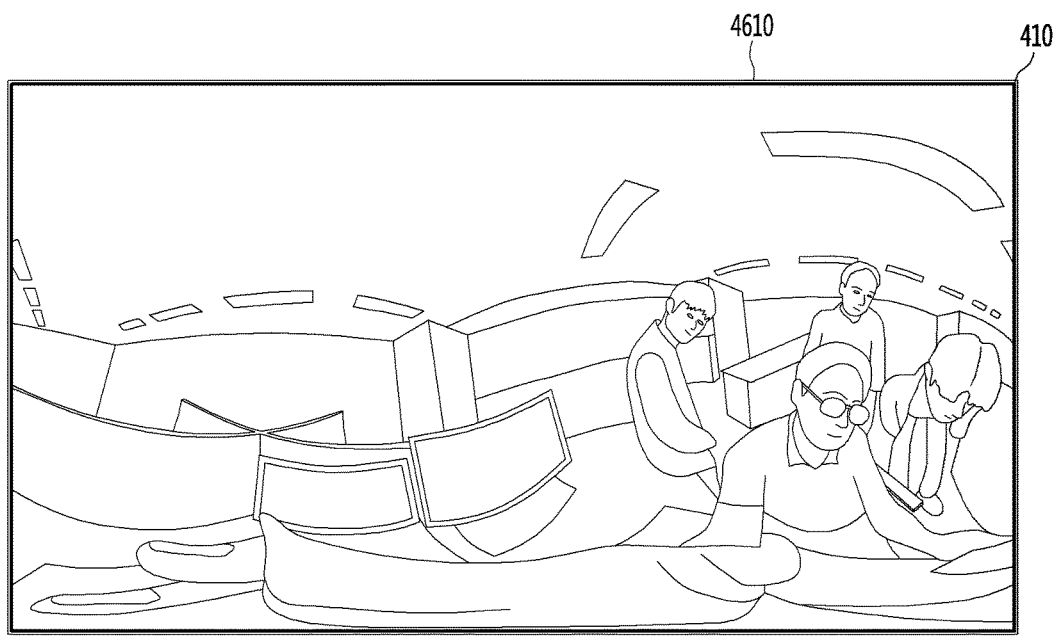
Figure 47:
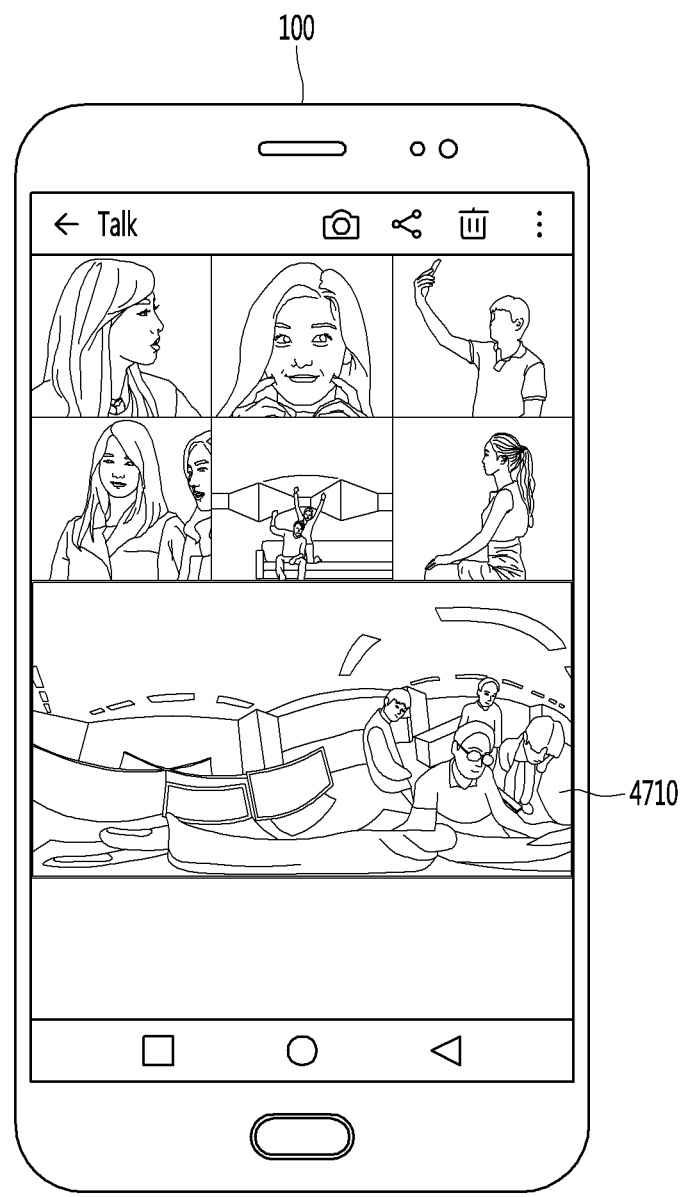

Referring to FIGS. 46 and 47, when the tenth input 4320 is received with a length greater than or equal to a preset length, the control unit 180 may display an image 4710 corresponding to a whole region 4610 of the preview image 410.

An aspect ratio of the whole region 4610 in the preview image 410 may be the same as an aspect ratio of the image 4710 corresponding to the whole region 4610.

In addition, a width of the image 4710 corresponding to the whole region 4610 may correspond to a width of a screen.

FIGS. 48 to 51 are diagrams illustrating a method of extending and displaying a thumbnail image 4910, according to an embodiment of the present disclosure.

Figure 48:
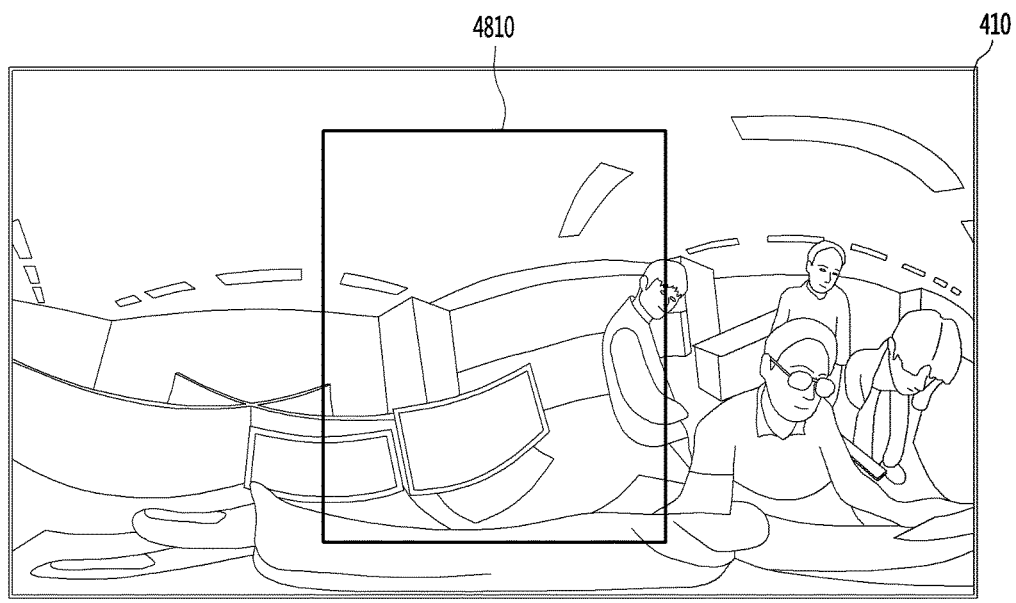
FIGS. 48 to 51 are diagrams illustrating a method of extending and displaying a thumbnail image, according to an embodiment of the present disclosure.
Figure 49:
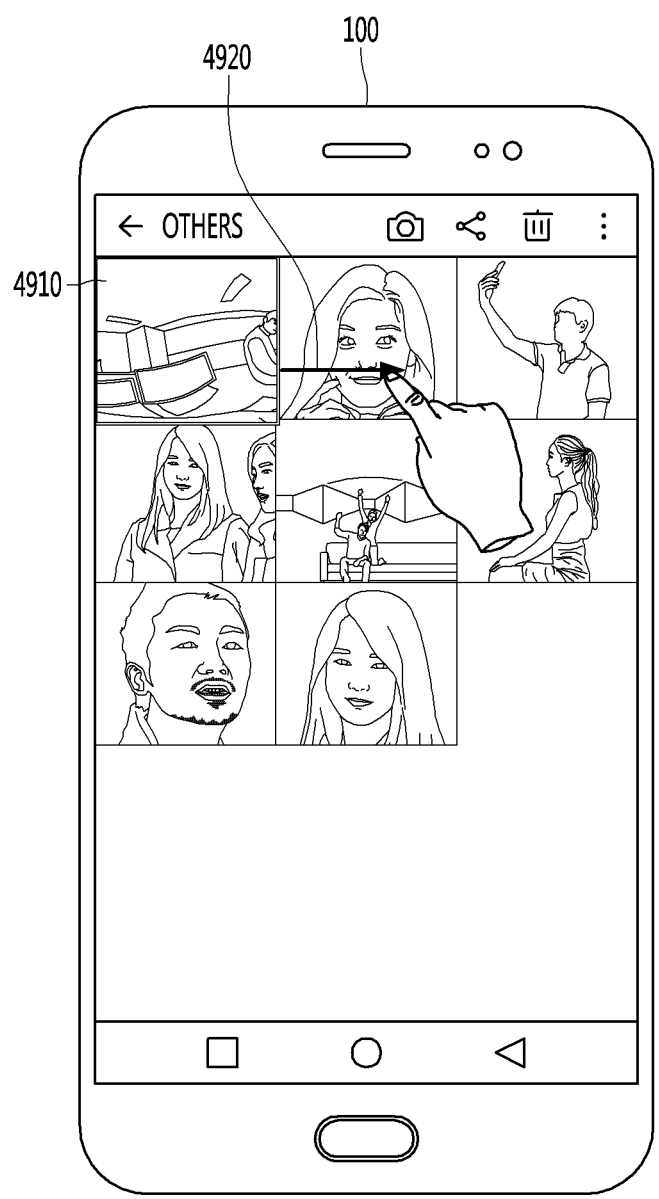

Referring to FIGS. 48 and 49, the thumbnail image 4910 corresponding to a partial region 4810 of a preview image 410 is displayed.

Meanwhile, the control unit 180 may receive an eleventh input 4920 in a specific direction.

Figure 50:
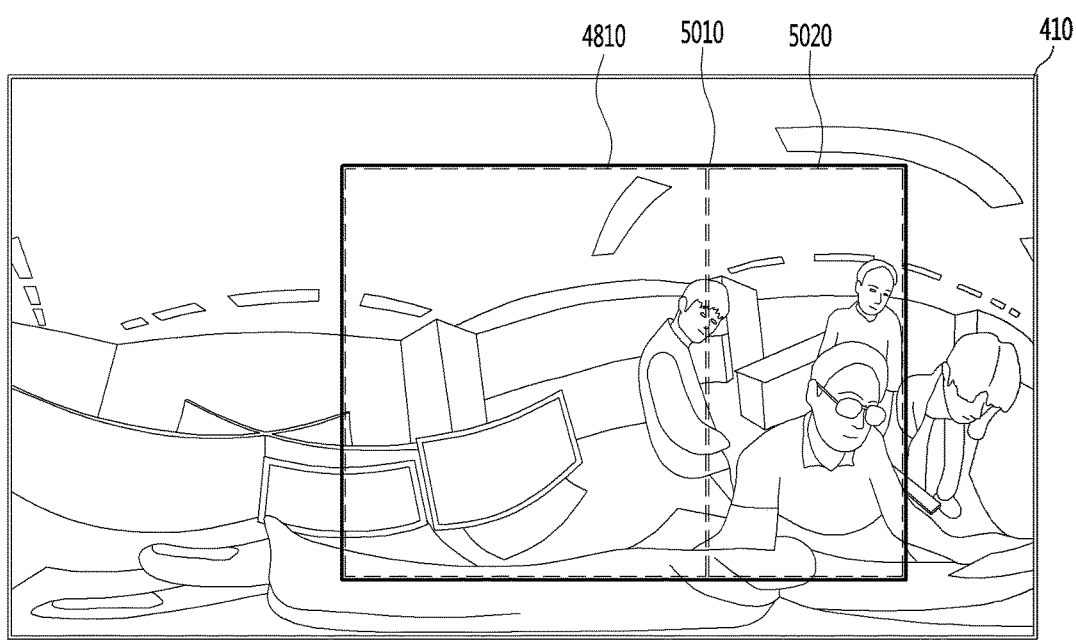
Figure 51:
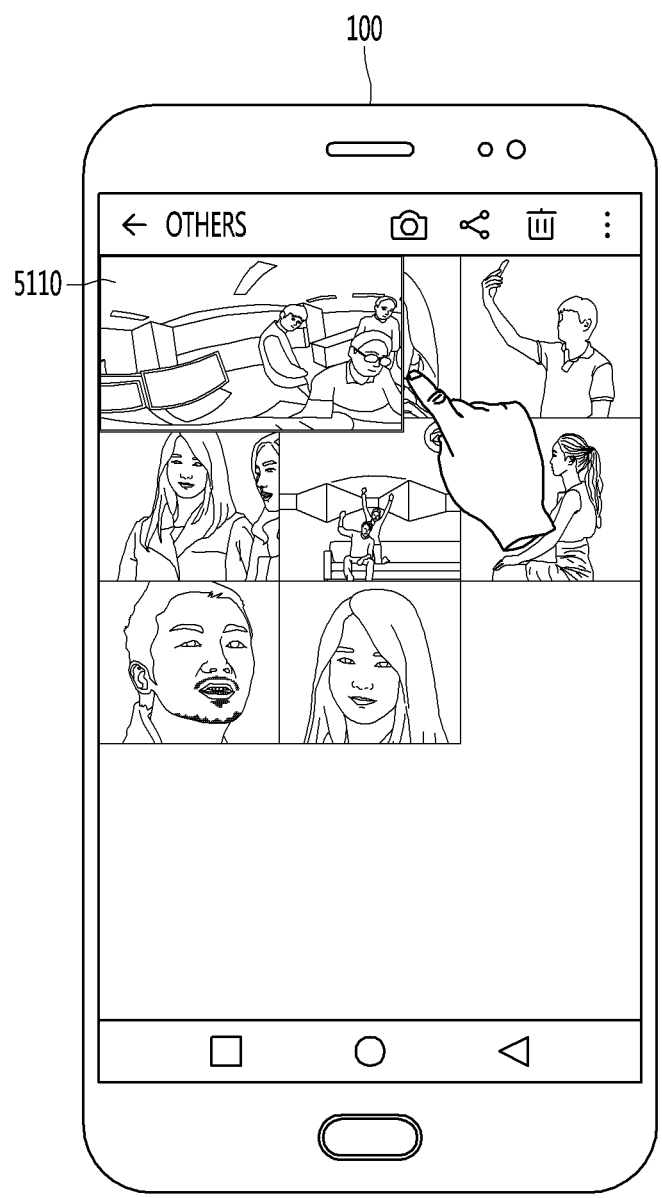

Referring to FIGS. 50 and 51, when the eleventh input 4920 in the specific direction is received, the control unit 180 may display a tenth image 5110 which corresponds to a tenth region of the preview image 410 and is an image in which the thumbnail image 4910 is enlarged in the specific direction.

The tenth region 5010 may be a region which includes the partial region 4810 and a region 5020 extending in the specific direction from the partial region 4810.

Specifically, the tenth region 5010 may be a region which includes the partial region 4810 and the region 5020 having a length corresponding to a length of the eleventh input 4920 from the partial region 4810.

Meanwhile, a tenth image 5110 may be an image corresponding to the tenth region 5010. In addition, the tenth image 5110 may be an image in which the thumbnail image 4910 extends in the specific direction.

For example, when the eleventh input 4920 in a right direction is received, the tenth image 5110 may be an image in which the thumbnail image 4910 extends in the right direction.

FIGS. 52 to 55 are diagrams illustrating a method of extending and displaying a thumbnail image 5310, according to another embodiment of the present disclosure.

Figure 52:
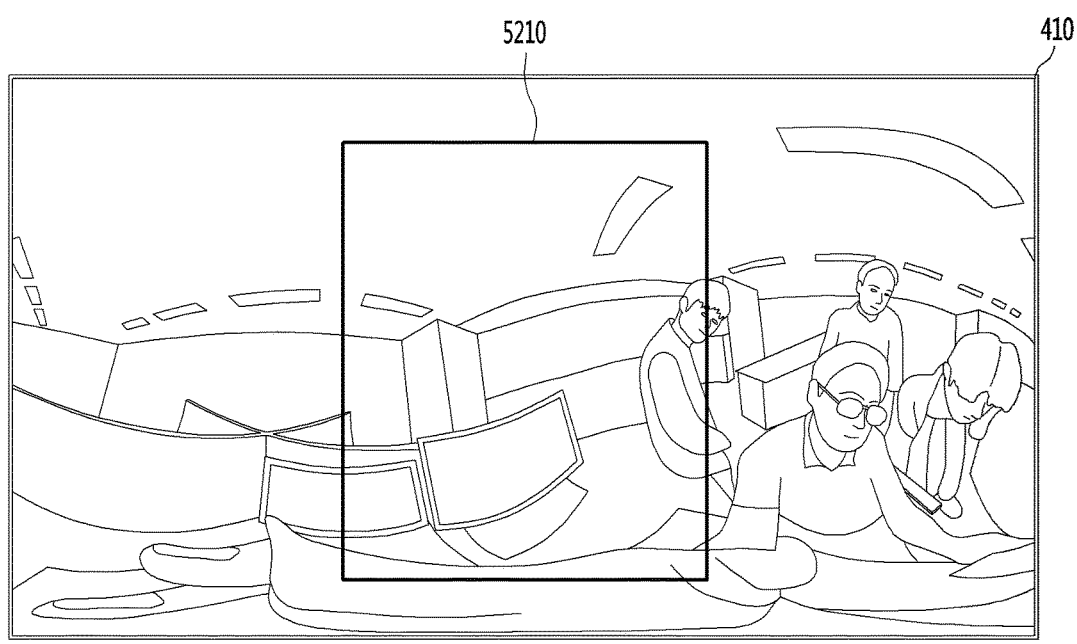
FIGS. 52 to 55 are diagrams illustrating a method of extending and displaying a thumbnail image, according to another embodiment of the present disclosure.
Figure 53:
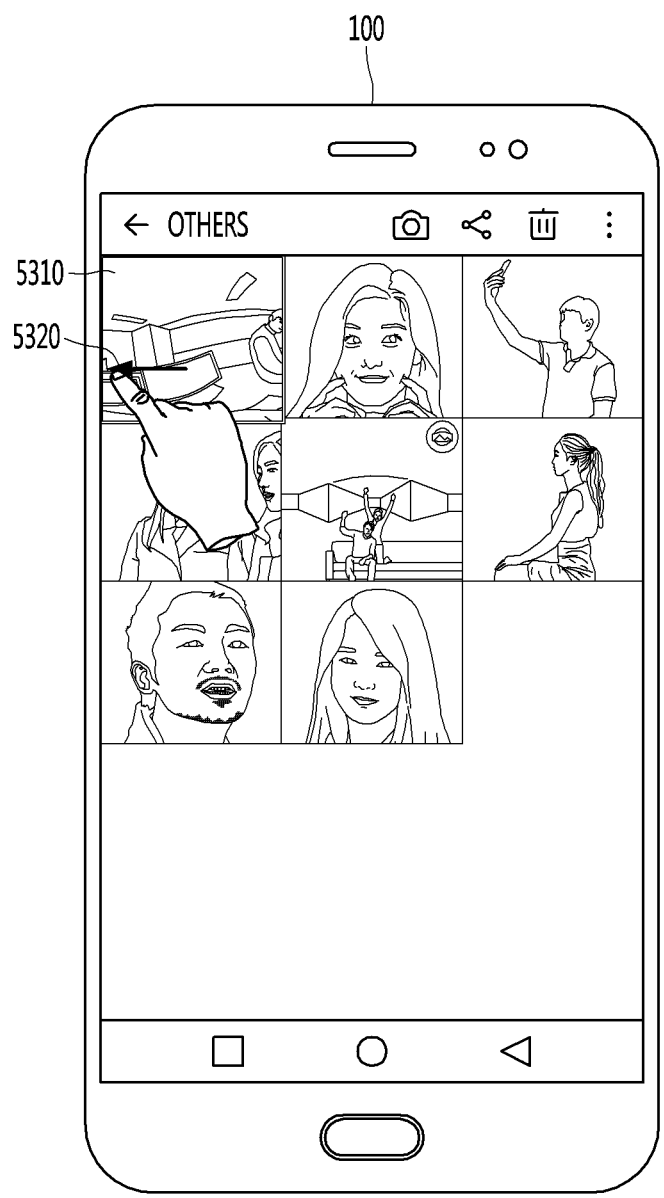

Referring to FIGS. 52 and 53, the thumbnail image 5310 corresponding to a partial region 5210 of a preview image 410 is displayed.

Meanwhile, the control unit 180 may receive a twelfth input 5320 in a specific direction.

Figure 54:
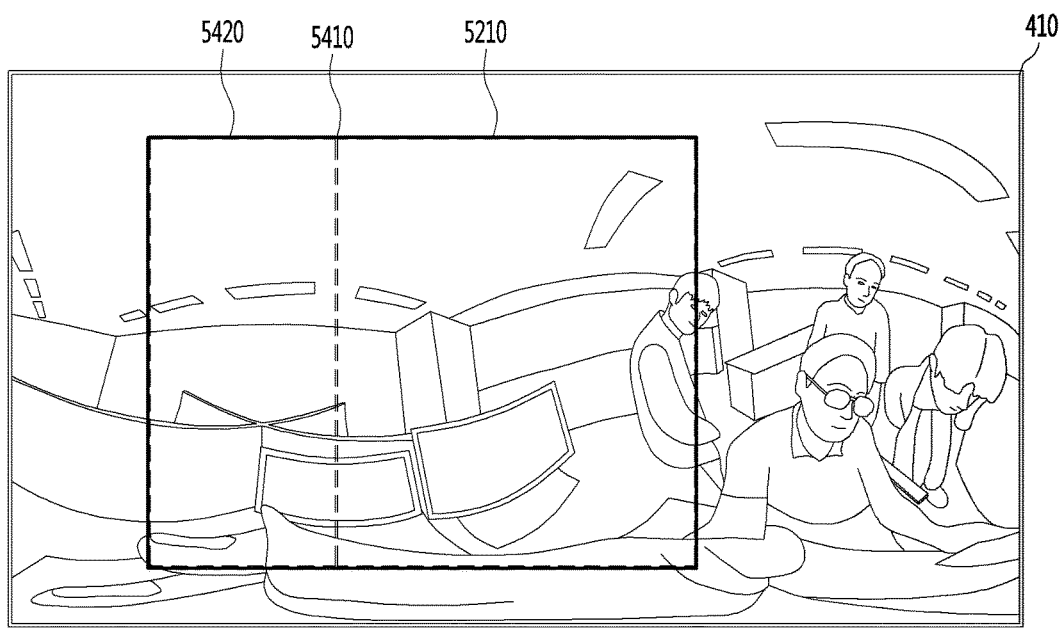
Figure 55:
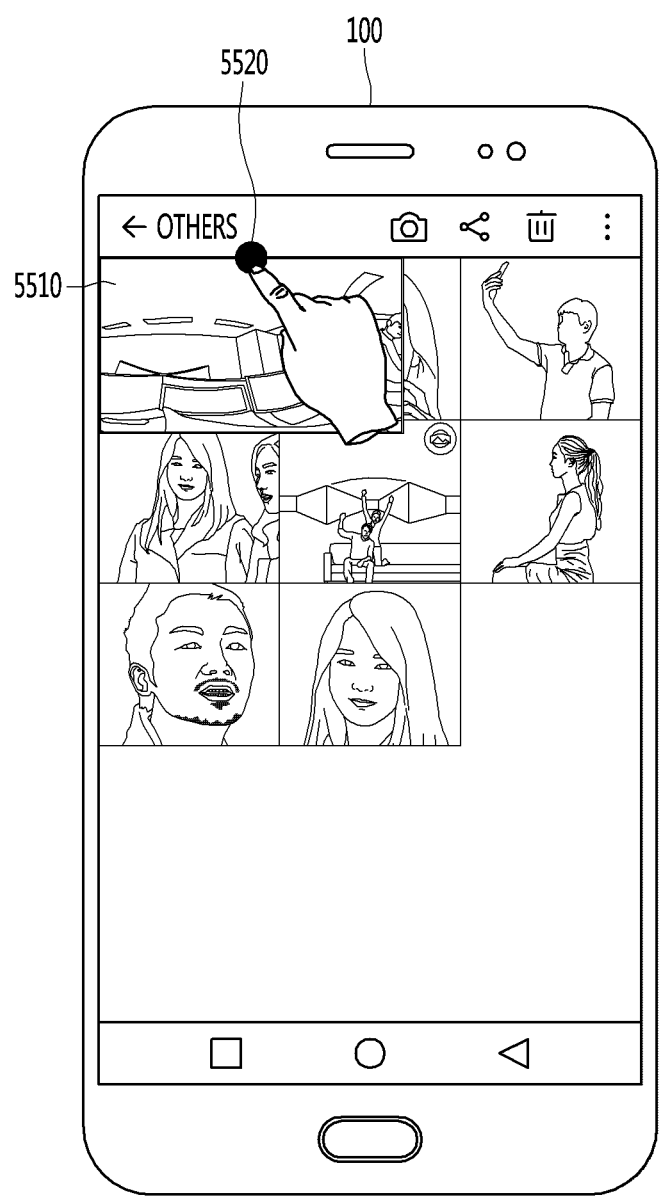

Referring to FIGS. 54 and 55, when the twelfth input 5320 in the specific direction is received and the thumbnail image 5310 contacts an edge in the specific direction on a screen, the control unit 180 may display an eleventh image 5510 which corresponds to an eleventh region 5410 of the preview image 410 and is an image in which the thumbnail image 5310 extends in a direction opposite to the specific direction.

The eleventh region 5410 may be a region which includes the partial region 5210 and a region 5420 extending in the specific direction from the partial region 5210.

Specifically, the eleventh region 5410 may be a region which includes the partial region 5210 and the region 5420 having a length corresponding to a length of the twelfth input 5320 from the partial region 5210.

Meanwhile, the eleventh image 5510 may be an image corresponding to the eleventh region 5410. In addition, the eleventh image 5510 may be an image in which the thumbnail image 5310 extends in the direction opposite to the specific direction.

For example, when the twelfth input 5320 in a left direction is received and the thumbnail image 5310 contacts an edge in the left direction on the screen, the eleventh region 5410 may be a region which includes the partial region 5210 and the region 5420 in the left direction from the partial region 5210, and the eleventh image 5510 may be an image in which the thumbnail image 5310 extends in a right direction opposite to the left direction.

On the other hand, lengths, in which the eleventh region 5410 and the eleventh image 5510 respectively extend, may be changes based on a time for the twelfth input 5320 to be received.

For example, when an input of touching the thumbnail image 5310 and dragging the thumbnail image 5310 toward an edge in the specific direction is received, the eleventh region 5410 and the eleventh image 5510 may start to extend and continuously extend for a time for a touch to be maintained.

Figure 56:
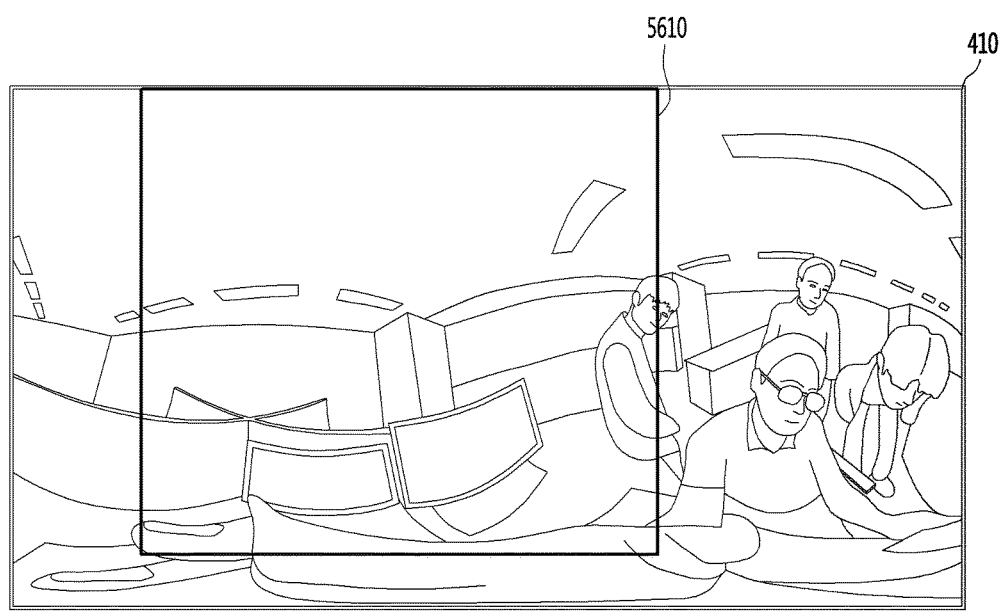
FIGS. 56 and 57 are diagrams illustrating a method of extending and displaying a thumbnail image, according to another embodiment of the present disclosure.
Figure 57:
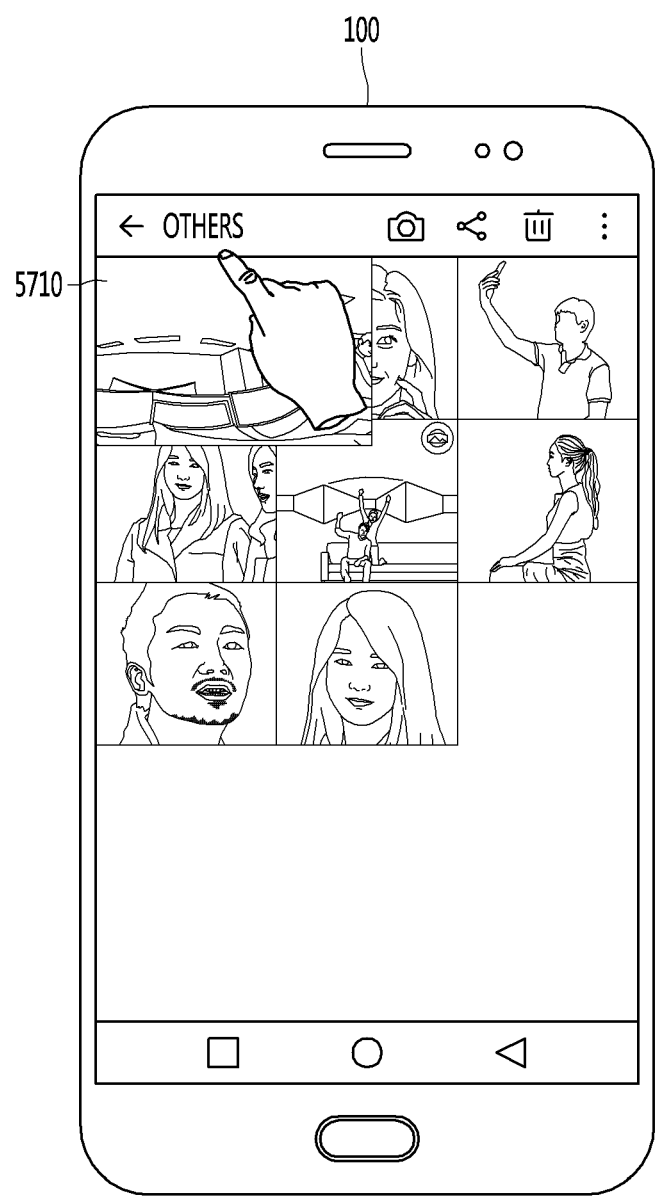

FIGS. 56 and 57 are diagrams illustrating a method of extending and displaying a thumbnail image, according to another embodiment of the present disclosure.

Referring to FIGS. 54 and 55, the eleventh image 5510 corresponding to the eleventh region 5410 is displayed.

Meanwhile, the control unit 180 may receive an input 5520 in a specific direction.

Referring to FIGS. 56 and 57, when the input 5520 in the specific direction is received and the eleventh image 5510 contacts an edge in the specific direction on a screen, the control unit 180 may display a twelfth image 5710 which corresponds to a specific region 5910 of a preview image 410 and is an image in which the eleventh image 5510 extends in a direction opposite to the specific direction.

A twelfth region 5710 may be a region which includes the eleventh region 5410 and a region extending in the specific direction from the eleventh region 5410.

Meanwhile, the twelfth image 5710 may be an image corresponding to the eleventh region 5510. In addition, the twelfth image 5710 may be an image in which the eleventh image 5510 extends in the direction opposite to the specific direction.

According to the present disclosure as described above, a user may view a preview image by extending a display region as much as the user wants and extend an image in a direction opposite to an extension direction when a displaying space is insufficient in the extension direction.

Figure 58:
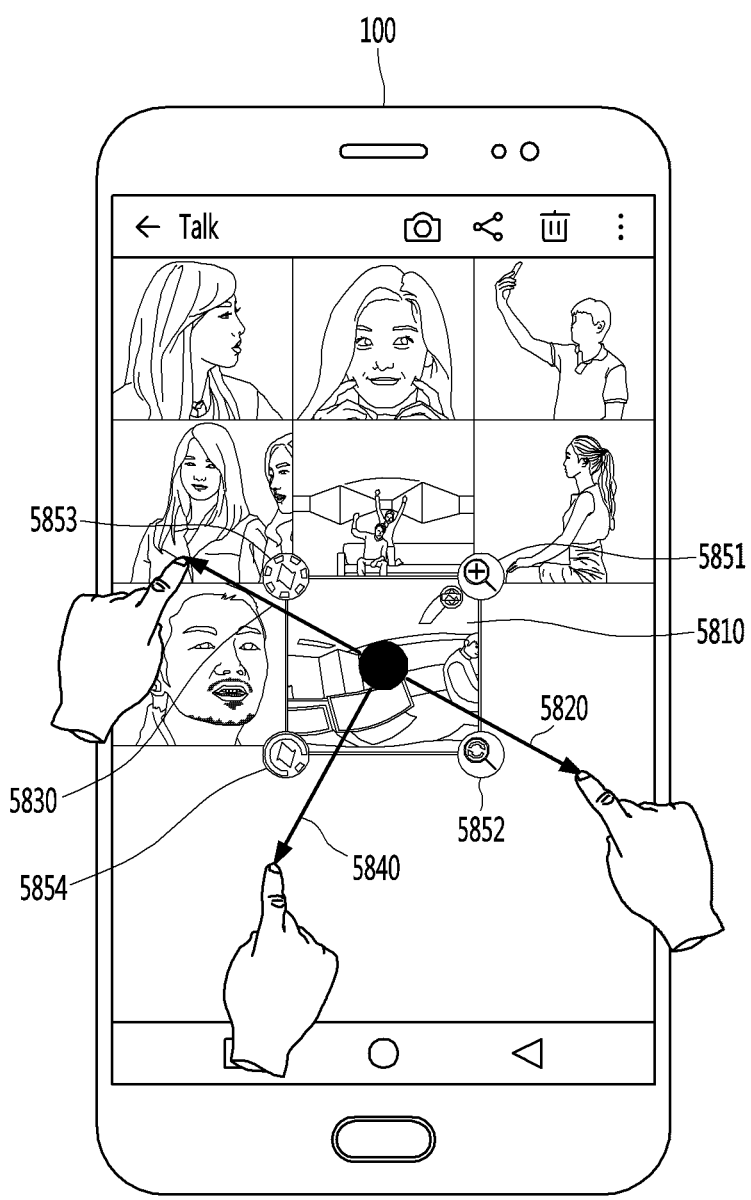
FIG. 58 is a diagram illustrating various inputs according to an embodiment of the present disclosure.
Figure 59:
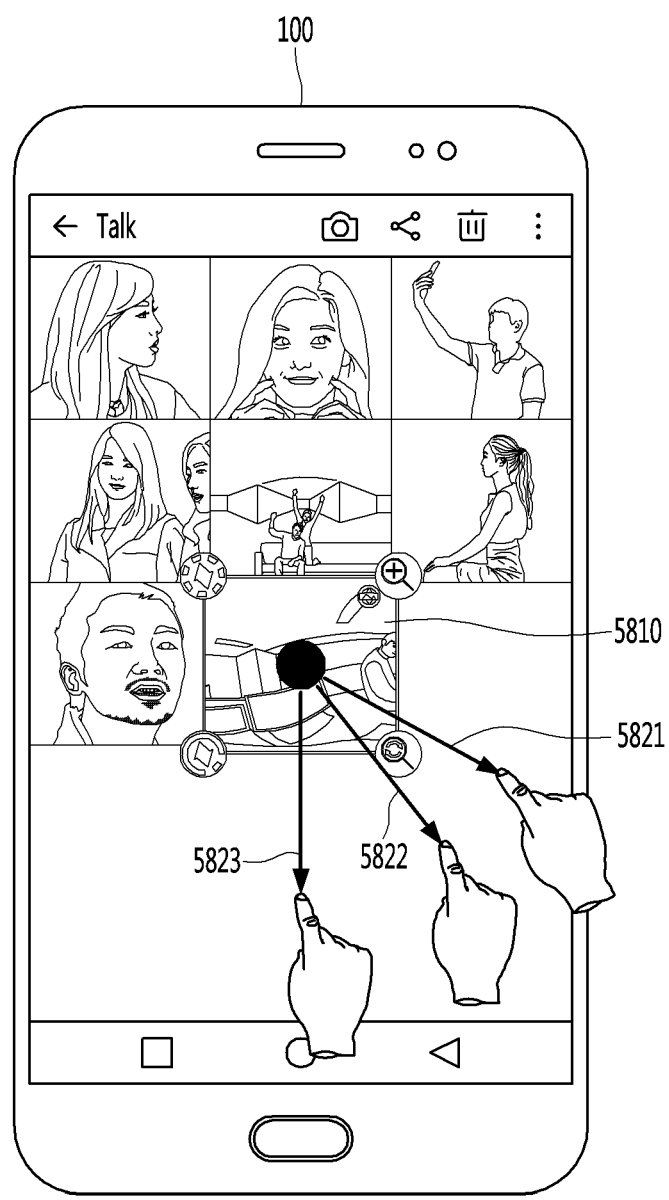
FIGS. 59 to 62 are diagrams illustrating a method of displaying a preview image based on an input in a fourth direction, according to an embodiment of the present disclosure.

FIG. 58 is a diagram illustrating various inputs according to an embodiment of the present disclosure.

The control unit 180 may receive an input from a user.

The input may include at least one of an input in a fourth direction 5820, an input in a fifth direction 5830, and an input in a sixth direction 5840.

The input in the fourth direction 5820 may be an input of selecting a thumbnail image 5810, and then, dragging the thumbnail image 5810 in the fourth direction 5820. Furthermore, the input in the fifth direction 5830 may be an input of selecting the thumbnail image 5810, and then, dragging the thumbnail image 5810 in the fifth direction 5830. In addition, the input in the sixth direction 5840 may be an input of selecting the thumbnail image 5810, and then, dragging the thumbnail image 5810 in the sixth direction 5840.

Each of the input in the fourth direction 5820, the input in the fifth direction 5830, and the input in the sixth direction 5840 may include at least one of a horizontal direction, a vertical direction, and a diagonal direction.

In addition, the input in the fourth direction 5820 may be an input in a right lower end direction, the input in the fifth direction 5830 may be an input in a left upper end direction, and the input in the sixth direction 5840 may be an input in a left lower end direction.

On the other hand, the control unit 180 may display a thumbnail image 5810 and one or more guide icons 5851, 5852, 5853, and 5854 on corners of the thumbnail image 5810. Specifically, when an input of pressing and holding the thumbnail image 5810 is received, the control unit 180 may display the thumbnail image 5810 and the one or more guide icons 5851, 5852, 5853, and 5854 on the corners of the thumbnail image 5810. In addition, while the input of pressing and holding the thumbnail image 5810 is received, a size of each of the one or more guide icons 5851, 5852, 5853, and 5854 may be enlarged.

FIGS. 59 to 62 are diagrams illustrating a method of displaying a preview image based on an input in a fourth direction 5820, according to an embodiment of the present disclosure;

When the input in the fourth direction 5820 is received, the control unit 180 may vertically display an image corresponding to a specific region.

An enlargement ratio of the image vertically displayed may be changed based on a horizontal angle of the fourth direction 5820. That is, the enlargement ratio is determined based on the horizontal angle of the fourth direction, and is then displayed accordingly.

Figure 60:
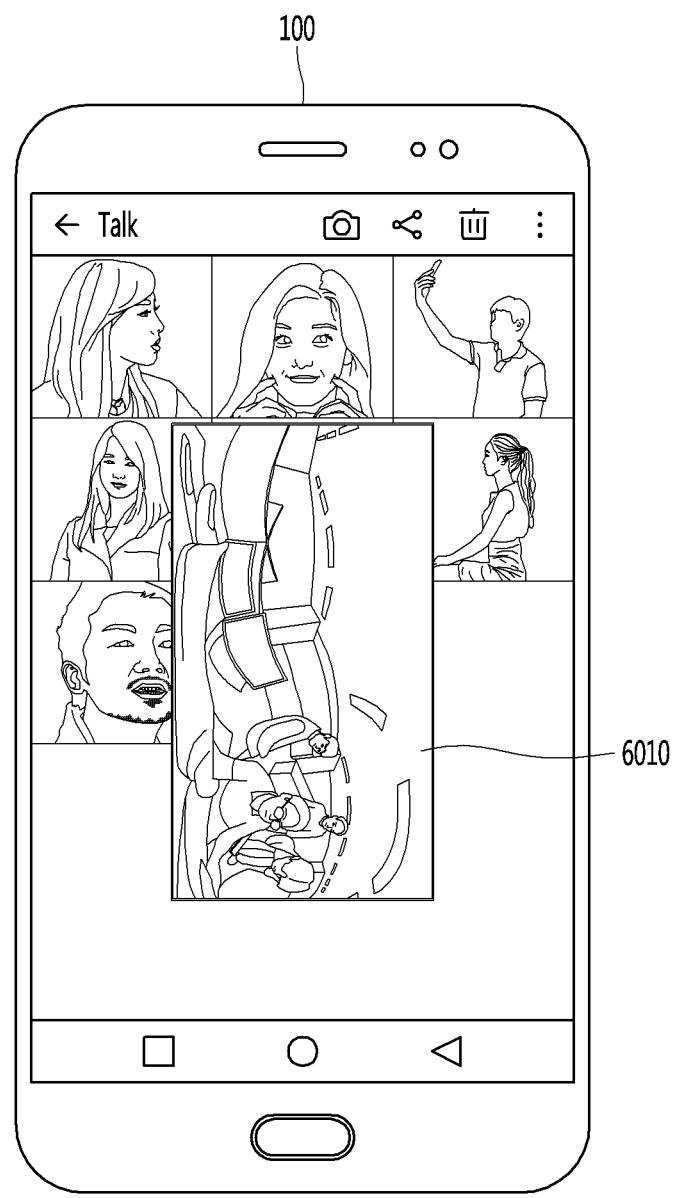

For example, when an input in a 4-2$^{th}$ direction 5821 is received, as shown in FIG. 60, the control unit 180 may display an image 6010 having a first enlargement ratio and corresponding to a specific region. In this case, the image 6010 having the first enlargement ratio may be displayed at a center of a screen.

Figure 61:
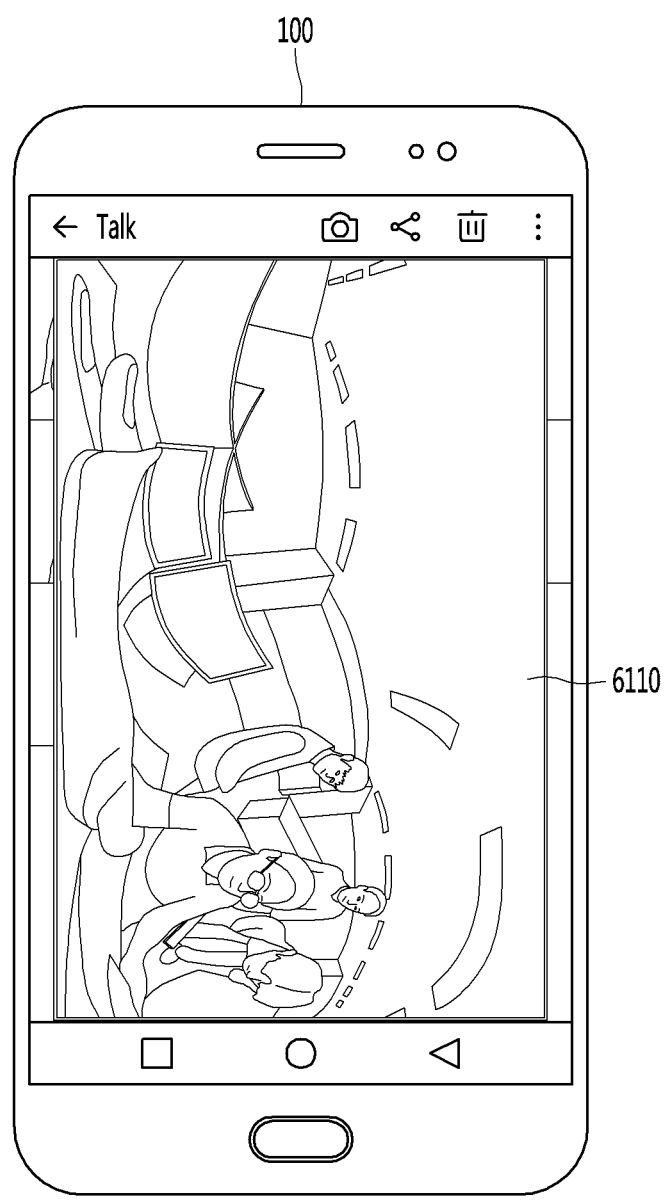

In addition, when an input in a 4-2$^{th}$ direction 5822 is received, as shown in FIG. 61, the control unit 180 may vertically display an image 6110 having a second enlargement ratio and corresponding to the specific region. In this case, the image 6110 having the second enlargement ratio may be displayed at the center of the screen.

Figure 62:
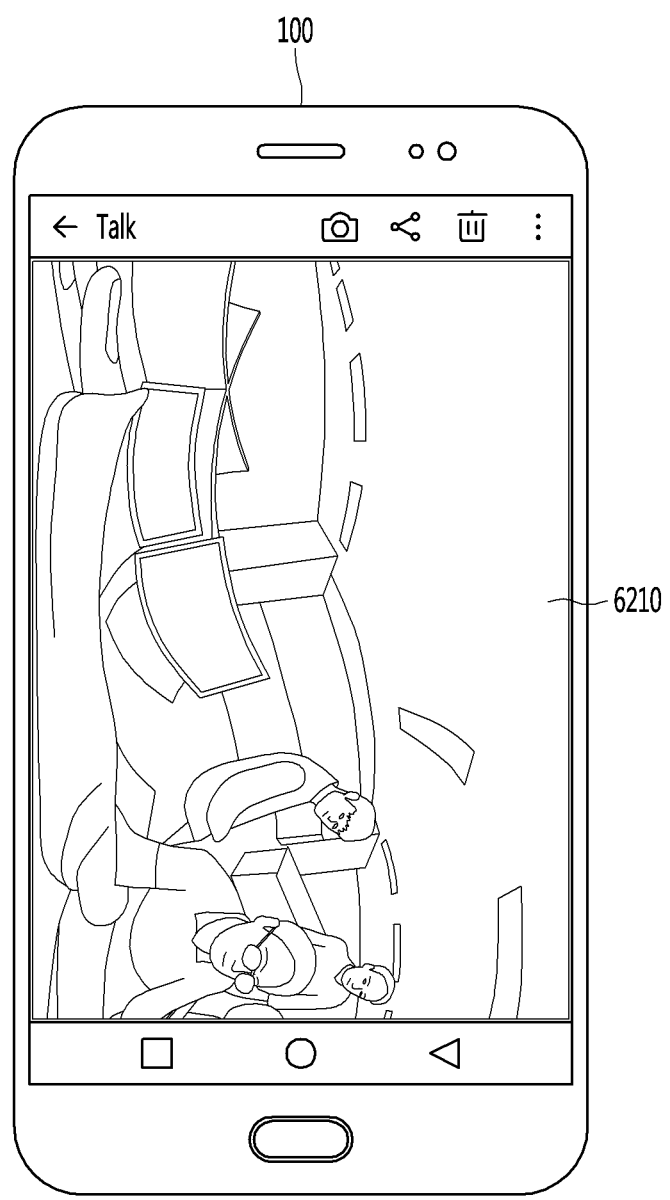

In addition, when an input in a 4-3$^{th}$ direction 5823 is received, as shown in FIG. 62, the control unit 180 may vertically display an image 6210 having a third enlargement ratio and corresponding to the specific region. The specific region may be a partial region of a preview image and the image 6210 having the third enlargement ratio may be an image corresponding to the partial region.

Figure 63:
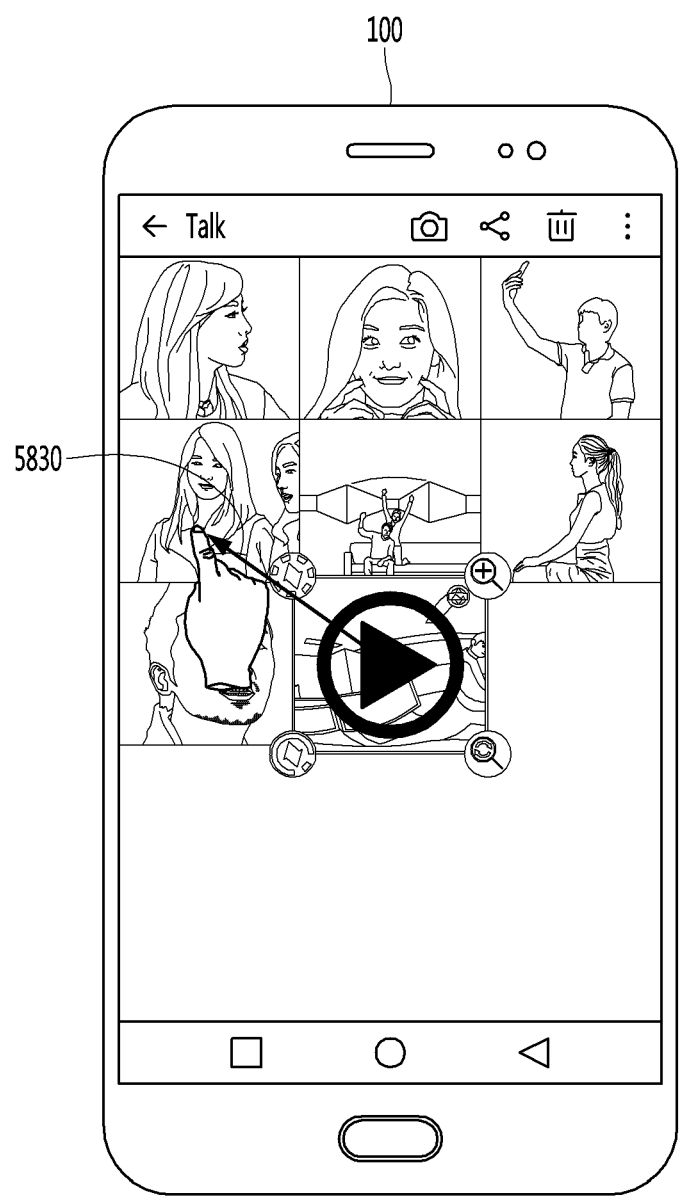
FIGS. 63 to 65 are diagrams illustrating a method of displaying a preview image based on an input in a fifth direction, according to an embodiment of the present disclosure.
Figure 64:
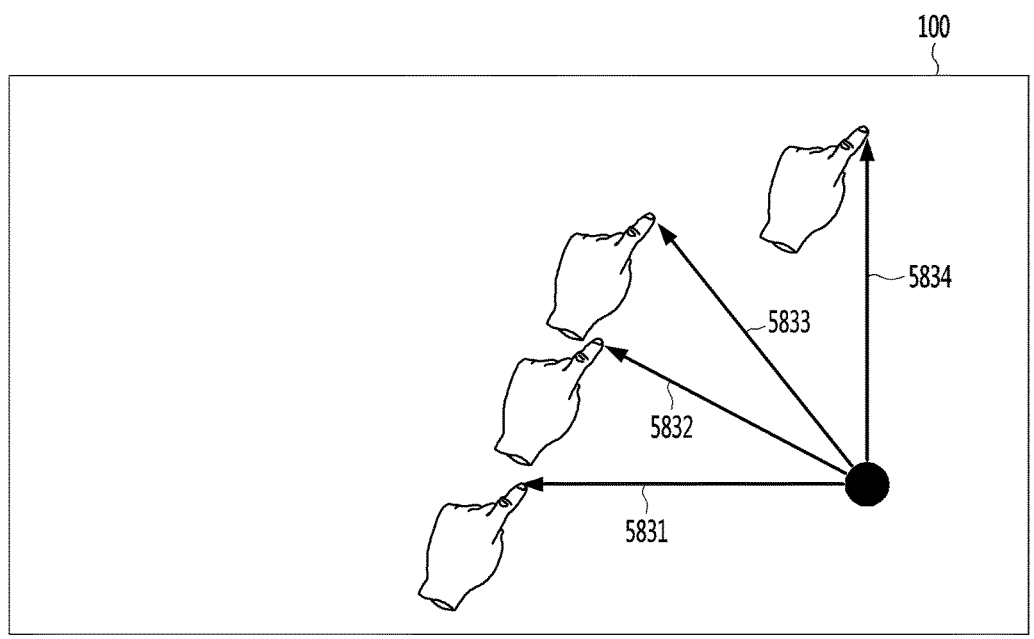
Figure 65:
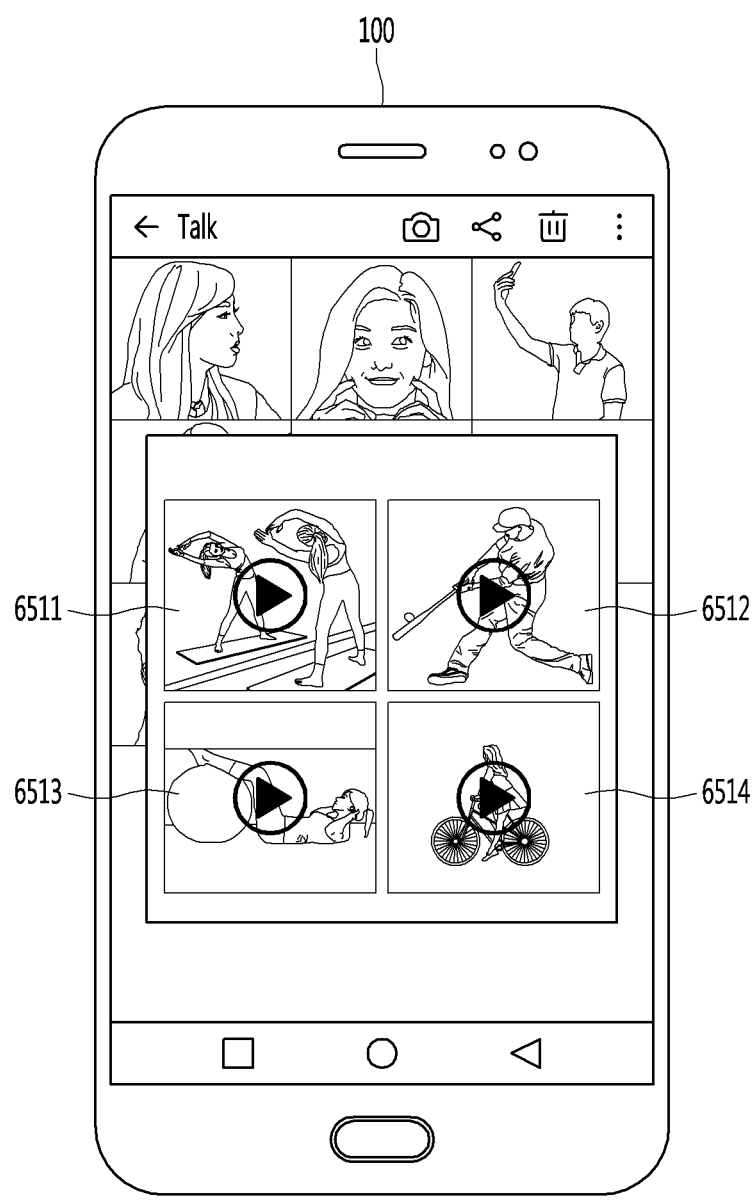

FIGS. 63 to 65 are diagrams illustrating a method of displaying a preview image based on an input in a fifth direction 5830, according to an embodiment of the present disclosure;

In the present embodiment, descriptions will be provided by exemplifying an omnidirectionally captured image, but the present disclosure may be applied in a normal image.

The omnidirectionally captured image may be a video. On the other hand, referring to FIG. 64, the control unit 180 may display a thumbnail image of a partial region in an omnidirectionally captured video.

Meanwhile, the control unit 180 may receive a thirteenth input in the fifth direction 5830 for selecting and dragging a thumbnail image.

On the other hand, the fifth direction 5830 may include at least one of a (5-1)$^{th}$ direction 5831, a (5-2)$^{th}$ direction 5832, a 5-3$^{th}$ direction 5833, and a 5-4$^{th}$ direction 5834.

Meanwhile, when the thirteenth input in the fifth direction 5830 is received, the control unit 180 may display a plurality of thumbnail images 6511, 6512, 6513, and 6514 respectively corresponding to a plurality of time points of a video. The plurality of time points may be respectively time points at which a whole playback section of the video is equally divided. For example, when the whole playback time of the video is 16 minutes, a first thumbnail image 1611 may be a thumbnail image of an image played at 0 minutes, a second thumbnail image 6512 may be a thumbnail image of an image played at 4 minutes, a third thumbnail image 6513 may be a thumbnail image of an image played at 8 minutes, and a fourth thumbnail image 6514 may be a thumbnail image of an image played at 12 minutes.

Meanwhile, the number of the plurality of thumbnail images 6511, 6512, 6513, and 6514 may be changed based on a horizontal angle of the fifth direction 5830. That is, the number of the plurality of thumbnail images is determined based on the horizontal angle of the fifth direction, and is then displayed accordingly.

For example, when the thirteenth input in the (5-1)$^{th}$ direction 5831 is received, the control unit 180 may display two thumbnail images. One of the two thumbnail images may be the thumbnail image of the image played at 0 minutes, and the other thereof may be the thumbnail image of the image played at 8 minutes.

In another example, when the thirteenth input in the (5-2)$^{th}$ direction 5832 is received, the control unit 180 may display four thumbnail images.

In another example, when the thirteenth input in the 5-3$^{th}$ direction 5833 is received, the control unit 180 may display eight thumbnail images.

In another example, when the thirteenth input in the 5-4$^{th}$ direction 5833 is received, the control unit 180 may display 16 thumbnail images.

Figure 66:
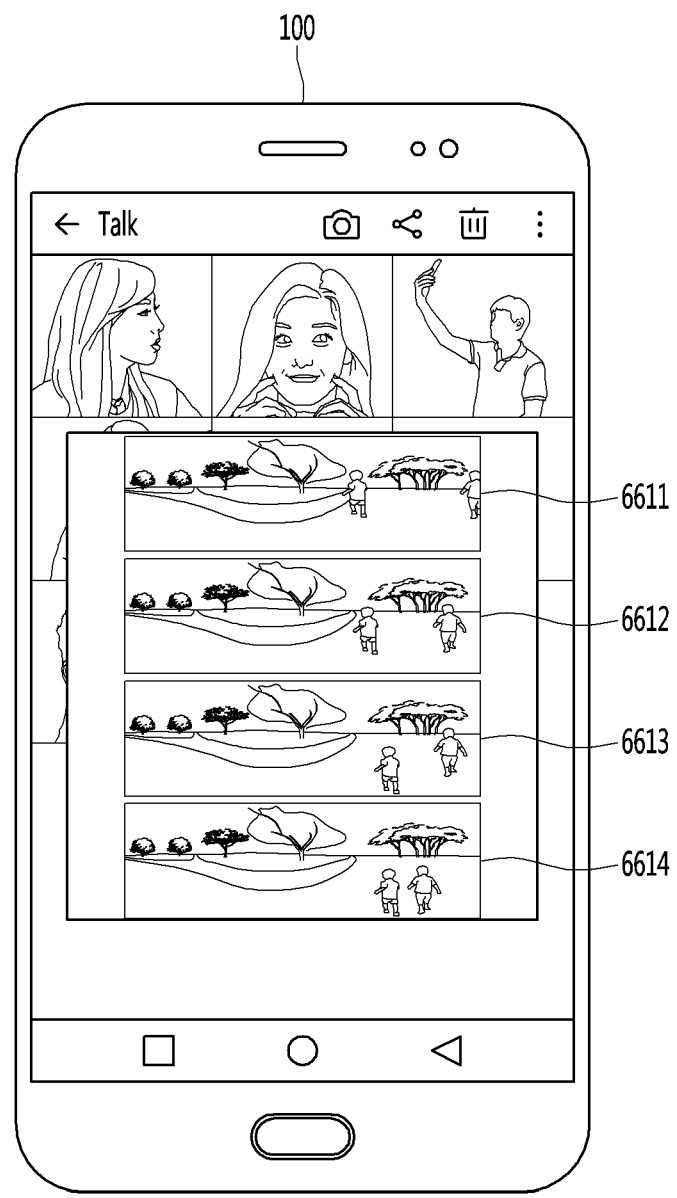
FIG. 66 is a diagram illustrating a method of displaying a preview image based on an input in a fifth direction, according to another embodiment of the present disclosure.

FIG. 66 is a diagram illustrating a method of displaying a preview image based on an input in a fifth direction 5830, according to another embodiment of the present disclosure.

In the present embodiment, descriptions will be provided by exemplifying an omnidirectionally captured image, but are not limited thereto. The present disclosure may be applied in a normal image.

A storage unit 170 may store a plurality of images and the plurality of images may be a plurality of continuously captured images.

On the other hand, the control unit 180 may display a thumbnail image of an omnidirectionally captured image in any one of a plurality of continuously and omnidirectionally captured images.

Meanwhile, the control unit 180 may receive a thirteenth input in the fifth direction 5830 for selecting and dragging a thumbnail image.

On the other hand, when the thirteenth input in the fifth direction 5830 is received, the control unit 180 may display a plurality of thumbnail images 6611, 6612, 6613, and 6614 respectively corresponding to a plurality of capturing orders of a video. The plurality of capturing orders may be an order in which a whole number of a plurality of continuously images is equally divided.

For example, when a whole number of omnidirectionally captured images is 16, a first thumbnail image 1611 may be a thumbnail image of an image primarily captured, a second thumbnail image 6612 may be a thumbnail image of an image fifthly captured, a third thumbnail image 6613 may be a thumbnail image of an image ninthly captured, and a fourth thumbnail image 6614 may be a thumbnail image of an image captured by a thirteenth order.

Meanwhile, the number of the plurality of thumbnail images 6611, 6612, 6613, and 6614 may be changed based on a horizontal angle of the fifth direction 5830.

For example, when the thirteenth input in the $(5\text{-}1)^{th}$ direction 5831 is received, the control unit 180 may display two thumbnail images. When the thirteenth input in the $(5\text{-}2)^{th}$ direction 5832 is received, the control unit 180 may display four thumbnail images. When the thirteenth input in the $5\text{-}3^{th}$ direction 5833 is received, the control unit 180 may display eight thumbnail images. When the thirteenth input in the $5\text{-}4^{th}$ direction 5834 is received, the control unit 180 may display 16 thumbnail images.

Figure 67:
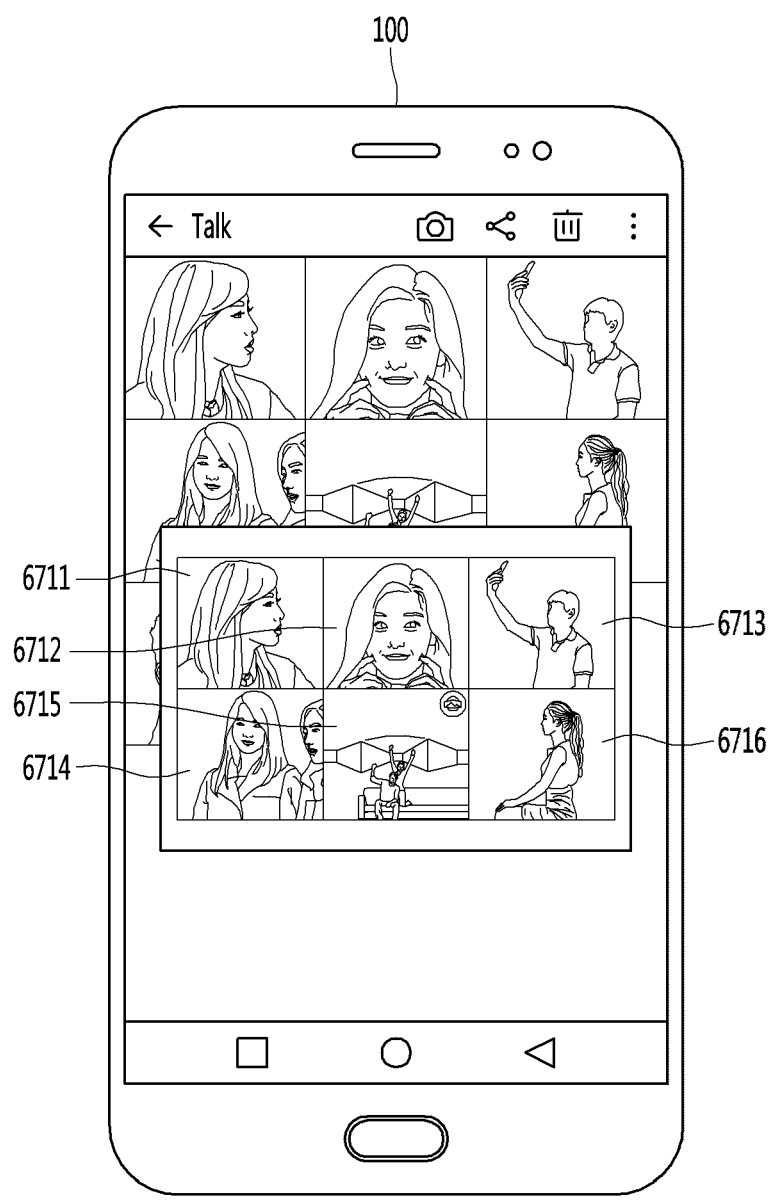
FIG. 67 is a diagram illustrating a method of displaying a preview image based on an input in a fifth direction, according to another embodiment of the present disclosure.

FIG. 67 is a diagram illustrating a method of displaying a preview image based on an input in a fifth direction 5830, according to another embodiment of the present disclosure.

In the present embodiment, descriptions will be provided by exemplifying an omnidirectionally captured image, but are not limited thereto. The present disclosure may be applied in a normal image.

On the other hand, the control unit 180 may display a thumbnail image of an omnidirectionally captured image.

Meanwhile, the control unit 180 may receive a thirteenth input in the fifth direction 5830 for selecting and dragging a thumbnail image.

On the other hand, when the thirteenth input in the fifth direction 5830 is received, the control unit 180 may display omnidirectionally captured images currently displayed and one or more thumbnail images 6711, 6712, 6713, and 6714 respectively corresponding to one or more omnidirectionally captured images acquired during a specific period. In addition, the specific period may be changed based on a horizontal angle of the fifth direction 5830. That is, the specific period is determined based on the horizontal angle of the fifth direction.

For example, when the thirteenth input in a $(5\text{-}1)^{th}$ direction 5831 is received, the control unit 180 may display one or more thumbnail images respectively corresponding to one or more omnidirectionally captured images acquired at the same time from a time for a selected thumbnail image to be acquired.

In another example, when the thirteenth input in a $(5\text{-}2)^{th}$ direction 5832 is received, the control unit 180 may display one or more thumbnail images respectively corresponding to one or more omnidirectionally captured images acquired on the same date from the time for the selected thumbnail image to be acquired.

In another example, when the thirteenth input in a $5\text{-}3^{th}$ direction 5833 is received, the control unit 180 may display one or more thumbnail images respectively corresponding to one or more omnidirectionally captured images acquired at the same week from the time for the selected thumbnail image to be acquired.

In another example, when the thirteenth input in a $5\text{-}4^{th}$ direction 5834 is received, the control unit 180 may display one or more thumbnail images respectively corresponding to one or more omnidirectionally captured images acquired in the same date from the time for the selected thumbnail image to be acquired.

Figure 68:
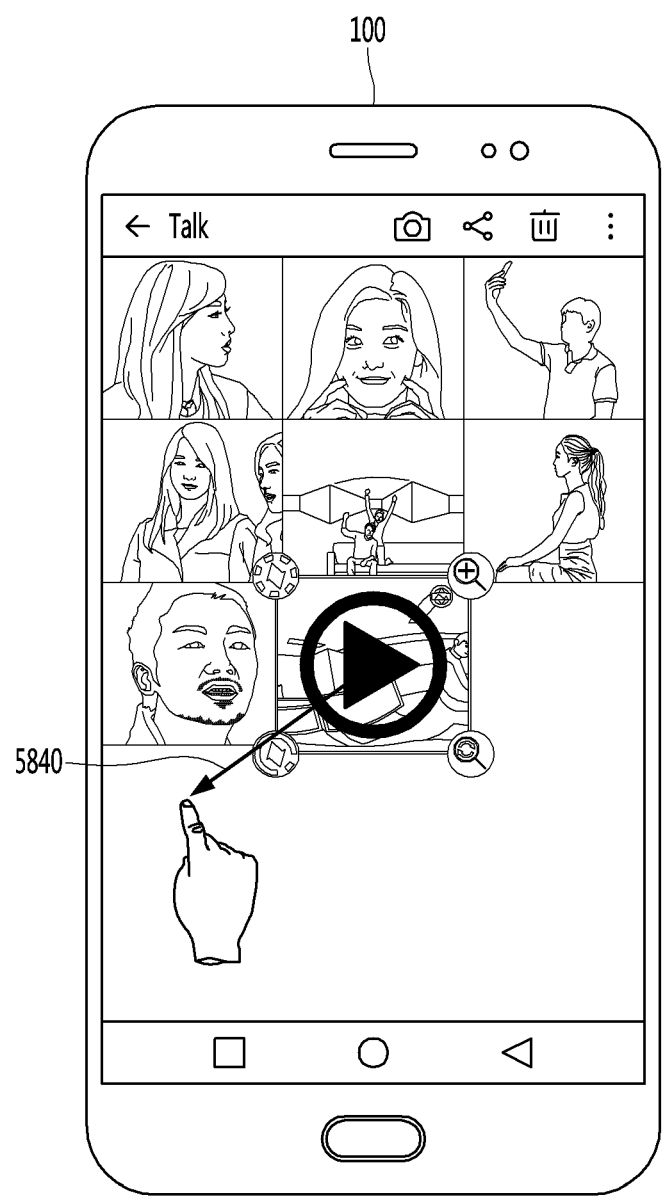
FIGS. 68 and 69 are diagrams illustrating a method of displaying a preview image based on an input a sixth direction, according to an embodiment of the present disclosure.
Figure 69:
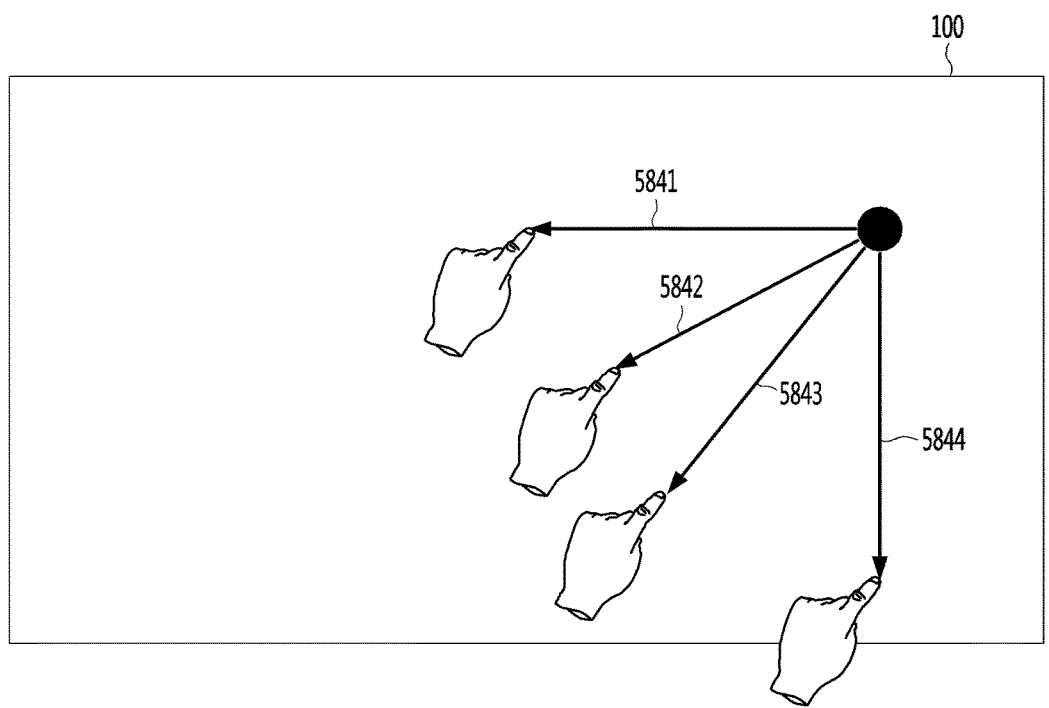

FIGS. 68 and 69 are diagrams illustrating a method of displaying a preview image based on an input a sixth direction 5840, according to an embodiment of the present disclosure;

In the present embodiment, descriptions will be provided by exemplifying an omnidirectionally captured image, but are not limited thereto. The present disclosure may be applied in a normal image.

The omnidirectionally captured image may be a video.

On the other hand, referring to FIG. 68, the control unit 180 may display a thumbnail image of a partial region in an omnidirectionally captured video.

Meanwhile, the control unit 180 may receive a fourteenth input in the sixth direction 5840 for selecting and dragging a thumbnail image.

On the other hand, the sixth direction 5840 may include at least one of a $(6\text{-}1)^{th}$ direction 5841, a $(6\text{-}2)^{th}$ direction 5842, a $6\text{-}3^{th}$ direction 5843, and a $6\text{-}4^{th}$ direction 5844.

Meanwhile, when the fourteenth input in the sixth direction 5840 is received, the control unit 180 may display a thumbnail image 7010 corresponding to a specific time point of a video. That is, the specific time point is determined based on the horizontal angle of the sixth direction.

In addition, the specific time point may be changed based on a horizontal angle of the sixth direction 5840.

For example, when the fourteenth input in the $(6\text{-}1)^{th}$ direction 5841 is received, the control unit 180 may display a thumbnail image corresponding to an image at a time point that 20% of a playback is performed after the playback starts.

In another example, when the fourteenth in the $(6\text{-}2)^{th}$ direction 5842 is received, the control unit 180 may display a thumbnail image corresponding to an image at a time point that 30% of the playback is performed after the playback starts.

In another example, when the fourteenth in the $6\text{-}3^{th}$ direction 5843 is received, the control unit 180 may display a thumbnail image corresponding to an image at a time point that 60% of the playback is performed after the playback starts.

In another example, when the fourteenth in the $6\text{-}4^{th}$ direction 5844 is received, the control unit 180 may display a thumbnail image corresponding to an image at a time point that 80% of the playback is performed after the playback starts.

Figure 70:
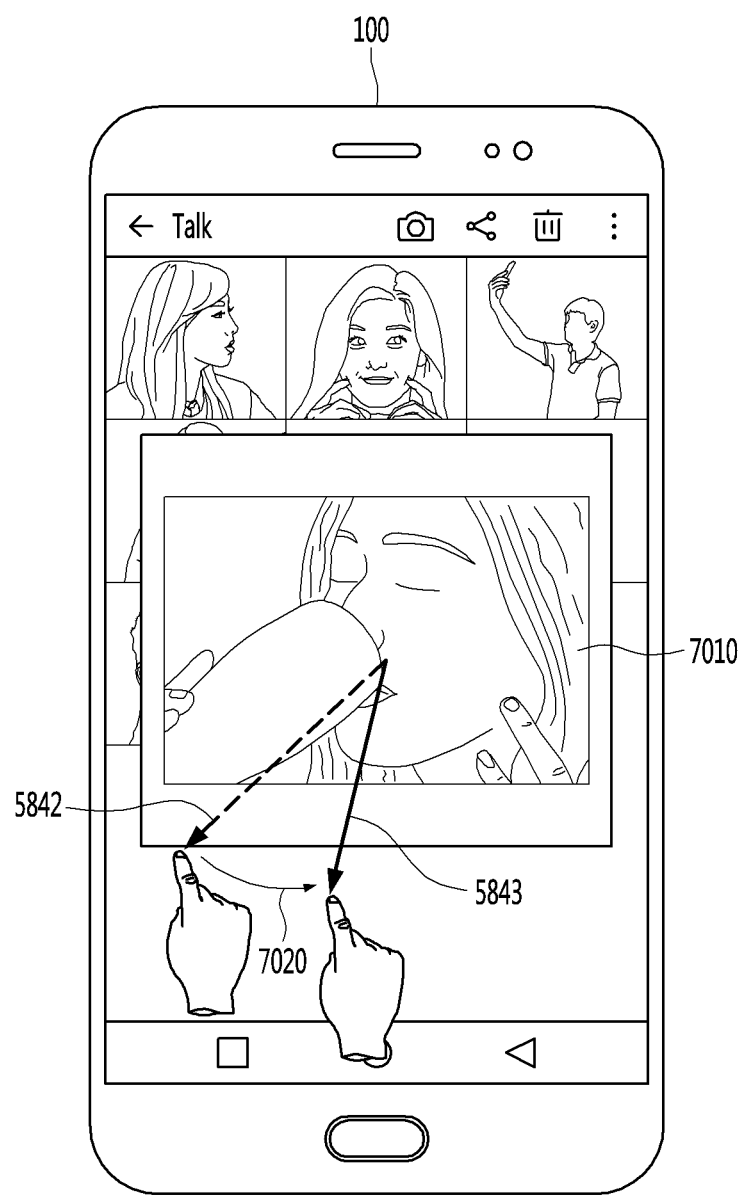
FIGS. 70 and 71 are diagrams illustrating a preview image changed by changing a horizontal angle of a fourteenth input in a sixth direction, according to an embodiment of the present disclosure.
Figure 71:
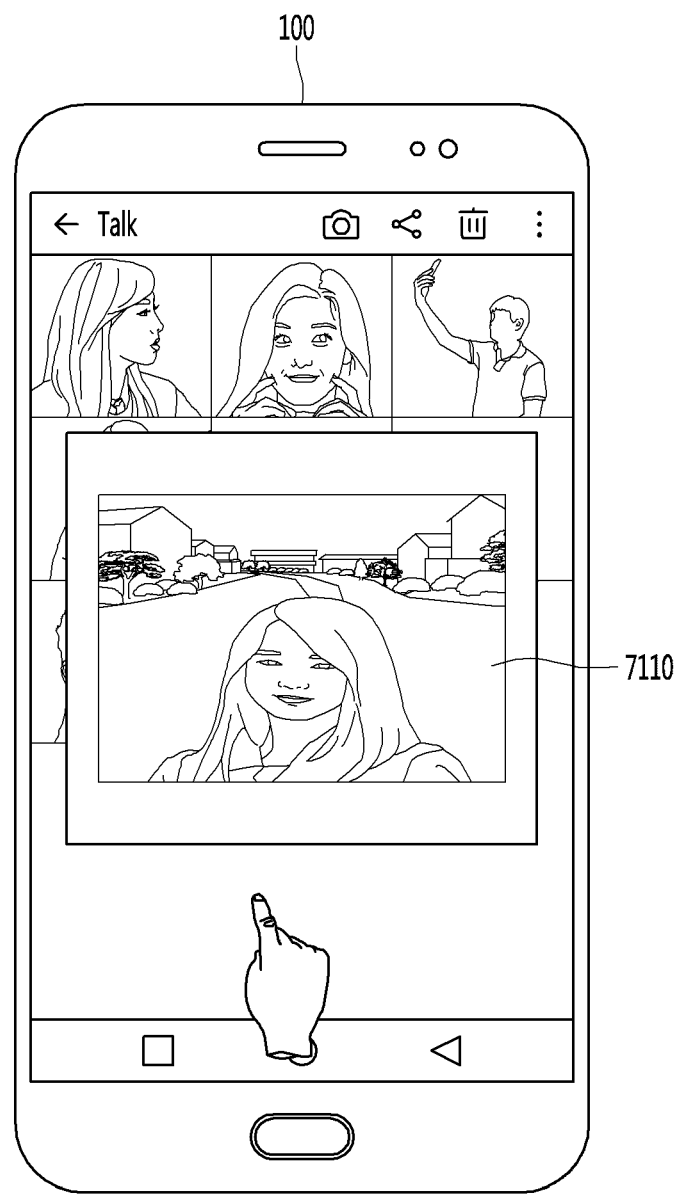

FIGS. 70 and 71 are diagrams illustrating a preview image changed by changing a horizontal angle of a fourteenth input in a sixth direction 5840, according to an embodiment of the present disclosure.

Referring to FIG. 70, the fourteenth input in a (6-2)$^{th}$ direction 5842 is received, and a thumbnail image 7010, which corresponds to an image at a first time point after a playback starts, is displayed. For example, the thumbnail image 7010 corresponding to the image at the first time point may be a thumbnail image corresponding to an image at a time point that 30% of a playback is performed after the playback starts.

Meanwhile, the control unit 180 may receive an input of changing a direction of the fourteenth input. For example, the control unit 180 may receive an input of changing the direction of the fourteenth input from the (6-2)$^{th}$ direction 5842 to the direction 6-3$^{th}$ direction 5843.

In this case, the control unit 180 may stop displaying the thumbnail image 7010 corresponding to the image at the first time point after the playback starts and display a thumbnail image 7110 corresponding to an image at a second time point after the playback starts as shown in FIG. 71.

For example, the thumbnail image 7110 corresponding to the image at the second time point may be a thumbnail image corresponding to an image at a time point that 60% of a playback is performed after the playback starts.

Figure 72:
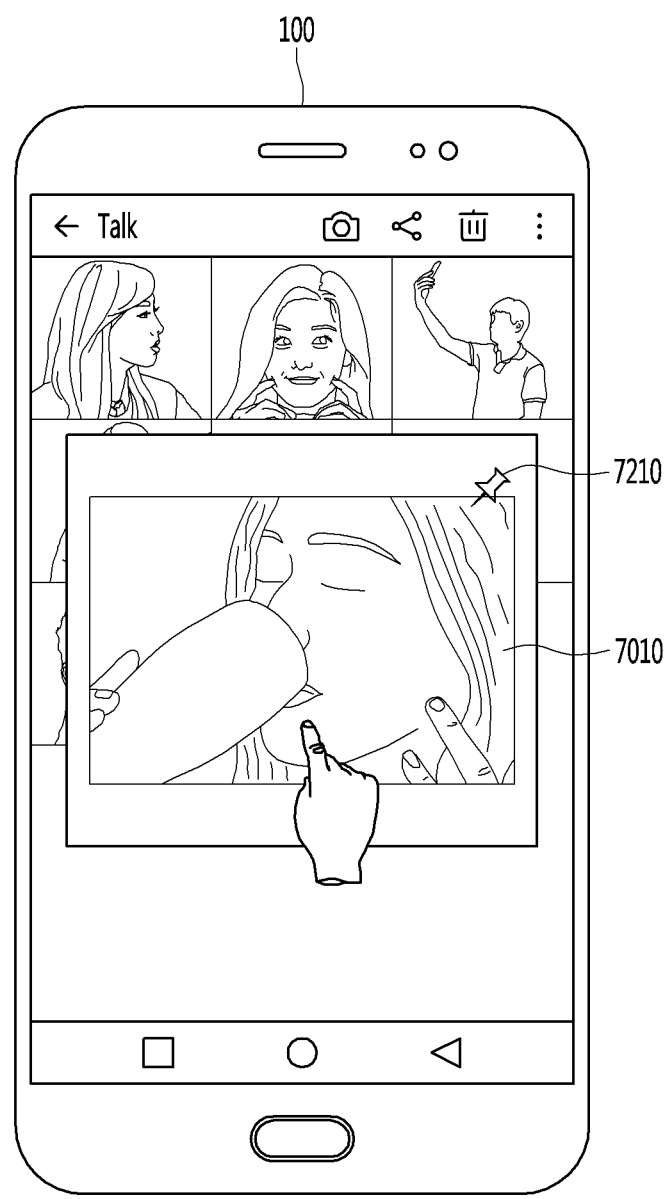
FIGS. 72 and 73 are diagrams illustrating a method of fixing an image and executing an original image, according to an embodiment of the present disclosure.
Figure 73:
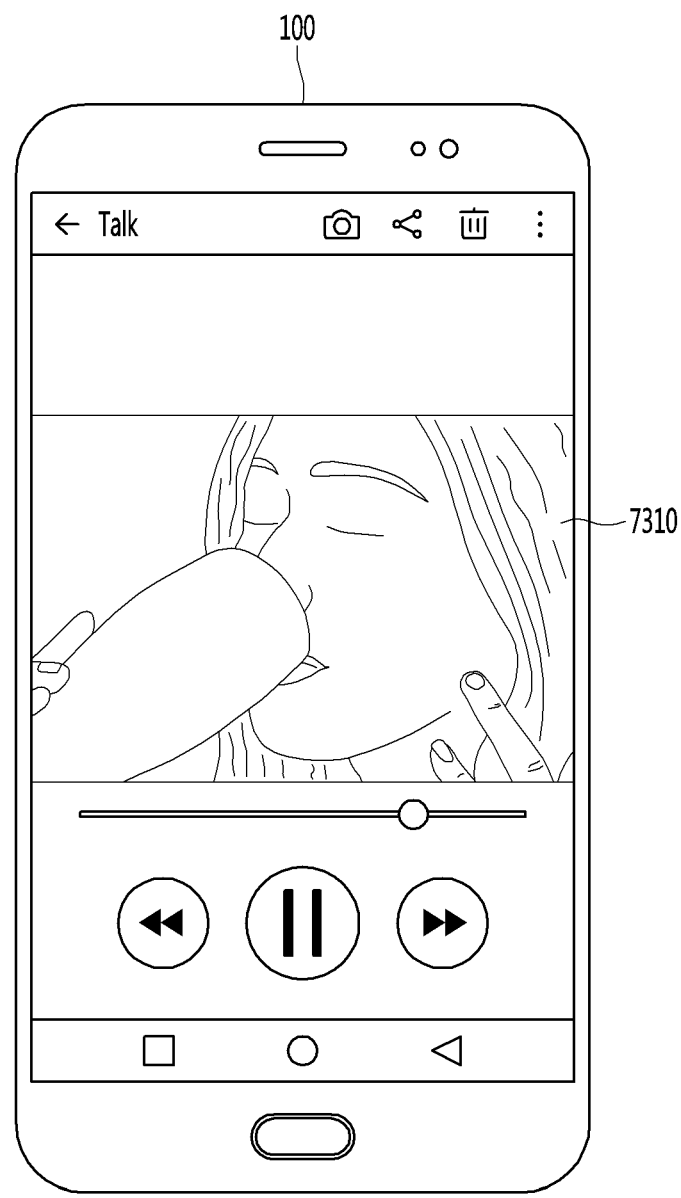

FIGS. 72 and 73 are diagrams illustrating a method of fixing an image and executing an original image, according to an embodiment of the present disclosure.

When a preset time elapses after the thumbnail image 7010 corresponding to the first time point is displayed, the control unit 180 may end the display of the thumbnail image 7010 corresponding to the first time point.

However, the present disclosure is not limited thereto. When a specific input is received in the state in which the thumbnail image 7010 corresponding to the first time point is displayed, the control unit 180 may continuously display the thumbnail image 7010 corresponding to the first time point without ending the display of the thumbnail image 7010 corresponding to the first time point. The specific input may be a force touch input of a region in which the thumbnail image 7010 corresponding to the first time point is displayed.

In addition, when a specific input is received in the state in which the thumbnail image 7010 corresponding to the first time point is displayed, the control unit 180 may display a bookmark icon 7210 indicating that an image is fixed.

On the other hand, when an input of touching the region in which the thumbnail image 7010 corresponding to the first time point is received in the state in which the thumbnail image 7010 corresponding to the first time point is displayed, the original image may be displayed from the first time point as shown in FIG. 73.

Figure 74:
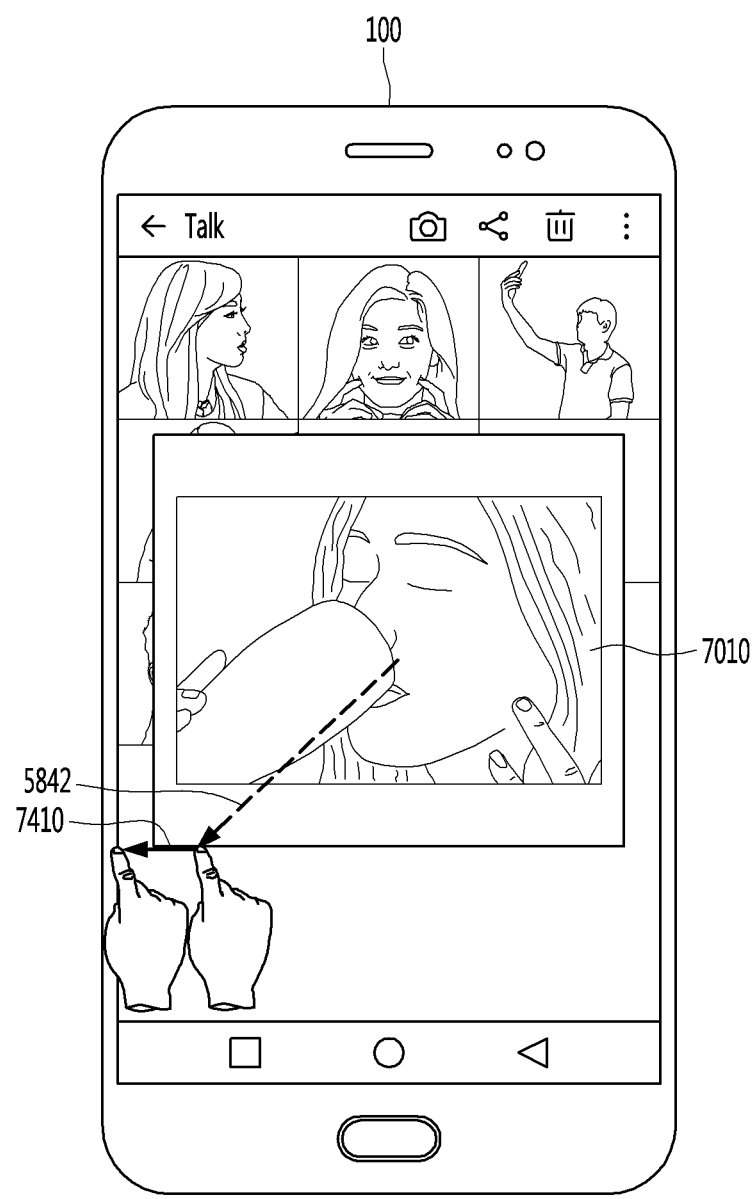
FIGS. 74 and 75 are diagrams illustrating a method of displaying a preview image when a fourteenth input in a sixth direction and a fifteenth input are received, according to an embodiment of the present disclosure.
Figure 75:
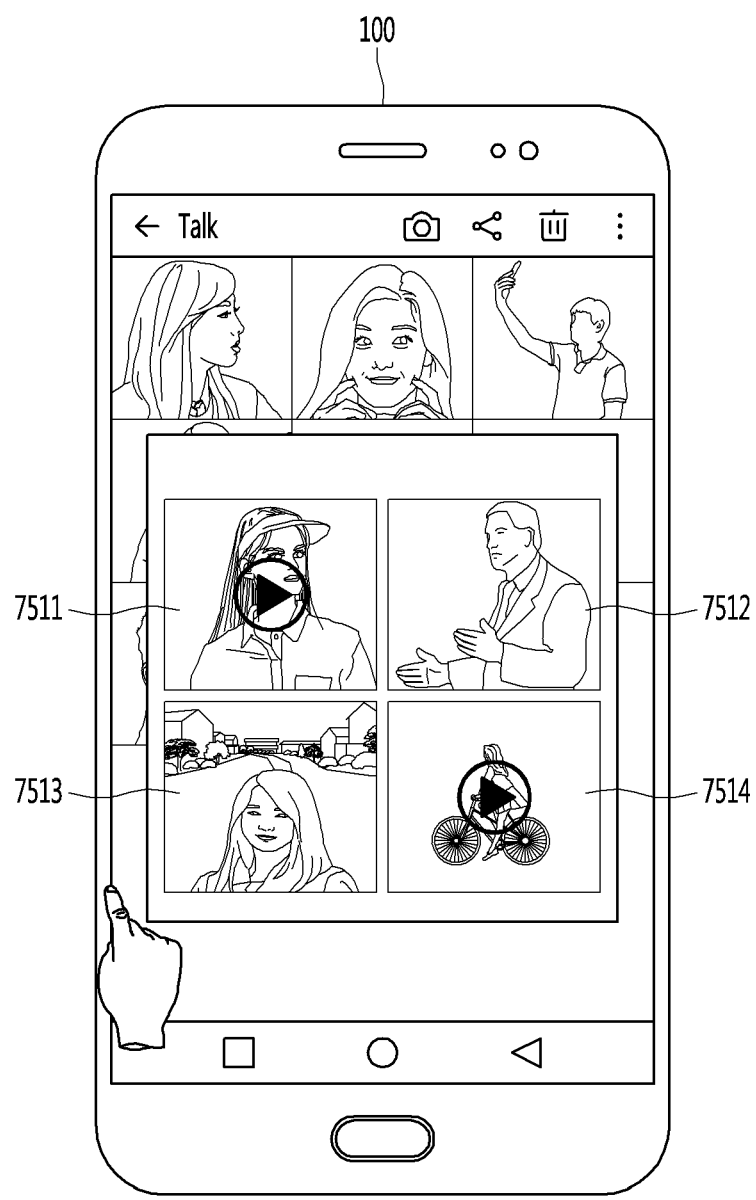

FIGS. 74 and 75 are diagrams illustrating a method of displaying a preview image when a fourteenth input in a sixth direction and a fifteenth input 7410 are received, according to an embodiment of the present disclosure;

In the present embodiment, descriptions will be provided by exemplifying an omnidirectionally captured image, but are not limited thereto. The present disclosure may be applied in a normal image.

Referring to FIG. 74, the fourteenth input in a (6-2)$^{th}$ direction 5842 is received, and the control unit 180 displays a thumbnail image 7010, which corresponds to an image at a second time point. For example, the thumbnail image 7010 corresponding to the image at the second time point may be a thumbnail image corresponding to an image at a time point that 30% of a playback is performed after the playback starts.

Meanwhile, when the fifteenth input 7410 is received, the control unit 180 may display one or more thumbnail images 7511, 7512, 7513, and 7514 respectively corresponding to one or more images within a preset playback section from the second time point.

For example, when the preset playback section is 10%, the control unit 180 may display a thumbnail image 7511 corresponding to an image at a time point that 32% of a playback is performed after the playback starts, a thumbnail image 7512 corresponding to an image at a time point that 34% of the playback is performed after the playback starts, a thumbnail image 7513 corresponding to an image at a time point that 36% of the playback is performed after the playback starts, and a thumbnail image 7514 corresponding to an image at a time point that 38% of the playback is performed after the playback starts.

Figure 76:
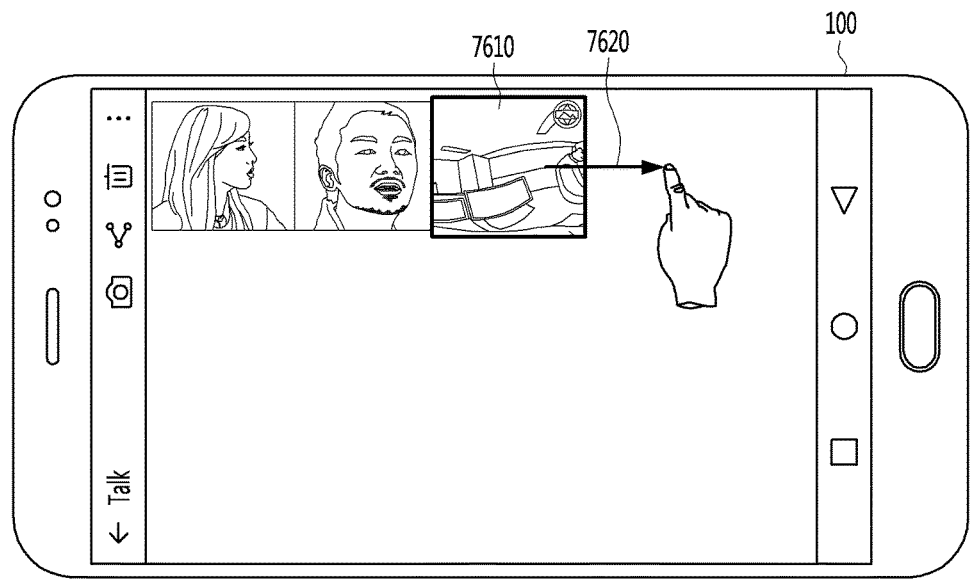
FIGS. 76 and 77 are diagrams illustrating a method of displaying a preview image in a horizontal view mode, according to an embodiment of the present disclosure.
Figure 77:
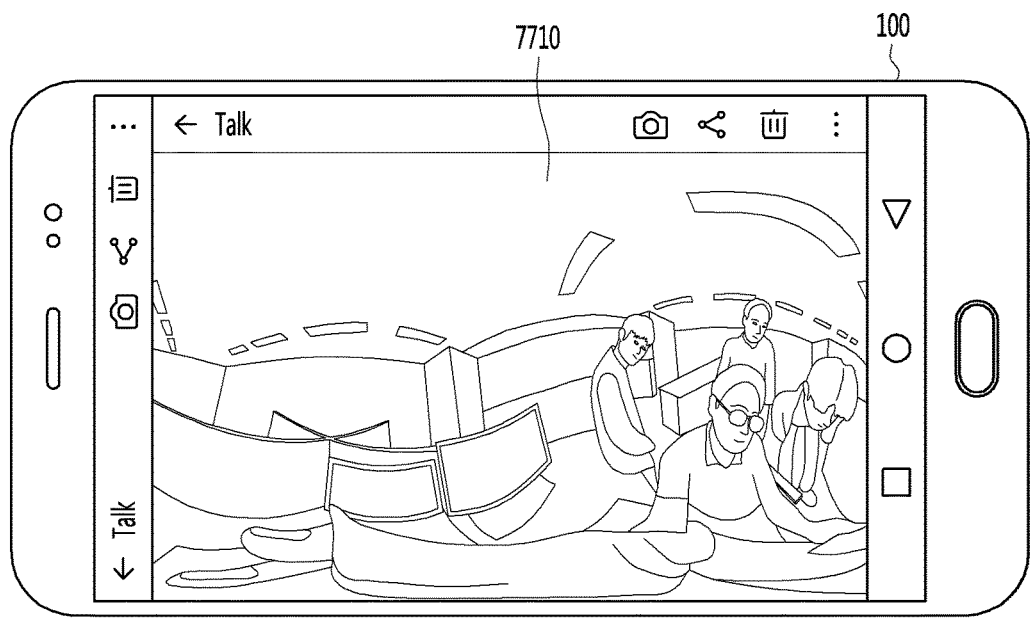

FIGS. 76 and 77 are diagrams illustrating a method of displaying a preview image in a horizontal view mode, according to an embodiment of the present disclosure.

When an input of selecting a thumbnail image 7610 of a partial region in a preview image of an omnidirectionally captured image is received in the horizontal view mode, the control unit 180 may display an image 7710 corresponding to a specific region of the preview image in the omnidirectionally captured image.

On the other hand, the specific region may be a region contacting an upper side and a lower side of the preview image, and a height of the image 7710 corresponding to the specific region of the preview image may correspond to a height of a screen.

That is, when an image corresponding to a specific region is displayed in the horizontal view mode, all of upper and lower regions of a preview image may be displayed on the screen and left and right regions of the preview image may be partially cut and displayed.

Figure 78:
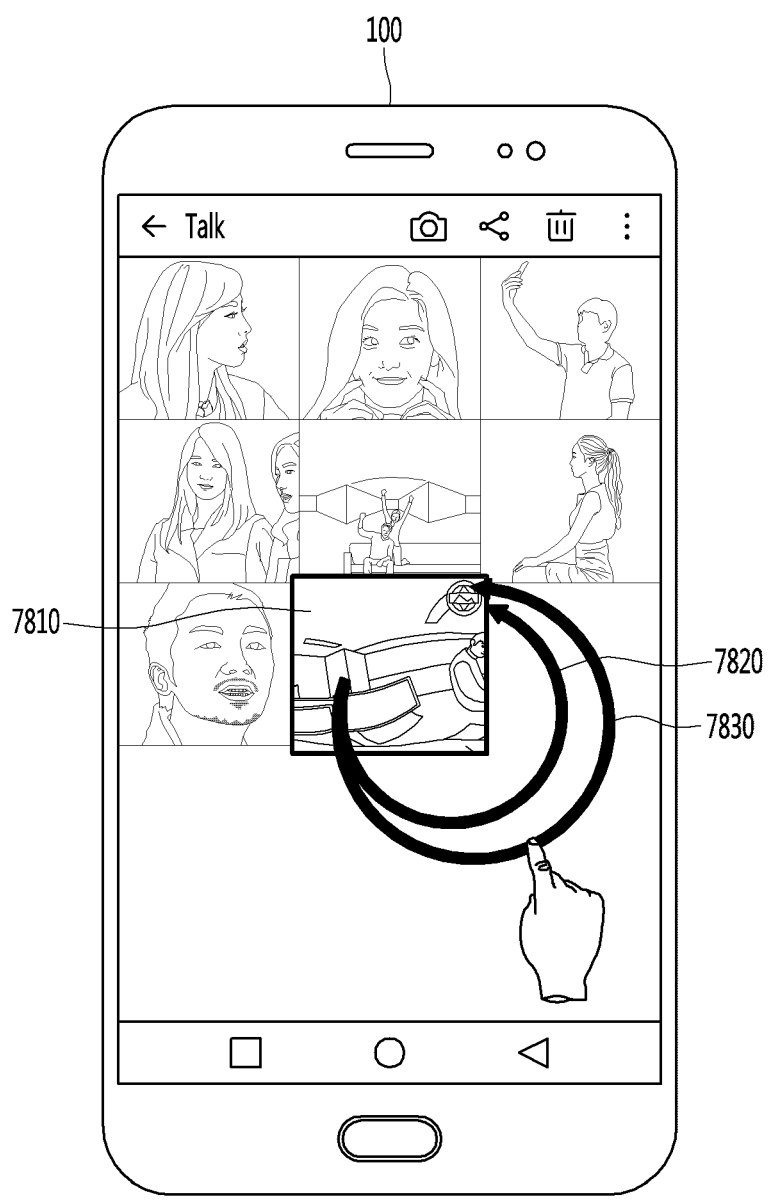
FIGS. 78 to 80 are diagrams illustrating a method of displaying an omnidirectionally captured image in an omnidirectional display mode, according to an embodiment of the present disclosure.
Figure 79:
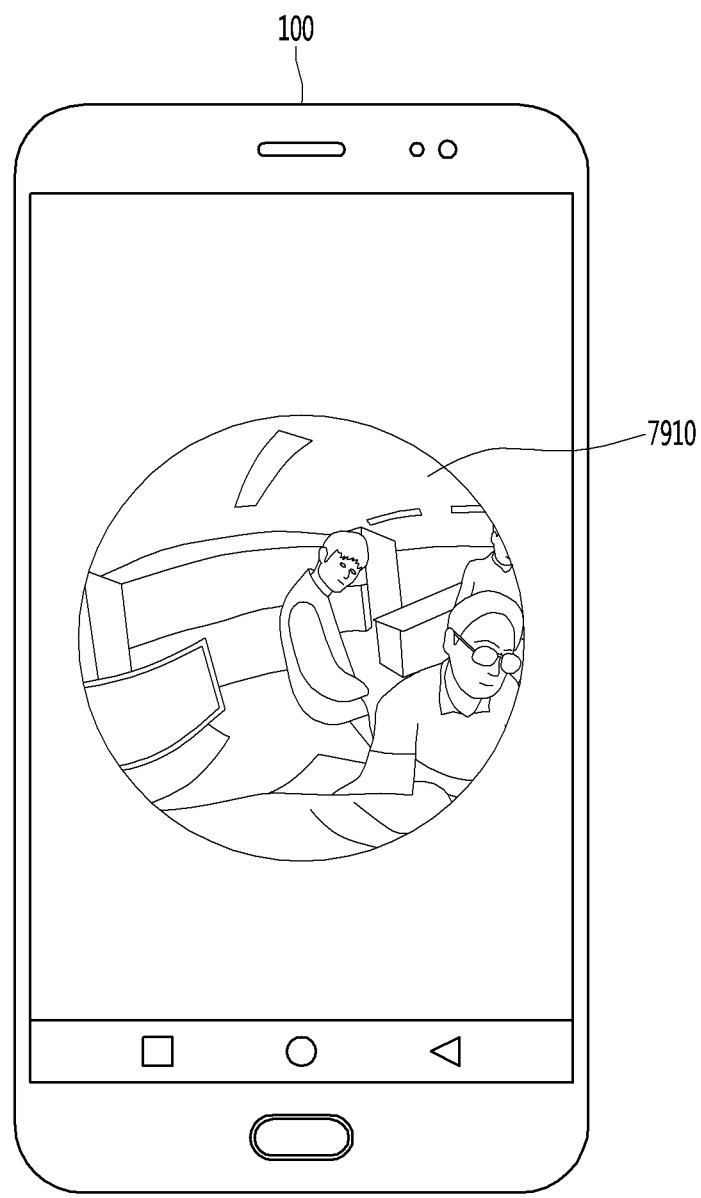
Figure 80:
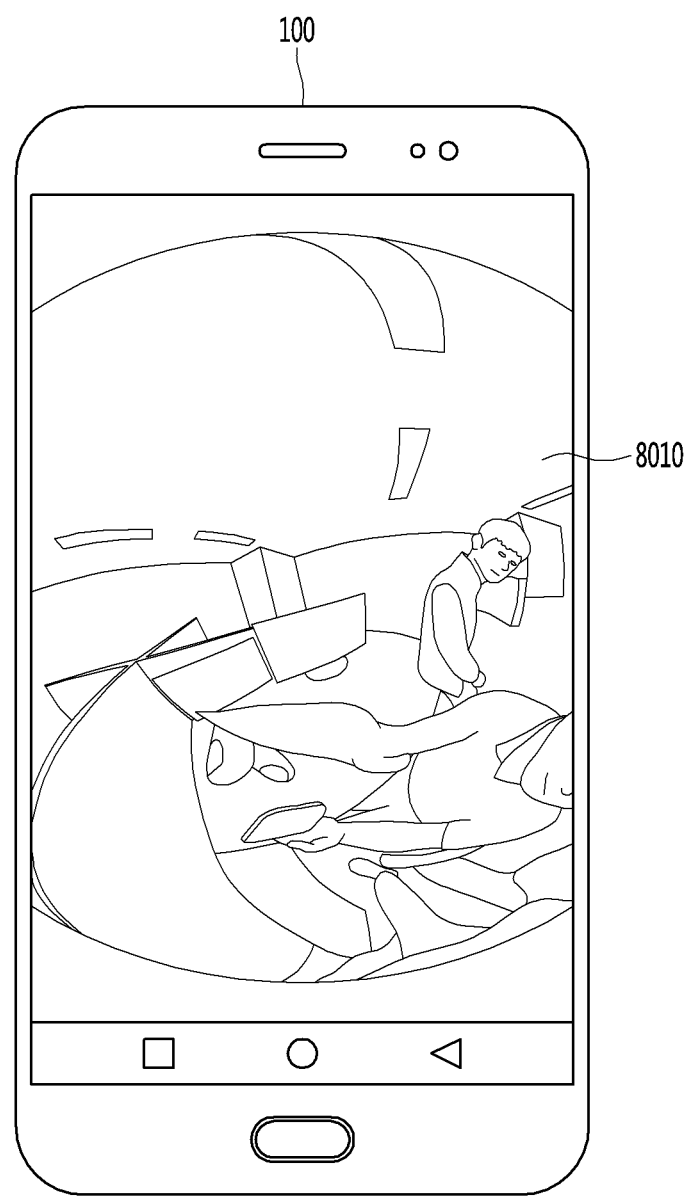

FIGS. 78 to 80 are diagrams illustrating a method of displaying an omnidirectionally captured image in an omnidirectional display mode, according to an embodiment of the present disclosure.

A partial region of the omnidirectionally captured image may be displayed in the omnidirectional display mode.

On the other hand, the omnidirectionally captured image may be displayed in various shapes in the omnidirectional display mode based on an enlargement ratio of an image.

For example, when the enlargement ratio of the image is greater than or equal to a preset value, as shown in FIGS. 79 and 80, a front region or a rear region of the omnidirectionally captured image may be displayed in a spherical shape.

Meanwhile, spherical images 7910 and 8010 including the front region or the rear region of the omnidirectionally captured image may be displayed based on an input received from a user.

For example, as shown in FIG. 78, when inputs 7820 and 7830 having a curve shape, a semicircular shape, or a circular shape are received, the control unit 180 may display the spherical images 7910 and 8010 including the front region or the rear region of the omnidirectionally captured image.

Meanwhile, a size of each of the spherical images 7910 and 8010 including the front region or the rear region of the omnidirectionally captured image may be changed based on an input received from the user. That is, the size of each of the spherical images is determined based on the input, and is then displayed accordingly.

For example, when a first input 7820 having a small turning radius is received, as shown in FIG. 79, the control unit 180 may display the spherical image 7910 having a small size.

In another example, when a second input 7830 having a large turning radius is received, as shown in FIG. 80, the control unit 180 may display the spherical image 8010 having a large size.

On the other hand, the control unit 180 is generally a component that manages the control of the apparatus and may also be referred to as a central processing unit, a microprocessor, a processor, and the like.

The present disclosure mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the control unit 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A display apparatus comprising:
   a display unit;
   an input unit configured to receive an input from a user; and
   a control unit configured to control the display unit to display a thumbnail image corresponding to a partial region of a preview image of an omnidirectionally captured image,
   wherein the control unit is further configured to control the display unit to display an image corresponding to a specific region of the preview image if the input is received,
   wherein at least one of the specific region and an enlargement ratio of the image corresponding to the specific region is determined based on the input,
   wherein the control unit is configured to control the display unit to display a first image having a first enlargement ratio and corresponding to a first region of the preview image if a first input in a first direction is received, and
   the first enlargement ratio is a ratio in which the first region is enlarged while an aspect ratio thereof is maintained such that a width of the first image corresponds to a width of the screen.

2. The display apparatus of claim 1, wherein the control unit is configured to control the display unit to display a gallery comprising the thumbnail image and other thumbnail images and display the image corresponding to the specific region together with the gallery.

3. The display apparatus of claim 1, wherein the specific region is a region contacting an upper side and a lower side of the preview image, and
   at least one of an aspect ratio, a size, and a position of the specific region is determined based on the input.

4. The display apparatus of claim 3, wherein the control unit is configured to control the display unit to display a second image having a second enlargement ratio and corresponding to a second region of the preview image if a second input in a second direction is received,
   the second region is an is a entire region of the preview image, and
   the second enlargement ratio is a ratio in which the second region is enlarged while an aspect ratio thereof is maintained such that a width of the second image corresponds to a width of the screen.

5. The display apparatus of claim 1, wherein the control unit is configured to acquire information on a horizontal angle of the first direction, and
   the first region and the first enlargement ratio are determined based on the horizontal angle of the first direction.

6. The display apparatus of claim 1, wherein the control unit is configured to acquire information on a horizontal direction of the first direction, and
   the first region is a region which is moved from the partial region in a direction corresponding to the horizontal direction of the first direction.

7. The display apparatus of claim 3, wherein the control unit is configured to control the display unit to display a third image having a third enlargement ratio and corresponding to a third region of the preview image if a third input in a third direction is received, and
   the third enlargement ratio is a ratio in which the third region is enlarged while an aspect ratio thereof is maintained such that a width and a height of the third image respectively correspond to a width and a height of the screen.

8. The display apparatus of claim 4, wherein the control unit is configured to control the display unit to display a fourth image having the first enlargement ratio higher than the second enlargement ratio and corresponding to a fourth region of the preview image if a fourth input is received when the second image is displayed,
   the fourth region is a region contacting the upper side and the lower side of the preview image and placed on a rightmost side or a leftmost side of the preview image, and
   the first enlargement ratio is a ratio in which the fourth region is enlarged while an aspect ratio thereof is maintained such that a width of the fourth image corresponds to a width of the screen.

9. The display apparatus of claim 1, wherein the control unit is configured to control the display unit to display the image corresponding to the specific region of the preview image while the input is being received, and ends the display of the image corresponding to the specific region of the preview image if the input is released.

10. The display apparatus of claim 3, wherein the control unit is configured to control the display unit to display a sixth image having a fourth enlargement ratio and corresponding to a sixth region of the preview image if a seventh input in a second first direction is received, the sixth region contacts the upper side and the lower side of the preview image and further comprises a region which has a length corresponding to a length of the seventh input from the partial region, and the fourth enlargement ratio is a ratio in which the sixth region is enlarged while an aspect ratio thereof is maintained.

11. The display apparatus of claim 10, wherein the control unit is configured to control the display unit to display a seventh image having the first enlargement ratio and corresponding to a seventh region of the preview image, if an eighth input in the first direction is received in a state in which the sixth image is displayed, the control unit is configured to acquire information on a horizontal direction and a horizontal angle of the first direction, the seventh region is a region contacting the upper side and the lower side of the preview image and moved from the sixth region in a direction corresponding to the horizontal direction of the first direction, the first enlargement ratio is a ratio in which the seventh region is enlarged while an aspect ratio thereof is maintained, and the seventh region and the first enlargement ratio are determined based on the horizontal angle of the first direction.

12. The display apparatus of claim 1, wherein the control unit is configured to control the display unit to display an eighth image having a fifth enlargement ratio and corresponding to an eighth region of the preview image if a ninth input is received, the eighth region comprises one or more objects included in the preview image, and the fifth enlargement ratio is a ratio in which the eighth region is enlarged while an aspect ratio thereof is maintained such that a width of the eighth image corresponds to a width of the screen.

13. The display apparatus of claim 1, wherein the control unit is configured to control the display unit to display a ninth image corresponding to a ninth region of the preview image if a tenth input is received, and the ninth region contacts an upper side and a lower side of the preview image and further comprises a region which has a length corresponding to a length of the tenth input from the partial region.

14. The display apparatus of claim 13, wherein the ninth image is an image extending in left and right directions from a position of the thumbnail image.

15. The display apparatus of claim 1, wherein the control unit is configured to control the display unit to display a tenth image which corresponds to a tenth region of the preview image and is an image in which the thumbnail image extends in a specific direction, if an eleventh input in the specific direction is received, and the tenth region comprises the partial region and a region extending in the specific direction from the partial region.

16. The display apparatus of claim 1, wherein the control unit is configured to control the display unit to display an eleventh image which corresponds to an eleventh region of the preview image and is an image in which the thumbnail image extends in a direction opposite to a specific direction, if a twelfth input in the specific direction is received and the thumbnail image contacts an edge in the specific direction on the screen, and the eleventh region comprises the partial region and a region extending in the specific direction from the partial region.

17. The display apparatus of claim 1, wherein the control unit is configured to control the display unit to vertically display the image corresponding to the specific region if a twelfth input in a fourth direction is received, and an enlargement ratio of the image vertically displayed is determined based on a horizontal angle of the fourth direction.

18. The display apparatus of the claim 1, wherein the omnidirectionally captured image is a video, the control unit is configured to control the display unit to display a plurality of thumbnail images respectively corresponding to a plurality of time points of the video if a thirteenth input in a fifth direction is received, and the number of the plurality of thumbnail images is determined based on a horizontal angle of the fifth direction.

19. The display apparatus of claim 1, wherein the control unit is configured to control the display unit to display one or more thumbnail images respectively corresponding to one or more omnidirectionally captured images during a specific period if a thirteenth input in a fifth direction is received, and the specific period is determined based on a horizontal angle of the fifth direction.

* * * * *